US009838949B2

(12) United States Patent
Jin et al.

(10) Patent No.: US 9,838,949 B2
(45) Date of Patent: Dec. 5, 2017

(54) TERMINAL DISCOVERY METHOD, TERMINAL, SERVER, BASE STATION, MANAGEMENT ENTITY, AND SYSTEM

(71) Applicant: Huawei Device (Dongguan) Co., Ltd., Dongguan (CN)

(72) Inventors: Hui Jin, Beijing (CN); Chenliang Gao, Shenzhen (CN); Guowei Ouyang, Beijing (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 76 days.

(21) Appl. No.: 14/798,805

(22) Filed: Jul. 14, 2015

(65) Prior Publication Data

US 2015/0319673 A1 Nov. 5, 2015

Related U.S. Application Data

(63) Continuation of application No. PCT/CN2014/077654, filed on May 16, 2014.

(30) Foreign Application Priority Data

May 20, 2013 (CN) .......................... 2013 1 0188555

(51) Int. Cl.
H04W 4/00 (2009.01)
H04W 48/08 (2009.01)
(Continued)

(52) U.S. Cl.
CPC .......... *H04W 48/08* (2013.01); *H04W 4/023* (2013.01); *H04W 8/005* (2013.01); *H04W 48/16* (2013.01);
(Continued)

(58) Field of Classification Search
CPC ....... H04W 4/00; H04W 88/12; H04W 84/12; H04W 36/0011; H04W 76/026; H04L 5/00
(Continued)

(56) References Cited

U.S. PATENT DOCUMENTS 8,929,336 B2 * 1/2015 Rydnell ............ H04W 36/0011
370/331
2011/0257923 A1 10/2011 Boulton
2014/0211696 A1 7/2014 Chai et al.

FOREIGN PATENT DOCUMENTS

CN 101621385 A 1/2010
CN 102857901 A 1/2013
(Continued)

OTHER PUBLICATIONS

Doppler, K., et al., "Device-to-Device Communication as an Underlay to LTE-Advanced Networks," Topics in Radio Communication, IEEE Communication Magazine, Dec. 2009, pp. 42-49.
(Continued)

*Primary Examiner* — Chi H Pham
*Assistant Examiner* — Alexander O Boakye
(74) *Attorney, Agent, or Firm* — Conley Rose, P.C.

(57) ABSTRACT

A terminal discovery method, a terminal, a server, a base station, a management entity, and a system are provided that pertain to the field of wireless communications. The method includes acquiring a discovery resource; monitoring, according to the discovery resource, a second message sent by at least one second terminal; acquiring a service identity of the second terminal according to the second message; and acquiring description information of the second terminal from a server according to the service identity of the second terminal.

20 Claims, 24 Drawing Sheets

(51) Int. Cl.
*H04W 8/00* (2009.01)
*H04W 72/04* (2009.01)
*H04W 4/02* (2009.01)
*H04W 48/16* (2009.01)
*H04W 76/02* (2009.01)
*H04W 88/08* (2009.01)

(52) U.S. Cl.
CPC ............ *H04W 72/04* (2013.01); *H04W 4/005* (2013.01); *H04W 76/023* (2013.01); *H04W 88/08* (2013.01)

(58) Field of Classification Search
USPC ........................................ 370/329, 328, 331
See application file for complete search history.

(56) References Cited

FOREIGN PATENT DOCUMENTS

| | | |
|---|---|---|
| CN | 103096503 A | 5/2013 |
| WO | 2013025057 A2 | 2/2013 |
| WO | 2013044885 A1 | 4/2013 |
| WO | 2013052163 A1 | 4/2013 |

OTHER PUBLICATIONS

Foreign Communication From a Counterpart Application, European Application No. 14801134.9, Extended European Search Report dated Feb. 18, 2016, 8 pages.

"3rd Generation Partnership Project; Technical Specification Group Services and System Aspects; Study on architecture enhancements to support Proximity Services (ProSe) (Release 12)," 3GPP TR 23.703, V0.2.0, Technical Report, Apr. 2013, 26 pages.

ETSI TC TETRA, "Information about the system improvements requirements for the adoption of LTE for mission/business critical communications," Liaison Statement, Tetra (12)000036r1, 3GPP TSG-SA WG1 Meeting #58, s1-121247, May 7-11, 2012, 2 pages.

"Additional information: Group Communications & Proximity-based Services," CCBG_LS12-001, Critical Communication Broadband Group (CCBG), Liaison Statement, Jul. 27, 2012, 2 pages.

Foreign Communication From a Counterpart Application, PCT Application No. PCT/CN2014/077654, English Translation of International Search Report dated Aug. 26, 2014, 3 pages.

Foreign Communication From a Counterpart Application, PCT Application No. PCT/CN2014/077654, Written Opinion dated Aug. 26, 2014, 7 pages.

Machine Translation and Abstract of Chinese Publication No. CN101621385, dated Jan. 6, 2010, 7 pages.

Machine Translation and Abstract of Chinese Publication No. CN102857901, dated Jan. 2, 2013, 17 pages.

Foreign Communication From a Counterpart Application, Chinese Application No. 201310188555.9, Chinese Office Action dated Mar. 9, 2017, 9 pages.

* cited by examiner

US 9,838,949 B2

TERMINAL DISCOVERY METHOD, TERMINAL, SERVER, BASE STATION, MANAGEMENT ENTITY, AND SYSTEM

CROSS-REFERENCE TO RELATED APPLICATIONS

This application is a continuation of International Application No. PCT/CN2014/077654, filed on May 16, 2014, which claims priority to Chinese Patent Application No. 201310188555.9, filed on May 20, 2013, both of which are hereby incorporated by reference in their entireties.

TECHNICAL FIELD

The present invention relates to the field of wireless communications, and in particular, to a terminal discovery method, a terminal, a server, a base station, a management entity, and a system.

BACKGROUND

Device-to-Device (D2D) communication is a new technology that allows, under control of a system, direct communication between terminals by reusing cell resources. It can increase spectrum efficiency of a cellular communication system, reduce transmit power of the terminals, and solve a shortage problem of spectrum resources of a wireless communication system to some extent. In D2D communication, discovery of a terminal is a basis for performing D2D communication.

In a conventional D2D terminal discovery method, each terminal registers its own unique identity with a network side in advance. When a first terminal needs to discover a second terminal, the first terminal sends a unique identity of the second terminal to a server; the server sends a service identity of the second terminal to the first terminal according to the unique identity of the second terminal, and triggers the second terminal to broadcast the service identity of the second terminal; the first terminal monitors broadcast information including the service identity, compares the service identity of the second terminal with the service identity in the received broadcast information, and if the two service identities are consistent, determines that a terminal corresponding to the broadcast information including the service identity is the second terminal.

In the conventional D2D terminal discovery method, the first terminal must learn the unique identity of the second terminal in advance. Therefore, the method can only be used to discover a known specific terminal and an application scope is relatively narrow.

SUMMARY

To solve a problem that a unique identity of a second terminal must be learned in advance for terminal discovery in the prior art, embodiments of the present invention provide a terminal discovery method, a terminal, a server, a base station, a management entity, and a system. The technical solutions are as follows.

According to a first aspect, a terminal discovery method is provided, and the method includes acquiring, by a first terminal, a discovery resource; monitoring, by the first terminal according to the discovery resource, a second message sent by at least one second terminal, where the second message includes a service identity of the second terminal; acquiring, by the first terminal, the service identity of the second terminal according to the second message; and acquiring, by the first terminal, description information of the second terminal from a server according to the service identity of the second terminal.

In a first possible implementation manner of the first aspect, the acquiring, by the first terminal, description information of the second terminal from a server according to the service identity of the second terminal includes sending, by the first terminal, the service identity of the second terminal to the server; or sending, by the first terminal, the service identity of the second terminal to a management entity, so that the management entity sends the service identity of the second terminal to the server; and receiving, by the first terminal, the description information of the second terminal sent by the server, where the description information of the second terminal is information that is acquired by the server according to the service identity of the second terminal; or receiving, by the first terminal, the description information of the second terminal sent by the management entity, where the description information of the second terminal is information that is acquired by the server according to the service identity of the second terminal and sent to the management entity.

With reference to the first possible implementation manner of the first aspect, in a second possible implementation manner of the first aspect, before the receiving, by the first terminal, the description information of the second terminal sent by the server or before the receiving, by the first terminal, the description information of the second terminal sent by the management entity, the method further includes sending, by the first terminal, a service identity of the first terminal to the server, so that the server acquires the description information of the second terminal according to the service identity of the second terminal after the server verifies, according to the service identity of the first terminal, that the first terminal is authorized to discover the second terminal; or sending, by the first terminal, a service identity of the first terminal to the management entity, so that the management entity sends the service identity of the first terminal to the server, and the server acquires the description information of the second terminal according to the service identity of the second terminal after the server verifies, according to the service identity of the first terminal, that the first terminal is authorized to discover the second terminal.

With reference to the first aspect, the first possible implementation manner of the first aspect, or the second possible implementation manner of the first aspect, in a third possible implementation manner of the first aspect, the acquiring, by a first terminal, a discovery resource includes sending, by the first terminal, a first request to the management entity, so that the management entity sends a second request to a base station; and receiving, by the first terminal, the discovery resource that is sent by the base station according to the second request; or receiving, by the first terminal, the discovery resource that is sent by the management entity, where the discovery resource is a discovery resource that is sent by the base station to the management entity according to the second request; where the discovery resource includes a discovery resource of a serving cell of the first terminal; or the discovery resource includes a discovery resource of a serving cell of the first terminal and a discovery resource of a cell adjacent to the serving cell.

With reference to the third possible implementation manner of the first aspect, in a fourth possible implementation manner of the first aspect, the receiving, by the first terminal, the discovery resource that is sent by the base station according to the second request includes receiving, by the first terminal, the discovery resource that the base station sends by using a Radio Resource Control (RRC) message after receiving the second request; where the second request is an S1-Application Protocol (S1-AP) message including a first indication, where the first indication is used to instruct the base station to send the discovery resource to the first terminal or used to instruct the base station to acquire the discovery resource and send the discovery resource to the first terminal.

With reference to the third possible implementation manner of the first aspect, in a fifth possible implementation manner of the first aspect, the receiving, by the first terminal, the discovery resource that is sent by the management entity includes receiving, by the first terminal, the discovery resource that is sent by the management entity by using a non-access stratum (NAS) message, where the discovery resource is the discovery resource that the base station sends to the management entity by using a container after receiving the second request; where the second request is an S1-AP message including a second indication, where the second indication is used to instruct the base station to send the discovery resource to the management entity or used to instruct the base station to acquire the discovery resource and send the discovery resource to the management entity.

With reference to the third possible implementation manner of the first aspect, in a sixth possible implementation manner of the first aspect, the sending, by the first terminal, a first request to the management entity includes sending, by the first terminal, the first request including an identity of the first terminal to the management entity, so that the management entity sends the identity of the first terminal to the server and when the server verifies, according to the identity of the first terminal, that the first terminal is authorized to discover the second terminal, sends the second request to the base station.

With reference to the third possible implementation manner of the first aspect, in a seventh possible implementation manner of the first aspect, the sending, by the first terminal, a first request to the management entity includes sending, by the first terminal, the first request including an identity of the first terminal and an identity of an application using a discovery service in the first terminal to the management entity, so that the management entity sends the identity of the first terminal and the identity of the application using the discovery service in the first terminal to the server and when the server verifies, according to the identity of the first terminal and the identity of the application using the discovery service in the first terminal, that the first terminal is authorized to discover the second terminal and that the application is authorized to use a discovery function, sends the second request to the base station.

In an eighth possible implementation manner of the first aspect, the acquiring, by a first terminal, a discovery resource includes receiving, by the first terminal, system information sent by the base station; and resolving, by the first terminal, the discovery resource included in the system information; where the discovery resource includes a discovery resource of a serving cell of the first terminal; or the discovery resource includes a discovery resource of a serving cell of the first terminal and a discovery resource of a cell adjacent to the serving cell.

In a ninth possible implementation manner of the first aspect, the acquiring, by the first terminal, the service identity of the second terminal according to the second message includes determining that the service identity in the second message and compliant with a predetermined condition is the service identity of the second terminal; where the predetermined condition includes at least one of the following conditions: a signal strength of the second message is greater than or equal to a predetermined strength threshold; or a type of the second terminal included in the second message complies with a predetermined type; or an application description included in the second message complies with a predetermined application description.

In a tenth possible implementation manner of the first aspect, before the monitoring, by the first terminal according to the discovery resource, a second message sent by at least one second terminal, the method further includes sending a first message, so that the second terminal sends the second message according to the first message after receiving the first message.

According to a second aspect, a terminal discovery method is provided, and the method includes sending, by a second terminal, a second message including a service identity of the second terminal, so that a first terminal acquires the service identity of the second terminal according to the second message and acquires description information of the second terminal from a server according to the service identity of the second terminal.

In a first possible implementation manner of the second aspect, before the sending, by a second terminal, a second message including a service identity of the second terminal, the method further includes sending, by the second terminal, a third request to a management entity, so that the management entity sends a fourth request to a base station; or sending, by the second terminal, a fifth request to the server, so that the server sends a sixth request to a management entity, and the management entity sends a fourth request to a base station; and receiving, by the second terminal, a discovered resource sent by the base station; or receiving, by the second terminal, a discovered resource that is sent by the base station to the management entity and sent by the management entity to the second terminal, where the discovered resource is a resource that is allocated by the base station according to the fourth request; and the sending, by a second terminal, a second message including a service identity of the second terminal includes sending, by the second terminal according to the discovered resource, the second message including the service identity of the second terminal.

With reference to the first possible implementation manner of the second aspect, in a second possible implementation manner of the second aspect, the receiving, by the second terminal, a discovered resource sent by the base station includes receiving, by the second terminal, the discovered resource that is sent by the base station by using an RRC message, where the discovered resource is the resource that the base station allocates after receiving the fourth request; where the fourth request is an S1-AP message including a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal.

With reference to the first possible implementation manner of the second aspect, in a third possible implementation manner of the second aspect, the receiving, by the second terminal, a discovered resource that is sent by the base station to the management entity and sent by the management entity to the second terminal includes receiving, by the second terminal, the discovered resource that is sent by the management entity by using an NAS message, where the discovered resource is the discovered resource that the base station sends to the management entity by using a container after receiving the fourth request; where the fourth request is an S1-AP message including a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity.

With reference to the first possible implementation manner of the second aspect, in a fourth possible implementation manner of the second aspect, the sending, by the second terminal, a third request to a management entity includes sending, by the second terminal, the third request including an identity of the second terminal to the management entity, so that the management entity sends the identity of the second terminal to the server and when the server verifies, according to the identity of the second terminal, that the second terminal is authorized to be discovered, sends the fourth request to the base station.

With reference to the first possible implementation manner of the second aspect, in a fifth possible implementation manner of the second aspect, the sending, by the second terminal, a third request to a management entity includes sending, by the second terminal, the third request including an identity of the second terminal and an identity of an application using a discovered service in the second terminal to the management entity, so that the management entity sends the identity of the second terminal and the identity of the application using the discovered service in the second terminal to the server and when the server verifies, according to the identity of the second terminal, that the second terminal is authorized to be discovered and that the application is authorized to use a discovered function, sends the fourth request to the base station.

With reference to the first possible implementation manner of the second aspect, in a sixth possible implementation manner of the second aspect, the sending, by the second terminal, a fifth request to the server, so that the server sends a sixth request to the management entity includes sending, by the second terminal, the fifth request including an identity of the second terminal to the server, so that the server sends the sixth request to the management entity when the server verifies, according to the identity of the second terminal, that the second terminal is authorized to be discovered.

With reference to the first possible implementation manner of the second aspect, in a seventh possible implementation manner of the second aspect, the sending, by the second terminal, a fifth request to the server, so that the server sends a sixth request to the management entity includes sending, by the second terminal, the fifth request including an identity of the second terminal and an identity of an application using a discovered service in the second terminal to the server, so that the server sends the sixth request to the management entity when the server verifies, according to the identity of the second terminal, that the second terminal is authorized to be discovered and that the application is authorized to use a discovered function.

With reference to the first possible implementation manner of the second aspect, in an eighth possible implementation manner of the second aspect, the sending, by the second terminal, a fifth request to the server, so that the server sends a sixth request to the management entity, and the fourth request is sent to the base station includes sending, by the second terminal, the fifth request including a globally unique temporary identity (GUTI) of the second terminal to the server, so that the server sends the sixth request to the management entity according to the GUTI.

With reference to the first possible implementation manner of the second aspect, in a ninth possible implementation manner of the second aspect, the sending, by a second terminal, a second message including a service identity of the second terminal includes sending, by the second terminal, the second message immediately after receiving the discovered resource; or receiving, by the second terminal, a first message sent by the first terminal, and sending the second message according to the first message.

According to a third aspect, a terminal discovery method is provided, and the method includes sending, by a second terminal, a third request to a management entity, so that the management entity sends a fourth request to a base station; or sending, by the second terminal, a fifth request to a server, so that the server sends a sixth request to a management entity, and the management entity sends a fourth request to a base station; and receiving, by the second terminal, a discovered resource sent by the base station; or receiving, by the second terminal, a discovered resource that is sent by the base station to the management entity and sent by the management entity to the second terminal, where the discovered resource is a resource that is allocated by the base station according to the fourth request.

In a first possible implementation manner of the third aspect, the receiving, by the second terminal, a discovered resource sent by the base station includes receiving, by the second terminal, the discovered resource that is sent by the base station by using an RRC message, where the discovered resource is the resource that the base station allocates after receiving the fourth request; where the fourth request is an S1-AP message including a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal.

In a second possible implementation manner of the third aspect, the receiving, by the second terminal, a discovered resource that is sent by the base station to the management entity and sent by the management entity to the second terminal includes receiving, by the second terminal, the discovered resource that is sent by the management entity by using an NAS message, where the discovered resource is the discovered resource that the base station sends to the management entity by using a container after receiving the fourth request; where the fourth request is an S1-AP message including a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity.

In a third possible implementation manner of the third aspect, the sending, by the second terminal, a fifth request to a server, so that the server sends a sixth request to the management entity, and the fourth request is sent to the base station includes sending, by the second terminal, the fifth request including a GUTI of the second terminal to the server, so that the server sends the sixth request to the management entity according to the GUTI.

According to a fourth aspect, a terminal discovery method is provided, and the method includes receiving, by a server, a service identity of a second terminal sent by a first terminal, where the service identity of the second terminal is acquired by the first terminal according to a second message that is sent by the at least one second terminal and that includes the service identity of the second terminal; acquiring, by the server, description information of the second terminal according to the service identity of the second terminal; and providing, by the server, the acquired description information of the second terminal for the first terminal.

In a first possible implementation manner of the fourth aspect, the receiving, by a server, a service identity of a second terminal sent by a first terminal includes receiving, by the server, the service identity of the second terminal sent by the first terminal; or receiving, by the server, the service identity of the second terminal sent by a management entity, where the service identity of the second terminal is a service identity sent by the first terminal to the management entity.

In a second possible implementation manner of the fourth aspect, the acquiring, by the server, description information of the second terminal according to the service identity of the second terminal includes locally querying, by the server, the description information of the second terminal corresponding to the service identity of the second terminal; or acquiring, by the server according to the service identity of the second terminal, the description information of the second terminal from a home server of the second terminal or a server that currently services the second terminal.

In a third possible implementation manner of the fourth aspect, the providing, by the server, the acquired description information of the second terminal for the first terminal includes sending, by the server, the acquired description information of the second terminal to the first terminal; or sending, by the server, the acquired description information of the second terminal to a management entity, so that the management entity sends the description information of the second terminal to the first terminal.

In a fourth possible implementation manner of the fourth aspect, before the acquiring, by the server, description information of the second terminal according to the service identity of the second terminal, the method further includes receiving, by the server, a service identity of the first terminal sent by the first terminal; or receiving, by the server, a service identity of the first terminal sent by a management entity, where the service identity of the first terminal is sent by the first terminal to the management entity; verifying, by the server according to the service identity of the first terminal, whether the first terminal is authorized to discover the second terminal; and if a verification result is that the first terminal is authorized to discover the second terminal, executing, by the server, the step of acquiring the description information of the second terminal according to the service identity of the second terminal.

In a fifth possible implementation manner of the fourth aspect, before the receiving, by a server, a service identity of a second terminal sent by a first terminal, the method further includes receiving, by the server, an identity of the first terminal sent by a management entity, where the identity of the first terminal is an identity included in a first request that is sent by the first terminal to the management entity; verifying, by the server according to the identity of the first terminal, whether the first terminal is authorized to discover the second terminal; and if a verification result is that the first terminal is authorized to discover the second terminal, feeding back, by the server, an indication indicating that the first terminal is authorized to discover the second terminal, to the management entity, so that the management entity sends a second request to a base station after receiving the indication; where the first request is used to request to acquire a discovery resource, the second request is used to request the base station to acquire the discovery resource and send the discovery resource to the first terminal, and the discovery resource is a resource used when the first terminal monitors the second message.

In a sixth possible implementation manner of the fourth aspect, before the receiving, by a server, a service identity of a second terminal sent by a first terminal, the method further includes receiving, by the server, an identity of the first terminal and an identity of an application using a discovery service in the first terminal that are sent by a management entity, where the identity of the first terminal and the identity of the application using the discovery service in the first terminal are identities included in a first request that is sent by the first terminal to the management entity; verifying, by the server according to the identity of the first terminal, whether the first terminal is authorized to discover the second terminal, and verifying, according to the identity of the application using the discovery service in the first terminal, whether the application is authorized to use a discovery function; and if a verification result is that the first terminal is authorized to discover the second terminal and that the application is authorized to use the discovery function, feeding back, by the server, an indication indicating that the first terminal is authorized to discover the second terminal and that the application is authorized to use the discovery function, to the management entity, so that the management entity sends a second request to a base station after receiving the indication; where the first request is used to request to acquire a discovery resource, the second request is used to request the base station to acquire the discovery resource and send the discovery resource to the first terminal, and the discovery resource is a resource used when the first terminal monitors the second message.

In a seventh possible implementation manner of the fourth aspect, before the receiving, by a server, a service identity of a second terminal sent by a first terminal, the method further includes receiving, by the server, an identity of the second terminal sent by a management entity, where the identity of the second terminal is an identity included in a third request that is sent by the second terminal to the management entity; verifying, by the server according to the identity of the second terminal, whether the second terminal is authorized to be discovered; and if a verification result is that the second terminal is authorized to be discovered, feeding back, by the server, an indication indicating that the second terminal is authorized to be discovered, to the management entity, so that the management entity sends a fourth request to a base station after receiving the indication; where the third request is used to request to acquire a discovered resource, the fourth request is used to request the base station to allocate and send the discovered resource to the second terminal, and the discovered resource is a resource used when the second terminal sends the second message.

In an eighth possible implementation manner of the fourth aspect, before the receiving, by a server, a service identity of a second terminal sent by a first terminal, the method further includes receiving, by the server, an identity of the second terminal and an identity of an application using a discovered service in the second terminal that are sent by a management entity, where the identity of the second terminal and the identity of the application using the discovered service in the second terminal are identities included in a third request that is sent by the second terminal to the management entity; verifying, by the server according to the identity of the second terminal, whether the second terminal is authorized to be discovered, and verifying, according to the identity of the application using the discovered service in the second terminal, whether the application is authorized to use a discovered function; and if a verification result is that the second terminal is authorized to be discovered and that the application is authorized to use the discovered function, feeding back, by the server, an indication indicating that the second terminal is authorized to be discovered and that the application is authorized to use the discovered function, to the management entity, so that the management entity sends a fourth request to a base station after receiving the indication; where the third request is used to request to acquire a discovered resource, the fourth request is used to request the base station to allocate and send the discovered resource to the second terminal, and the discovered resource is a resource used when the second terminal sends the second message.

In a ninth possible implementation manner of the fourth aspect, before the receiving, by a server, a service identity of a second terminal sent by a first terminal, the method further includes receiving, by the server, a fifth request sent by the second terminal; and sending, by the server, a sixth request to a management entity, so that the management entity sends a fourth request to a base station; where the fifth request is used to request to acquire a discovered resource, the fourth request is used to request the base station to allocate and send the discovered resource to the second terminal, and the discovered resource is a resource used when the second terminal sends the second message.

With reference to the ninth possible implementation manner of the fourth aspect, in a tenth possible implementation manner of the fourth aspect, the fifth request includes a GUTI of the second terminal; and the sending, by the server, a sixth request to a management entity includes sending, by the server, the sixth request to the management entity according to the GUTI.

With reference to the ninth possible implementation manner of the fourth aspect, in an eleventh possible implementation manner of the fourth aspect, the fifth request includes an identity of the second terminal, and before the sending, by the server, a sixth request to a management entity, the method further includes verifying, by the server according to the identity of the second terminal, whether the second terminal is authorized to be discovered; and if a verification result is that the second terminal is authorized to be discovered, executing, by the server, the step of sending the sixth request to the management entity.

With reference to the ninth possible implementation manner of the fourth aspect, in a twelfth possible implementation manner of the fourth aspect, the fifth request includes an identity of the second terminal and an identity of an application using a discovered service in the second terminal, and before the sending, by the server, a sixth request to a management entity, the method further includes verifying, by the server according to the identity of the second terminal, whether the second terminal is authorized to be discovered, and verifying, according to the identity of the application using the discovered service in the second terminal, whether the application is authorized to use a discovered function; and if a verification result is that the second terminal is authorized to be discovered and that the application is authorized to use the discovered function, executing, by the server, the step of sending the sixth request to the management entity.

According to a fifth aspect, a terminal discovery method is provided, and the method includes receiving, by a server, a fifth request sent by a second terminal; and sending, by the server, a sixth request to a management entity, so that the management entity sends a fourth request to a base station; where the fifth request is used to request to acquire a discovered resource, the fourth request is used to request the base station to allocate and send the discovered resource to the second terminal, and the discovered resource is a resource used when the second terminal sends a second message.

In a first possible implementation manner of the fifth aspect, the fifth request includes a GUTI of the second terminal; and the sending, by the server, a sixth request to a management entity includes sending, by the server, the sixth request to the management entity according to the GUTI.

According to a sixth aspect, a terminal discovery method is provided, and the method includes providing, by a base station, a discovery resource for a first terminal, so that the first terminal monitors, according to the discovery resource, a second message sent by at least one second terminal.

In a first possible implementation manner of the sixth aspect, the providing, by a base station, a discovery resource for a first terminal includes receiving, by the base station, a second request sent by a management entity; acquiring, by the base station, the discovery resource; and sending, by the base station, the discovery resource to the first terminal; or sending, by the base station, the discovery resource to the management entity, so that the management entity sends the discovery resource to the first terminal.

With reference to the first possible implementation manner of the sixth aspect, in a second possible implementation manner of the sixth aspect, the receiving, by the base station, a second request sent by a management entity includes receiving, by the base station, an S1-AP message sent by the management entity, where the S1-AP message includes a first indication, where the first indication is used to instruct the base station to send the discovery resource to the first terminal or used to instruct the base station to acquire the discovery resource and send the discovery resource to the first terminal; and the sending, by the base station, the discovery resource to the first terminal includes sending, by the base station, the discovery resource to the first terminal by using an RRC message.

With reference to the first possible implementation manner of the sixth aspect, in a third possible implementation manner of the sixth aspect, the receiving, by the base station, a second request sent by a management entity includes receiving, by the base station, an S1-AP message sent by the management entity, where the S1-AP message includes a second indication, where the second indication is used to instruct the base station to send the discovery resource to the management entity or used to instruct the base station to acquire the discovery resource and send the discovery resource to the management entity; and the sending, by the base station, the discovery resource to the management entity, so that the management entity sends the discovery resource to the first terminal includes sending, by the base station, the discovery resource to the management entity by using a container, so that the management entity sends the discovery resource to the first terminal by using an NAS message. In a fourth possible implementation manner of the sixth aspect, the providing, by a base station, a discovery resource for a first terminal includes acquiring, by the base station, the discovery resource; and sending, by the base station, system information including the discovery resource in a cell in which the first terminal is located.

With reference to the first possible implementation manner or fourth possible implementation manner of the sixth aspect, in a fifth possible implementation manner of the sixth aspect, the acquiring, by the base station, the discovery resource includes locally querying, by the base station, a discovery resource of a current serving cell of the first terminal; or locally querying, by the base station, a discovery resource of a current serving cell of the first terminal and a discovery resource of a cell adjacent to the serving cell; or locally querying, by the base station, a discovery resource of a current serving cell of the first terminal, and querying, from a neighboring base station through an X2 interface, a discovery resource of a cell adjacent to the serving cell.

In a sixth possible implementation manner of the sixth aspect, the method further includes receiving, by the base station, a fourth request sent by a management entity; allocating, by the base station, a discovered resource to the second terminal according to the fourth request, where the discovered resource is a resource used when the second terminal sends the second message; and sending, by the base station, the discovered resource to the second terminal; or sending, by the base station, the discovered resource to the management entity, so that the management entity sends the discovered resource to the second terminal.

With reference to the sixth possible implementation manner of the sixth aspect, in a seventh possible implementation manner of the sixth aspect, the receiving, by the base station, a fourth request sent by a management entity includes receiving, by the base station, an S1-AP message sent by the management entity, where the S1-AP message includes a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal; and the sending, by the base station, the discovered resource to the second terminal includes sending, by the base station, the discovered resource to the second terminal by using an RRC message.

With reference to the sixth possible implementation manner of the sixth aspect, in an eighth possible implementation manner of the sixth aspect, the receiving, by the base station, a fourth request sent by a management entity includes receiving, by the base station, an S1-AP message sent by the management entity, where the S1-AP message includes a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; and the sending, by the base station, the discovered resource to the management entity, so that the management entity sends the discovered resource to the second terminal includes sending, by the base station, the discovered resource to the management entity by using a container, so that the management entity sends the discovered resource to the second terminal by using an NAS message.

According to a seventh aspect, a terminal discovery method is provided, and the method includes receiving, by a base station, a fourth request sent by a management entity; allocating, by the base station, a discovered resource to a second terminal according to the fourth request, where the discovered resource is a resource used when the second terminal sends a second message; and sending, by the base station, the discovered resource to the second terminal; or sending, by the base station, the discovered resource to the management entity, so that the management entity sends the discovered resource to the second terminal.

In a first possible implementation manner of the seventh aspect, the receiving, by a base station, a fourth request sent by a management entity includes receiving, by the base station, an S1-AP message sent by the management entity, where the S1-AP message includes a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal; and the sending, by the base station, the discovered resource to the second terminal includes sending, by the base station, the discovered resource to the second terminal by using an RRC message.

In a second possible implementation manner of the seventh aspect, the receiving, by a base station, a fourth request sent by a management entity includes receiving, by the base station, an S1-AP message sent by the management entity, where the S1-AP message includes a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; and the sending, by the base station, the discovered resource to the management entity, so that the management entity sends the discovered resource to the second terminal includes sending, by the base station, the discovered resource to the management entity by using a container, so that the management entity sends the discovered resource to the second terminal by using an NAS message.

According to an eighth aspect, a terminal discovery method is provided, and the method includes receiving, by a management entity, a service identity of a second terminal sent by a first terminal, where the service identity of the second terminal is acquired by the first terminal according to a second message that is sent by the at least one second terminal and that includes the service identity of the second terminal; and sending, by the management entity, the service identity of the second terminal to a server, so that the server acquires description information of the second terminal according to the service identity of the second terminal and sends the description information of the second terminal to the first terminal; or sending, by the management entity, the service identity of the second terminal to the server, receiving description information of the second terminal sent by the server, and sending the description information of the second terminal to the first terminal, where the description information of the second terminal is acquired by the server according to the service identity of the second terminal.

In a first possible implementation manner of the eighth aspect, before the receiving, by a management entity, a service identity of a second terminal sent by a first terminal, the method further includes receiving, by the management entity, a first request sent by the first terminal; and sending, by the management entity, a second request to a base station, so that the base station sends a discovery resource to the first terminal according to the second request; or sending, by the management entity, a second request to a base station, and receiving a discovery resource that is sent by the base station according to the second request, and sending the discovery resource to the first terminal; where the discovery resource is a resource used when the first terminal monitors the second message.

With reference to the first possible implementation manner of the eighth aspect, in a second possible implementation manner of the eighth aspect, the sending, by the management entity, a second request to a base station, so that the base station sends a discovery resource to the first terminal according to the second request includes sending, by the management entity, an S1-AP message to the base station, where the S1-AP message includes a first indication, where the first indication is used to instruct the base station to send the discovery resource to the first terminal or used to instruct the base station to acquire the discovery resource and send the discovery resource to the first terminal, so that the base station sends the discovery resource to the first terminal by using an RRC message.

With reference to the first possible implementation manner of the eighth aspect, in a third possible implementation manner of the eighth aspect, the sending, by the management entity, a second request to a base station, and receiving a discovery resource that is sent by the base station according to the second request, and sending the discovery resource to the first terminal, include sending, by the management entity, an S1-AP message to the base station, where the S1-AP message includes a second indication, where the second indication is used to instruct the base station to send the discovery resource to the management entity or used to instruct the base station to acquire the discovery resource and send the discovery resource to the management entity; receiving, by the management entity, the discovery resource that is sent by the base station by using a container; and sending, by the management entity, the discovery resource to the first terminal by using an NAS message.

With reference to the first possible implementation manner of the eighth aspect, in a fourth possible implementation manner of the eighth aspect, the first request includes an identity of the first terminal, and before the sending, by the management entity, a second request to a base station, the method further includes sending, by the management entity, the identity of the first terminal to the server, so that the server verifies, according to the identity of the first terminal, whether the first terminal is authorized to discover the second terminal; and receiving, by the management entity, an indication fed back by the server and indicating that the first terminal is authorized to discover the second terminal; the sending, by the management entity, a second request to a base station includes sending, by the management entity, the second request to the base station after receiving the indication fed back by the server and indicating that the first terminal is authorized to discover the second terminal.

With reference to the first possible implementation manner of the eighth aspect, in a fifth possible implementation manner of the eighth aspect, the first request includes an identity of the first terminal and an identity of an application using a discovery service in the first terminal, and before the sending, by the management entity, a second request to a base station, the method further includes sending, by the management entity, the identity of the first terminal and the identity of the application using the discovery service in the first terminal to the server, so that the server verifies, according to the identity of the first terminal and the identity of the application using the discovery service in the first terminal, whether the first terminal is authorized to discover the second terminal and whether the application is authorized to use a discovery function; and receiving, by the management entity, an indication fed back by the server and indicating that the first terminal is authorized to discover the second terminal and that the application is authorized to use the discovery function; the sending, by the management entity, a second request to a base station includes sending, by the management entity, the second request to the base station after receiving the indication fed back by the server and indicating that the first terminal is authorized to discover the second terminal and that the application is authorized to use the discovery function.

In a sixth possible implementation manner of the eighth aspect, before the receiving, by a management entity, an identity of a second terminal sent by a first terminal, the method further includes receiving, by the management entity, a third request sent by the second terminal; or receiving, by the management entity, a sixth request sent by the server; and sending, by the management entity, a fourth request to a base station, so that the base station allocates and sends a discovered resource to the second terminal according to the fourth request; or sending, by the management entity, a fourth request to a base station, and receiving a discovered resource that is allocated and sent by the base station according to the fourth request, and sending the discovered resource to the second terminal; where the discovered resource is a resource used when the second terminal sends the second message.

With reference to the sixth possible implementation manner of the eighth aspect, in a seventh possible implementation manner of the eighth aspect, the sending, by the management entity, a fourth request to a base station, so that the base station allocates and sends a discovered resource to the second terminal according to the fourth request includes sending, by the management entity, an S1-AP message to the base station, where the S1-AP message includes a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal, so that the base station sends the discovered resource to the second terminal by using an RRC message.

With reference to the sixth possible implementation manner of the eighth aspect, in an eighth possible implementation manner of the eighth aspect, the sending, by the management entity, a fourth request to the base station, and receiving a discovered resource that is allocated and sent by the base station according to the fourth request, and sending the discovered resource to the second terminal, include sending, by the management entity, an S1-AP message to the base station, where the S1-AP message includes a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; receiving, by the management entity, the discovered resource that is sent by the base station by using a container; and sending, by the management entity, the discovered resource to the second terminal by using an NAS message.

With reference to the sixth possible implementation manner of the eighth aspect, in a ninth possible implementation manner of the eighth aspect, the third request includes an identity of the second terminal, and before the sending, by the management entity, a fourth request to a base station, the method further includes sending, by the management entity, the identity of the second terminal to the server, so that the server verifies, according to the identity of the second terminal, whether the second terminal is authorized to be discovered; and receiving, by the management entity, an indication fed back by the server and indicating that the second terminal is authorized to be discovered; where the sending, by the management entity, a fourth request to a base station includes sending, by the management entity, the fourth request to the base station after the indication fed back by the server and indicating that the second terminal is authorized to be discovered is received.

With reference to the sixth possible implementation manner of the eighth aspect, in a tenth possible implementation manner of the eighth aspect, the third request includes an identity of the second terminal and an identity of an application using a discovered service in the second terminal, and before the sending, by the management entity, a fourth request to a base station, the method further includes sending, by the management entity, the identity of the second terminal and the identity of the application using the discovered service in the second terminal to the server, so that the server verifies, according to the identity of the second terminal and the identity of the application using the discovered service in the second terminal, whether the second terminal is authorized to be discovered and whether the application is authorized to use a discovered function; and receiving, by the management entity, an indication fed back by the server and indicating that the second terminal is authorized to be discovered and that the application is authorized to use the discovered function; where the sending, by the management entity, a fourth request to a base station includes sending, by the management entity, the fourth request to the base station after the indication fed back by the server and indicating that the second terminal is authorized to be discovered and that the application is authorized to use the discovered function is received.

With reference to the eighth aspect, in a tenth possible implementation manner of the eighth aspect, the method further includes receiving, by the management entity, a service identity of the first terminal sent by the first terminal; and sending, by the management entity, the service identity of the first terminal to the server, so that the server acquires the description information of the second terminal according to the service identity of the second terminal after the server verifies, according to the service identity of the first terminal, that the first terminal is authorized to discover the second terminal.

According to a ninth aspect, a terminal discovery method is provided, and the method includes receiving, by a management entity, a third request sent by a second terminal; or receiving, by a management entity, a sixth request sent by a server; and sending, by the management entity, a fourth request to a base station, so that the base station allocates and sends a discovered resource to the second terminal according to the fourth request; or sending, by the management entity, a fourth request to a base station, and receiving a discovered resource that is allocated and sent by the base station according to the fourth request, and sending the discovered resource to the second terminal; where the discovered resource is a resource used when the second terminal sends a second message.

In a first possible implementation manner of the ninth aspect, the sending, by the management entity, a fourth request to a base station, so that the base station allocates and sends a discovered resource to the second terminal according to the fourth request includes sending, by the management entity, an S1-AP message to the base station, where the S1-AP message includes a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal, so that the base station sends the discovered resource to the second terminal by using an RRC message.

In a second possible implementation manner of the ninth aspect, the sending, by the management entity, a fourth request to the base station, and receiving a discovered resource that is allocated and sent by the base station according to the fourth request, and sending the discovered resource to the second terminal, include sending, by the management entity, an S1-AP message to the base station, where the S1-AP message includes a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; receiving, by the management entity, the discovered resource that is sent by the base station by using a container; and sending, by the management entity, the discovered resource to the second terminal by using an NAS message.

According to a tenth aspect, a first terminal is provided, and the first terminal includes a discovery resource acquiring module configured to acquire a discovery resource; a message monitoring module configured to monitor, according to the discovery resource acquired by the discovery resource acquiring module, a second message sent by at least one second terminal, where the second message includes a service identity of the second terminal; a service identity acquiring module configured to acquire the service identity of the second terminal according to the second message monitored by the message monitoring module; and a description information acquiring module configured to acquire description information of the second terminal from a server according to the service identity of the second terminal acquired by the service identity acquiring module.

In a first possible implementation manner of the tenth aspect, the description information acquiring module includes a first identity sending unit configured to send the service identity of the second terminal to the server; a second identity sending unit configured to send the service identity of the second terminal to a management entity, so that the management entity sends the service identity of the second terminal to the server; a first information receiving unit configured to receive the description information of the second terminal sent by the server, where the description information of the second terminal is information that is acquired and sent by the server according to the service identity of the second terminal; and a second information receiving unit configured to receive the description information of the second terminal sent by the management entity, where the description information of the second terminal is information that is acquired by the server according to the service identity of the second terminal and sent to the management entity.

With reference to the first possible implementation manner of the tenth aspect, in a second possible implementation manner of the tenth aspect, the first terminal further includes a first identity sending module configured to send a service identity of the first terminal to the server before the first information receiving unit receives the description information of the second terminal sent by the server or before the second information receiving unit receives the description information of the second terminal sent by the management entity, so that the server acquires the description information of the second terminal according to the service identity of the second terminal after the server verifies, according to the service identity of the first terminal, that the first terminal is authorized to discover the second terminal; and a second identity sending module configured to send the service identity of the first terminal to the management entity before the first information receiving unit receives the description information of the second terminal sent by the server or before the second information receiving unit receives the description information of the second terminal sent by the management entity, so that the management entity sends the service identity of the first terminal to the server, and the server acquires the description information of the second terminal according to the service identity of the second terminal after the server verifies, according to the service identity of the first terminal, that the first terminal is authorized to discover the second terminal.

In a third possible implementation manner of the tenth aspect, the discovery resource acquiring module includes a first request sending unit configured to send a first request to a management entity, so that the management entity sends a second request to a base station; a first discovery resource receiving unit configured to receive the discovery resource that is sent by the base station according to the second request; and a second discovery resource receiving unit configured to receive the discovery resource that is sent by the management entity, where the discovery resource is a discovery resource that is sent by the base station to the management entity according to the second request; where the discovery resource includes a discovery resource of a serving cell of the first terminal; or the discovery resource includes a discovery resource of a serving cell of the first terminal and a discovery resource of a cell adjacent to the serving cell.

With reference to the third possible implementation manner of the tenth aspect, in a fourth possible implementation manner of the tenth aspect, the first discovery resource receiving unit is configured to receive the discovery resource that is sent by the base station by using an RRC message, where the discovery resource is the discovery resource that the base station sends after receiving the second request; where the second request is an S1-AP message including a first indication, where the first indication is used to instruct the base station to send the discovery resource to the first terminal or used to instruct the base station to acquire the discovery resource and send the discovery resource to the first terminal.

With reference to the third possible implementation manner of the tenth aspect, in a fifth possible implementation manner of the tenth aspect, the second discovery resource receiving unit is configured to receive the discovery resource that is sent by the management entity by using an NAS message, where the discovery resource is the discovery resource that the base station sends to the management entity by using a container after receiving the second request; where the second request is an S1-AP message including a second indication, where the second indication is used to instruct the base station to send the discovery resource to the management entity or used to instruct the base station to acquire the discovery resource and send the discovery resource to the management entity.

With reference to the third possible implementation manner of the tenth aspect, in a sixth possible implementation manner of the tenth aspect, the first request sending unit is configured to send the first request including an identity of the first terminal to the management entity, so that the management entity sends the identity of the first terminal to the server and when the server verifies, according to the identity of the first terminal, that the first terminal is authorized to discover the second terminal, sends the second request to the base station.

With reference to the third possible implementation manner of the tenth aspect, in a seventh possible implementation manner of the tenth aspect, the first request sending unit is configured to send the first request including an identity of the first terminal and an identity of an application using a discovery service in the first terminal to the management entity, so that the management entity sends the identity of the first terminal and the identity of the application using the discovery service in the first terminal to the server and when the server verifies, according to the identity of the first terminal and the identity of the application using the discovery service in the first terminal, that the first terminal is authorized to discover the second terminal and that the application is authorized to use a discovery function, sends the second request to the base station.

In an eighth possible implementation manner of the tenth aspect, the discovery resource acquiring module includes a system information receiving unit configured to receive system information sent by a base station; and a discovery resource resolving unit configured to resolve the discovery resource included in the system information that is received by the system information receiving unit; where the discovery resource includes a discovery resource of a serving cell of the first terminal; or the discovery resource includes a discovery resource of a serving cell of the first terminal and a discovery resource of a cell adjacent to the serving cell.

In a ninth possible implementation manner of the tenth aspect, the service identity acquiring module is configured to determine that the service identity in the monitored second message and compliant with a predetermined condition is the service identity of the second terminal; where the predetermined condition includes at least one of the following conditions: a signal strength of the second message is greater than or equal to a predetermined strength threshold; or a type of the second terminal included in the second message complies with a predetermined type; or an application description included in the second message complies with a predetermined application description.

In a tenth possible implementation manner of the tenth aspect, the first terminal further includes a first message sending module configured to send a first message before the message monitoring module monitors, according to the discovery resource, the second message sent by the at least one second terminal, so that the second terminal sends the second message according to the first message after receiving the first message.

According to an eleventh aspect, a second terminal is provided, and the second terminal includes a second message sending module configured to send a second message including a service identity of the second terminal, so that a first terminal acquires the service identity of the second terminal according to the second message and acquires description information of the second terminal from a server according to the service identity of the second terminal.

In a first possible implementation manner of the eleventh aspect, the second terminal further includes a first request sending module configured to send a third request to a management entity before the second message sending module sends the second message including the service identity of the second terminal, so that the management entity sends a fourth request to a base station; a second request sending module configured to send a fifth request to the server before the second message sending module sends the second message including the service identity of the second terminal, so that the server sends a sixth request to a management entity, and the management entity sends a fourth request to a base station; a first discovered resource receiving module configured to receive a discovered resource sent by the base station, where the discovered resource is a resource that is allocated by the base station according to the fourth request; and a second discovered resource receiving module configured to receive a discovered resource that is sent by the base station to the management entity and sent by the management entity to the second terminal, where the discovered resource is the resource that is allocated by the base station according to the fourth request; where the second message sending module is configured to send, according to the discovered resource received by the first discovered resource receiving module or the second discovered resource receiving module, the second message including the service identity.

With reference to the first possible implementation manner of the eleventh aspect, in a second possible implementation manner of the eleventh aspect, the first discovered resource receiving module is configured to receive the discovered resource that is sent by the base station by using an RRC message, where the discovered resource is the resource that the base station allocates after receiving the fourth request; where the fourth request is an S1-AP message including a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal.

With reference to the first possible implementation manner of the eleventh aspect, in a third possible implementation manner of the eleventh aspect, the second discovered resource receiving module is configured to receive the discovered resource that is sent by the management entity by using an NAS message, where the discovered resource is the discovered resource that the base station sends to the management entity by using a container after receiving the fourth request; where the fourth request is an S1-AP message including a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity.

With reference to the first possible implementation manner of the eleventh aspect, in a fourth possible implementation manner of the eleventh aspect, the first request sending module is configured to send the third request including an identity of the second terminal to the management entity, so that the management entity sends the identity of the second terminal to the server and when the server verifies, according to the identity of the second terminal, that the second terminal is authorized to be discovered, sends the fourth request to the base station.

With reference to the first possible implementation manner of the eleventh aspect, in a fifth possible implementation manner of the eleventh aspect, the first request sending module is configured to send the third request including an identity of the second terminal and an identity of an application using a discovered service in the second terminal to the management entity, so that the management entity sends the identity of the second terminal and the identity of the application using the discovered service in the second terminal to the server and when the server verifies, according to the identity of the second terminal and the identity of the application using the discovered service in the second terminal, that the second terminal is authorized to be discovered and that the application is authorized to use a discovered function, sends the fourth request to the base station.

With reference to the first possible implementation manner of the eleventh aspect, in a sixth possible implementation manner of the eleventh aspect, the second request sending module is configured to send the fifth request including an identity of the second terminal to the server, so that the server sends the sixth request to the management entity when the server verifies, according to the identity of the second terminal, that the second terminal is authorized to be discovered.

With reference to the first possible implementation manner of the eleventh aspect, in a seventh implementation manner of the eleventh aspect, the second request sending module is configured to send the fifth request including an identity of the second terminal and an identity of an application using a discovered service in the second terminal to the server, so that the server sends the sixth request to the management entity when the server verifies, according to the identity of the second terminal, that the second terminal is authorized to be discovered and that the application is authorized to use a discovered function.

With reference to the first possible implementation manner of the eleventh aspect, in an eighth possible implementation manner of the eleventh aspect, the second request sending module is configured to send the fifth request including a GUTI of the second terminal to the server, so that the server sends the sixth request to the management entity according to the GUTI.

With reference to the third possible implementation manner of the eleventh aspect, in a ninth possible implementation manner of the eleventh aspect, the second message sending module includes a first message sending unit configured to send the second message immediately after the first discovered resource receiving module or the second discovered resource receiving module receives the discovered resource; a first message receiving unit configured to receive a first message sent by the first terminal; and a second message sending unit configured to send the second message according to the first message received by the first message receiving unit.

According to a twelfth aspect, a second terminal is provided, and the second terminal includes a first request sending module configured to send a third request to a management entity, so that the management entity sends a fourth request to a base station; a second request sending module configured to send a fifth request to a server, so that the server sends a sixth request to a management entity, and the management entity sends a fourth request to a base station; a first discovered resource receiving module configured to receive a discovered resource sent by the base station, where the discovered resource is a resource that is allocated by the base station according to the fourth request; and a second discovered resource receiving module configured to receive a discovered resource that is sent by the base station to the management entity and sent by the management entity to the second terminal, where the discovered resource is the resource that is allocated by the base station according to the fourth request.

In a first possible implementation manner of the twelfth aspect, the first discovered resource receiving module is configured to receive the discovered resource that is sent by the base station by using an RRC message, where the discovered resource is the resource that the base station allocates after receiving the fourth request; where the fourth request is an S1-AP message including a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal.

In a second possible implementation manner of the twelfth aspect, the second discovered resource receiving module is configured to receive the discovered resource that is sent by the management entity by using an NAS message, where the discovered resource is the discovered resource that the base station sends to the management entity by using a container after receiving the fourth request; where the fourth request is an S1-AP message including a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity.

In a third possible implementation manner of the twelfth aspect, the second request sending module is configured to send the fifth request including a GUTI of the second terminal to the server, so that the server sends the sixth request to the management entity according to the GUTI.

According to a thirteenth aspect, a server is provided, and the server includes a first identity receiving module configured to receive a service identity of a second terminal sent by a first terminal, where the service identity of the second terminal is acquired by the first terminal according to a second message that is sent by the at least one second terminal and that includes the service identity of the second terminal; an information acquiring module configured to acquire description information of the second terminal according to the service identity of the second terminal received by the first identity receiving module; and an information providing module configured to provide the description information of the second terminal acquired by the information acquiring module for the first terminal.

In a first possible implementation manner of the thirteenth aspect, the first identity receiving module includes a first identity receiving unit configured to receive the service identity of the second terminal sent by the first terminal; and a second identity receiving unit configured to receive the service identity of the second terminal sent by a management entity, where the service identity of the second terminal is a service identity sent by the first terminal to the management entity.

In a second possible implementation manner of the thirteenth aspect, the information acquiring module includes a first querying unit configured to locally query the description information of the second terminal corresponding to the service identity of the second terminal; and a second querying unit configured to acquire, according to the service identity of the second terminal, the description information of the second terminal from a home server of the second terminal or a server that currently services the second terminal.

In a third possible implementation manner of the thirteenth aspect, the information providing module includes a first information sending unit configured to send the description information of the second terminal acquired by the information acquiring module to the first terminal; and a second information sending unit configured to send the description information of the second terminal acquired by the information acquiring module to a management entity, so that the management entity sends the description information of the second terminal to the first terminal.

In a fourth possible implementation manner of the thirteenth aspect, the server further includes a second identity receiving module configured to receive, before the information acquiring module acquires the description information of the second terminal corresponding to the service identity of the second terminal, a service identity of the first terminal sent by the first terminal; a third identity receiving module configured to receive, before the information acquiring module acquires the description information of the second terminal corresponding to the service identity of the second terminal, the service identity of the first terminal sent by a management entity, where the service identity of the first terminal is sent by the first terminal to the management entity; and a first verifying module configured to verify, according to the service identity of the first terminal received by the second identity receiving module or the third identity receiving module, whether the first terminal is authorized to discover the second terminal; where the information acquiring module is configured to execute, if a verification result of the first verifying module is that the first terminal is authorized to discover the second terminal, the step of acquiring the description information of the second terminal according to the service identity of the second terminal.

In a fifth possible implementation manner of the thirteenth aspect, the server further includes a fourth identity receiving module configured to receive, before the first identity receiving module receives the service identity of the second terminal sent by the first terminal, an identity of the first terminal sent by a management entity, where the identity of the first terminal is an identity included in a first request that is sent by the first terminal to the management entity; a second verifying module configured to verify, according to the identity of the first terminal, whether the first terminal is authorized to discover the second terminal; and a first indication feedback module configured to feed back, if a verification result of the second verifying module is that the first terminal is authorized to discover the second terminal, an indication indicating that the first terminal is authorized to discover the second terminal, to the management entity, so that the management entity sends a second request to a base station after receiving the indication; where the first request is used to request to acquire a discovery resource, the second request is used to request the base station to acquire the discovery resource and send the discovery resource to the first terminal, and the discovery resource is a resource used when the first terminal monitors the second message.

In a sixth possible implementation manner of the thirteenth aspect, the server further includes a fifth identity receiving module configured to receive, before the first identity receiving module receives the service identity of the second terminal sent by the first terminal, an identity of the first terminal and an identity of an application using a discovery service in the first terminal that are sent by a management entity, where the identity of the first terminal and the identity of the application using the discovery service in the first terminal are identities included in a first request that is sent by the first terminal to the management entity; a third verifying module configured to verify, according to the identity of the first terminal, whether the first terminal is authorized to discover the second terminal; a fourth verifying module configured to verify, according to the identity of the application using the discovery service in the first terminal, whether the application is authorized to use a discovery function; and a second indication feedback module configured to feed back, if a verification result of the third verifying module is that the first terminal is authorized to discover the second terminal and a verification result of the fourth verifying module is that the application is authorized to use the discovery function, an indication indicating that the first terminal is authorized to discover the second terminal and that the application is authorized to use the discovery function, to the management entity, so that the management entity sends a second request to a base station after receiving the indication; where the first request is used to request to acquire a discovery resource, the second request is used to request the base station to acquire the discovery resource and send the discovery resource to the first terminal, and the discovery resource is a resource used when the first terminal monitors the second message.

In a seventh possible implementation manner of the thirteenth aspect, the server further includes a sixth identity receiving module configured to receive, before the first identity receiving module receives the service identity of the second terminal sent by the first terminal, an identity of the second terminal sent by a management entity, where the identity of the second terminal is an identity included in a third request that is sent by the second terminal to the management entity; a fifth verifying module configured to verify, according to the identity of the second terminal, whether the second terminal is authorized to be discovered; and a third indication feedback module configured to feed back, if a verification result of the fifth verifying module is that the second terminal is authorized to be discovered, an indication indicating that the second terminal is authorized to be discovered, to the management entity, so that the management entity sends a fourth request to a base station after receiving the indication; where the third request is used to request to acquire a discovered resource, the fourth request is used to request the base station to allocate and send the discovered resource to the second terminal, and the discovered resource is a resource used when the second terminal sends the second message.

In an eighth possible implementation manner of the thirteenth aspect, the server further includes a seventh identity receiving module configured to receive, before the first identity receiving module receives the service identity of the second terminal sent by the first terminal, an identity of the second terminal and an identity of an application using a discovered service in the second terminal that are sent by a management entity, where the identity of the second terminal and the identity of the application using the discovered service in the second terminal are identities included in a third request that is sent by the second terminal to the management entity; a sixth verifying module configured to verify, according to the identity of the second terminal, whether the second terminal is authorized to be discovered; a seventh verifying module configured to verify, according to the identity of the application using the discovered service in the second terminal, whether the application is authorized to use a discovered function; and a fourth indication feedback module configured to feed back, if a verification result of the sixth verifying module is that the second terminal is authorized to be discovered and a verification result of the seventh verifying module is that the application is authorized to use the discovered function, an indication indicating that the second terminal is authorized to be discovered and that the application is authorized to use the discovered function, to the management entity, so that the management entity sends a fourth request to a base station after receiving the indication; where the third request is used to request to acquire a discovered resource, the fourth request is used to request the base station to allocate and send the discovered resource to the second terminal, and the discovered resource is a resource used when the second terminal sends the second message.

In a ninth possible implementation manner of the thirteenth aspect, the server further includes a first request receiving module configured to receive, before the first identity receiving module receives the service identity of the second terminal sent by the first terminal, a fifth request sent by the second terminal; and a third request sending module configured to send a sixth request to a management entity, so that the management entity sends a fourth request to a base station; where the fifth request is used to request to acquire a discovered resource, the fourth request is used to request the base station to allocate and send the discovered resource to the second terminal, and the discovered resource is a resource used when the second terminal sends the second message.

With reference to the ninth possible implementation manner of the thirteenth aspect, in a tenth possible implementation manner of the thirteenth aspect, the fifth request includes a GUTI of the second terminal; and the third request sending module is configured to send the sixth request to the management entity according to the GUTI.

With reference to the ninth possible implementation manner of the thirteenth aspect, in an eleventh possible implementation manner of the thirteenth aspect, the fifth request includes an identity of the second terminal, and the server further includes an eighth verifying module configured to verify, according to the identity of the second terminal before the third request sending module sends the sixth request to the management entity, whether the second terminal is authorized to be discovered; where the third request sending module is configured to execute, if a verification result of the eighth verifying module is that the second terminal is authorized to be discovered, the step of sending the sixth request to the management entity.

With reference to the ninth possible implementation manner of the thirteenth aspect, in a twelfth possible implementation manner of the thirteenth aspect, the fifth request includes an identity of the second terminal and an identity of an application using a discovered service in the second terminal, and the server further includes a ninth verifying module configured to verify, according to the identity of the second terminal before the third request sending module sends the sixth request to the management entity, whether the second terminal is authorized to be discovered; and a tenth verifying module configured to verify, according to the identity of the application using the discovered service in the second terminal, before the third request sending module sends the sixth request to the management entity, whether the application is authorized to use a discovered function; where the third request sending module is configured to execute, if a verification result of the ninth verifying module is that the second terminal is authorized to be discovered and a verification result of the tenth verifying module is that the application is authorized to use the discovered function, the step of sending the sixth request to the management entity.

According to a fourteenth aspect, a server is provided, and the server includes a first request receiving module configured to receive a fifth request sent by a second terminal; and a third request sending module configured to send a sixth request to a management entity, so that the management entity sends a fourth request to a base station; where the fifth request is used to request to acquire a discovered resource, the fourth request is used to request the base station to allocate and send the discovered resource to the second terminal, and the discovered resource is a resource used when the second terminal sends a second message.

In a first possible implementation manner of the fourteenth aspect, the fifth request includes a GUTI of the second terminal; and the third request sending module is configured to send the sixth request to the management entity according to the GUTI.

According to a fifteenth aspect, a base station is provided, and the base station includes a discovery resource providing module configured to provide a discovery resource for a first terminal, so that the first terminal monitors, according to the discovery resource, a second message sent by at least one second terminal.

In a first possible implementation manner of the fifteenth aspect, the discovery resource providing module includes a first request receiving unit configured to receive a second request sent by a management entity; a first acquiring unit configured to acquire the discovery resource; a first discovery resource sending unit configured to send the discovery resource acquired by the first acquiring unit to the first terminal; and a second discovery resource sending unit configured to send the discovery resource acquired by the first acquiring unit to the management entity, so that the management entity sends the discovery resource to the first terminal.

With reference to the first possible implementation manner of the fifteenth aspect, in a second possible implementation manner of the fifteenth aspect, the first request receiving unit is configured to receive an S1-AP message sent by the management entity, where the S1-AP message includes a first indication, where the first indication is used to instruct the base station to send the discovery resource to the first terminal or used to instruct the base station to acquire the discovery resource and send the discovery resource to the first terminal; and the first discovery resource sending unit is configured to send the discovery resource to the first terminal by using an RRC message.

With reference to the first possible implementation manner of the fifteenth aspect, in a third possible implementation manner of the fifteenth aspect, the first request receiving unit is configured to receive an S1-AP message sent by the management entity, where the S1-AP message includes a second indication, where the second indication is used to instruct the base station to send the discovery resource to the management entity or used to instruct the base station to acquire the discovery resource and send the discovery resource to the management entity; and the second discovery resource sending unit is configured to send the discovery resource to the management entity by using a container, so that the management entity sends the discovery resource to the first terminal by using an NAS message.

In a fourth possible implementation manner of the fifteenth aspect, the discovery resource providing module includes a second acquiring unit configured to acquire the discovery resource; and a system information sending unit configured to send, in a cell in which the first terminal is located, system information including the discovery resource acquired by the second acquiring unit.

With reference to the first possible implementation manner or fourth possible implementation manner of the fifteenth aspect, in a fifth possible implementation manner of the fifteenth aspect, the first acquiring unit includes a first querying subunit configured to locally query a discovery resource of a current serving cell of the first terminal; a second querying subunit configured to locally query the discovery resource of the current serving cell of the first terminal and a discovery resource of a cell adjacent to the serving cell; and a third querying subunit configured to locally query the discovery resource of the current serving cell of the first terminal, and query, from a neighboring base station through an X2 interface, the discovery resource of the cell adjacent to the serving cell; the second acquiring unit includes a fourth querying subunit configured to locally query the discovery resource of the current serving cell of the first terminal; a fifth querying subunit configured to locally query the discovery resource of the current serving cell of the first terminal and the discovery resource of the cell adjacent to the serving cell; and a sixth querying subunit configured to locally query the discovery resource of the current serving cell of the first terminal, and query, from the neighboring base station through the X2 interface, the discovery resource of the cell adjacent to the serving cell.

In a sixth possible implementation manner of the fifteenth aspect, the base station further includes a second request receiving module configured to receive a fourth request sent by a management entity; a discovered resource allocating module configured to allocate a discovered resource to the second terminal according to the fourth request received by the second request receiving module, where the discovered resource is a resource used when the second terminal sends the second message; a first discovered resource sending module configured to send the discovered resource allocated by the discovered resource allocating module, to the second terminal; and a second discovered resource sending module configured to send the discovered resource allocated by the discovered resource allocating module, to the management entity, so that the management entity sends the discovered resource to the second terminal.

With reference to the sixth possible implementation manner of the fifteenth aspect, in a seventh possible implementation manner of the fifteenth aspect, the second request receiving module is configured to receive an S1-AP message sent by the management entity, where the S1-AP message includes a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal; and the first discovered resource sending module is configured to send the discovered resource to the second terminal by using an RRC message.

With reference to the sixth possible implementation manner of the fifteenth aspect, in an eighth possible implementation manner of the fifteenth aspect, the second request receiving module is configured to receive an S1-AP message sent by the management entity, where the S1-AP message includes a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; and the second discovered resource sending module is configured to send the discovered resource to the management entity by using a container, so that the management entity sends the discovered resource to the second terminal by using an NAS message.

According to a sixteenth aspect, a base station is provided, and the base station includes a second request receiving module configured to receive a fourth request sent by a management entity; a discovered resource allocating module configured to allocate a discovered resource to a second terminal according to the fourth request received by the second request receiving module, where the discovered resource is a resource used when the second terminal sends a second message; a first discovered resource sending module configured to send the discovered resource allocated by the discovered resource allocating module, to the second terminal; and a second discovered resource sending module configured to send the discovered resource allocated by the discovered resource allocating module, to the management entity, so that the management entity sends the discovered resource to the second terminal.

In a first possible implementation manner of the sixteenth aspect, the second request receiving module is configured to receive an S1-AP message sent by the management entity, where the S1-AP message includes a third indication, where the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal; and the first discovered resource sending module is configured to send the discovered resource to the second terminal by using an RRC message.

In a second possible implementation manner of the sixteenth aspect, the first request receiving module is configured to receive an S1-AP message sent by the management entity, where the S1-AP message includes a fourth indication, where the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; and the second discovered resource sending module is configured to send the discovered resource to the management entity by using a container, so that the management entity sends the discovered resource to the second terminal by using an NAS message.

According to a seventeenth aspect, a management entity is provided, and the management entity includes an eighth identity receiving module configured to receive a service identity of a second terminal sent by a first terminal, where the service identity of the second terminal is acquired by the first terminal according to a second message that is sent by the at least one second terminal and that includes the service identity of the second terminal; a third identity sending module configured to send the service identity of the second terminal received by the eighth identity receiving module to the server, so that the server acquires description information of the second terminal according to the service identity of the second terminal and sends the description information of the second terminal to the first terminal; a fourth identity sending module configured to send the service identity of the second terminal received by the eighth identity receiving module to the server; a third information receiving module configured to receive the description information of the second terminal sent by a server; and a third information sending module configured to send the description information of the second terminal to the first terminal, where the description information of the second terminal is acquired by the server according to the service identity of the second terminal sent by the fourth identity sending module.

In a first possible implementation manner of the seventeenth aspect, the management entity further includes a third request receiving module configured to receive, before the eighth identity receiving module receives the service identity of the second terminal sent by the first terminal, a first request sent by the first terminal; a fourth request sending module configured to send a second request to a base station, so that the base station sends a discovery resource to the first terminal according to the second request; a fifth request sending module configured to send the second request to the base station; a discovery resource receiving module configured to receive a discovery resource that is sent by the base station according to the second request sent by the fifth request sending module; and a discovery resource sending module configured to send the discovery resource received by the discovery resource receiving module to the first terminal; where the discovery resource is a resource used when the first terminal monitors the second message.

With reference to the first possible implementation manner of the seventeenth aspect, in a second possible implementation manner of the seventeenth aspect, the fourth request sending module is configured to send an S1-AP message to the base station, where the S1-AP message includes a first indication, where the first indication is used to instruct the base station to send the discovery resource to the first terminal or used to instruct the base station to acquire the discovery resource and send the discovery resource to the first terminal, so that the base station sends the discovery resource to the first terminal by using an RRC message.

With reference to the first possible implementation manner of the seventeenth aspect, in a third possible implementation manner of the seventeenth aspect, the fifth request sending module is configured to send an S1-AP message to the base station, where the S1-AP message includes a second indication, where the second indication is used to instruct the base station to send the discovery resource to the management entity or used to instruct the base station to acquire the discovery resource and send the discovery resource to the management entity; the discovery resource receiving module is configured to receive the discovery resource that is sent by the base station by using a container; and the discovery resource sending module is configured to send the discovery resource to the first terminal by using an NAS message.

With reference to the first possible implementation manner of the seventeenth aspect, in a fourth possible implementation manner of the seventeenth aspect, the management entity further includes a fifth identity sending module configured to send, before the second request sending module sends the second request to the base station, an identity of the first terminal to the server, so that the server verifies, according to the identity of the first terminal, whether the first terminal is authorized to discover the second terminal; and a first indication receiving module configured to receive an indication fed back by the server and indicating that the first terminal is authorized to discover the second terminal; where the fourth request sending module is configured to send the second request to the base station after the first indication receiving module receives the indication fed back by the server and indicating that the first terminal is authorized to discover the second terminal; and the fifth request sending module is configured to send the second request to the base station after the first indication receiving module receives the indication fed back by the server and indicating that the first terminal is authorized to discover the second terminal; where the first request includes the identity of the first terminal.

With reference to the first possible implementation manner of the seventeenth aspect, in a fifth possible implementation manner of the seventeenth aspect, the management entity further includes a sixth identity sending module configured to send, before the second request sending module sends the second request to the base station, an identity of the first terminal and an identity of an application using a discovery service in the first terminal to the server, so that the server verifies, according to the identity of the first terminal and the identity of the application using the discovery service in the first terminal, whether the first terminal is authorized to discover the second terminal and whether the application is authorized to use a discovery function; and a second indication receiving module configured to receive an indication fed back by the server and indicating that the first terminal is authorized to discover the second terminal and that the application is authorized to use the discovery function; where the fourth request sending module is configured to send the second request to the base station after the second indication receiving module receives the indication fed back by the server and indicating that the first terminal is authorized to discover the second terminal and that the application is authorized to use the discovery function; and the fifth request sending module is configured to send the second request to the base station after the second indication receiving module receives the indication fed back by the server and indicating that the first terminal is authorized to discover the second terminal and that the application is authorized to use the discovery function; where the first request includes the identity of the first terminal and the identity of the application using the discovery service in the first terminal.

In a sixth possible implementation manner of the seventeenth aspect, the management entity further includes a fourth request receiving module configured to receive, before the eighth identity receiving module receives the service identity of the second terminal sent by the first terminal, a third request sent by the second terminal; a fifth request receiving module configured to receive, before the eighth identity receiving module receives the identity of the second terminal sent by the first terminal, a sixth request sent by the server; a sixth request sending module configured to send a fourth request to a base station after the fourth request receiving module receives the third request or the fifth request receiving module receives the sixth request, so that the base station allocates and sends a discovered resource to the second terminal according to the fourth request; a seventh request sending module configured to send the fourth request to the base station after the fourth request receiving module receives the third request or the fifth request receiving module receives the sixth request; a third discovered resource receiving module configured to receive a discovered resource that is allocated and sent by the base station according to the fourth request sent by the seventh request sending module; and a third discovered resource sending module configured to send the discovered resource received by the third discovered resource receiving module to the second terminal; where the discovered resource is a resource used when the second terminal sends the second message.

With reference to the sixth possible implementation manner of the seventeenth aspect, in a seventh possible implementation manner of the seventeenth aspect, the sixth request sending module is configured to send an S1-AP message to the base station, where the S1-AP message includes a third indication, where the third indication is an indication for allocating the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal, so that the base station sends the discovered resource to the second terminal by using an RRC message.

With reference to the sixth possible implementation manner of the seventeenth aspect, in an eighth possible implementation manner of the seventeenth aspect, the seventh request sending module is configured to send an S1-AP message to the base station, where the S1-AP message includes a fourth indication, where the fourth indication is an indication for allocating the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; the third discovered resource receiving module is configured to receive the discovered resource that is sent by the base station by using a container; and the third discovered resource sending module is configured to send the discovered resource to the second terminal by using an NAS message. With reference to the sixth possible implementation manner of the seventeenth aspect, in a ninth possible implementation manner of the seventeenth aspect, the management entity further includes a seventh identity sending module configured to send, before the sixth request sending module or the seventh request sending module sends the fourth request to the base station, an identity of the second terminal to the server, so that the server verifies, according to the identity of the second terminal, whether the second terminal is authorized to be discovered; and a third indication receiving module configured to receive an indication fed back by the server and indicating that the second terminal is authorized to be discovered; where the sixth request sending module is configured to send the fourth request to the base station after the third indication receiving module receives the indication fed back by the server and indicating that the second terminal is authorized to be discovered; and the seventh request sending module is configured to send the fourth request to the base station after the third indication receiving module receives the indication fed back by the server and indicating that the second terminal is authorized to be discovered; where the third request includes the identity of the second terminal.

With reference to the sixth possible implementation manner of the seventeenth aspect, in a tenth possible implementation manner of the seventeenth aspect, the management entity further includes an eighth identity sending module configured to send, before the sixth request sending module or the seventh request sending module sends the fourth request to the base station, an identity of the second terminal and an identity of an application using a discovered service in the second terminal to the server, so that the server verifies, according to the identity of the second terminal and the identity of the application using the discovered service in the second terminal, whether the second terminal is authorized to be discovered and whether the application is authorized to use a discovered function; and a fourth indication receiving module configured to receive an indication fed back by the server and indicating that the second terminal is authorized to be discovered and that the application is authorized to use the discovered function; where the sixth request sending module is configured to send the fourth request to the base station after the fourth indication receiving module receives the indication fed back by the server and indicating that the second terminal is authorized to be discovered and that the application is authorized to use the discovered function; and the seventh request sending module is configured to send the fourth request to the base station after the fourth indication receiving module receives the indication fed back by the server and indicating that the second terminal is authorized to be discovered and that the application is authorized to use the discovered function; where the third request includes the identity of the second terminal and the identity of the application using the discovered service in the second terminal.

In an eleventh possible implementation manner of the seventeenth aspect, the management entity further includes a ninth identity receiving module configured to receive a service identity of the first terminal sent by the first terminal; and a ninth identity sending module configured to send the service identity of the first terminal received by the ninth identity receiving module to the server, so that the server acquires the description information of the second terminal according to the service identity of the second terminal after the server verifies, according to the service identity of the first terminal, that the first terminal is authorized to discover the second terminal.

According to an eighteenth aspect, a management entity is provided, and the management entity includes a fourth request receiving module configured to receive a third request sent by a second terminal; a fifth request receiving module configured to receive a sixth request sent by a server; a sixth request sending module configured to send a fourth request to a base station according to the third request or the sixth request, so that the base station allocates and sends a discovered resource to the second terminal according to the fourth request; a seventh request sending module configured to send the fourth request to the base station according to the third request or the sixth request; a third discovered resource receiving module configured to receive a discovered resource that is allocated and sent by the base station according to the fourth request sent by the seventh request sending module; and a third discovered resource sending module configured to send the discovered resource received by the third discovered resource receiving module to the second terminal; where the discovered resource is a resource used when the second terminal sends a second message.

In a first possible implementation manner of the eighteenth aspect, the sixth request sending module is configured to send an S1-AP message to the base station, where the S1-AP message includes a third indication, where the third indication is an indication for allocating the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal, so that the base station sends the discovered resource to the second terminal by using an RRC message.

In a second possible implementation manner of the eighteenth aspect, the seventh request sending module is configured to send an S1-AP message to the base station, where the S1-AP message includes a fourth indication, where the fourth indication is an indication for allocating the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; the third discovered resource receiving module is configured to receive the discovered resource that is sent by the base station by using a container; and the third discovered resource sending module is configured to send the discovered resource to the second terminal by using an NAS message.

According to a nineteenth aspect, a terminal discovery system is provided, and the system includes the first terminal according to the tenth aspect, at least one second terminal according to the eleventh aspect, the server according to the thirteenth aspect, the base station according to the fifteenth aspect, and the management entity according to the seventeenth aspect.

The technical solutions provided by the embodiments of the present invention bring the following beneficial effects.

A discovery resource is acquired, a second message that is sent by at least one second terminal and includes a service identity of the second terminal is monitored according to the discovery resource, and the service identity of the second terminal is acquired; and description information of the second terminal is acquired from a server according to the service identity of the second terminal. Thereby, a problem in the prior art that a first terminal must learn a unique identity of a second terminal in advance is solved, and an objective of discovering a terminal of an unknown identity in a vicinity and extending the application scope is achieved.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
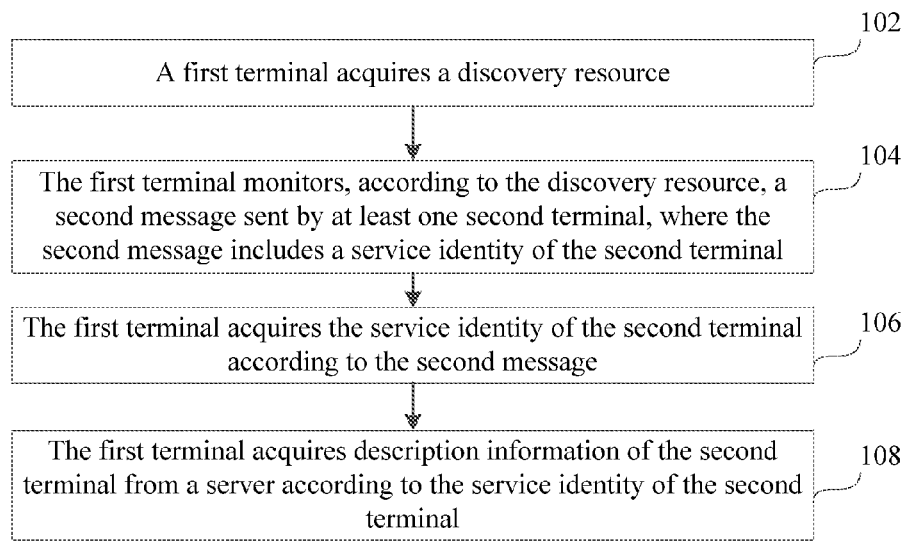
FIG. 1 is a method flowchart of a terminal discovery method according to an embodiment of the present invention.

Referring to FIG. 1, FIG. 1 shows a method flowchart of a terminal discovery method according to an embodiment of the present invention. The terminal discovery method may be applied to a first terminal in a D2D system to discover a second terminal. The terminal discovery method may include the following steps.

Step 102: A First Terminal Acquires a Discovery Resource.

Step 104: The first terminal monitors, according to the discovery resource, a second message sent by at least one second terminal, where the second message includes a service identity of the second terminal.

Step 106: The first terminal acquires the service identity of the second terminal according to the second message.

The service identity of the second terminal may be a service identity of one or more second terminals.

Step 108: The first terminal acquires description information of the second terminal from a server according to the service identity of the second terminal.

As described above, in the terminal discovery method provided by the embodiment of the present invention, a discovery resource is acquired, a message that is sent by at least one second terminal and includes a service identity of the second terminal is monitored according to the discovery resource, and the service identity of the second terminal is acquired; and description information of the second terminal is acquired from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 2:
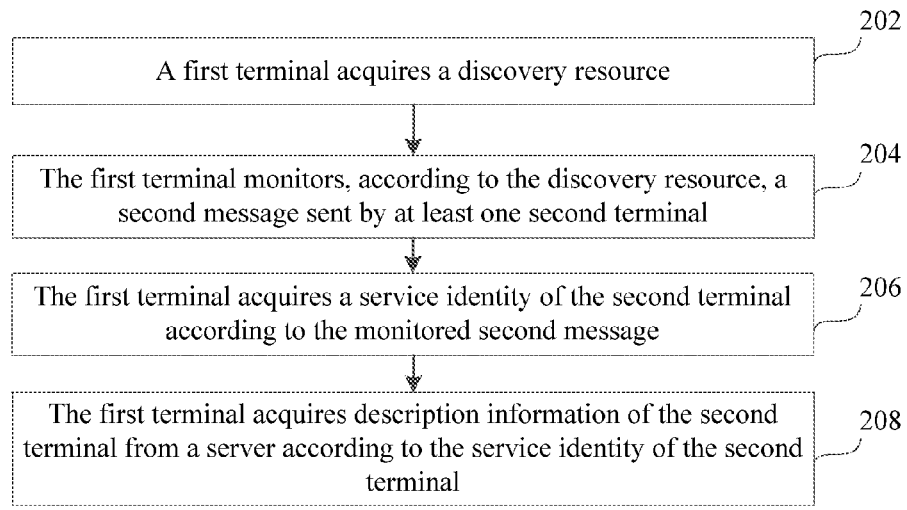
FIG. 2 is a method flowchart of a terminal discovery method according to another embodiment of the present invention.

For a more exemplary method based on the foregoing terminal discovery method shown in FIG. 1, reference may be made to FIG. 2, which shows a method flowchart of a terminal discovery method according to another embodiment of the present invention. The terminal discovery method may be applied to a first terminal in a D2D system to discover a second terminal. The terminal discovery method may include:

Step 202: A first terminal acquires a discovery resource.

The first terminal may send a first request to a management entity. The first request is used to request to acquire a discovery resource (discovery resource or radio resource or monitoring resource or discovery radio resource or monitoring radio resource), where the discovery resource is used by the first terminal to learn how to monitor a second terminal. The management entity sends a second request to a base station.

The second request is used to instruct the base station to send the discovery resource to the first terminal. The first terminal may directly receive the discovery resource that is sent by the base station according to the second request. For example, the first terminal receives the discovery resource that is sent by the base station by using an RRC message, for example, an RRC Connection Reconfiguration message, where the discovery resource is a resource that the base station sends after receiving the second request. The second request may be an S1-AP message including a first indication. After receiving the S1-AP message, the base station sends the discovery resource to the first terminal by using an RRC message. The first indication is used to instruct the base station to send the discovery resource to the first terminal or used to instruct the base station to acquire the discovery resource and send the discovery resource to the first terminal. It may be an indication for sending the discovery resource.

Alternatively, the second request is used to instruct the base station to send the discovery resource to the management entity. The first terminal may receive the discovery resource that is sent by the base station to the management entity according to the second request and sent by the management entity. For example, the first terminal may receive the discovery resource that is sent by the management entity by using an NAS message. The second request may be an S1-AP message including a second indication. After receiving the S1-AP message, the base station sends the discovery resource to the management entity by using a container, and the management entity sends the container including the discovery resource to the first terminal by using an NAS message. The second indication is used to instruct the base station to send the discovery resource to the management entity or used to instruct the base station to acquire the discovery resource and send the discovery resource to the management entity. It may be an indication for sending the discovery resource.

Alternatively, the first terminal may also receive system information sent by the base station, and resolve the discovery resource included in the system information.

The discovery resource includes a discovery resource of a serving cell of the first terminal; or the discovery resource includes a discovery resource of a serving cell of the first terminal and a discovery resource of a cell adjacent to the serving cell.

The discovery resource includes information such as a frequency band and/or a time and/or a coding scheme, which is used by the second terminal to send a second message in a cell.

In addition, when the first terminal sends the first request to the management entity, an identity of the first terminal may also be included in the first request. The identity may be a phone number of the first terminal; or the identity may be a device identity of the first terminal; or the identity may be an identity allocated by a server to the first terminal; or the identity may be a service identity of the first terminal; or the identity may be an identity configured in advance in the terminal and used for discovery and being discovered. The management entity sends the identity of the first terminal to the server. The server verifies, according to the identity of the first terminal, whether the first terminal is authorized to discover the second terminal. When the server verifies that the first terminal is authorized to discover the second terminal, the management entity sends the second request to the base station.

Alternatively, when the first terminal sends the first request to the management entity, an identity of the first terminal and an identity of an application (e.g., an Application Identifier (ID)) using a discovery service in the first terminal may also be included in the first request. The management entity sends the identity of the first terminal and the identity of the application using the discovery service in the first terminal to the server, and the server verifies, according to the identity of the first terminal and the identity of the application, whether the first terminal is authorized to discover the second terminal and that the application is authorized to use a discovery function. When a verification result of the server is that the first terminal is authorized to discover the second terminal and that the application is authorized to use the discovery function, the management entity sends the second request to the base station.

Step 204: The first terminal monitors, according to the discovery resource, a second message sent by at least one second terminal.

The first terminal may monitor, according to the discovery resource, the second message (discovered broadcast message) or an announcing message that is sent by the second terminal in a broadcast mode. The second message includes a service identity of the second terminal. The service identity of the second terminal may be one or a combination of the following: a D2D code, an expression code, an announcing code, an identity of the second terminal, and an identity of an application. For example, the service identity of the second terminal may be the identity of the second terminal plus the expression code, or the service identity of the second terminal may be the identity of the second terminal plus the identity of the application, or the service identity of the second terminal may be the identity of the second terminal plus the identity of the application plus the expression code. The service identity may be used to identify the second terminal on a radio channel. The server may be a D2D server or a Proximity Services (ProSe) server or a Proximity Discovery and Communication Function (PDCF). The server may allocate the service identity to the second terminal.

A system may include only one server, which is configured to service both the first terminal and the second terminal. Alternatively, a system may also include multiple servers, which are respectively home servers of the first terminal and the second terminal, or respectively service the first terminal or the second terminal. When multiple servers are included, the first terminal and the second terminal respectively acquire service identities from their home servers or from a server that currently provides services.

The first terminal may monitor, according to the information such as the frequency band, time, coding scheme in the discovery resource, the second message sent by the second terminal.

Preferably, the first terminal may trigger the second terminal in a vicinity to send the second message. For example, the first terminal may send a first message (for example, a discovery broadcast message or a trigger message), so that the second terminal sends the second message according to the first message after receiving the first message. A resource used when the first terminal sends the first message may also be acquired from the base station in a manner similar to step 202, which is not further described herein. Further, the first message may include description information of a terminal that the first terminal wishes to discover, for example, a type of terminal that the first terminal wishes to discover (for example, an individual, a restaurant, or a shop), or an identity of an application used by a terminal that the first terminal wishes to discover (for example, an identity of QQ, MICROBLOG, or SKYPE), a restriction manner of a terminal that the first terminal wishes to discover (for example, all persons may discover, or only a specific person is allowed to discover), so that the second terminal compliant with the description information sends a second message while other terminals do not send a second message.

In the solution provided by the embodiment of the present invention, the second message is monitored according to the acquired discovery resource, and it is unnecessary to monitor broadcast messages beyond the frequency band or time included in the discovery resource. Thereby, burden of the terminal may be reduced, and power of the terminal may be saved.

Step 206: The first terminal acquires a service identity of the second terminal according to the monitored second message.

The first terminal may acquire the service identity of the at least one second terminal after the service identity compliant with a predetermined condition in the monitored second message sent by the at least one second terminal is filtered. The predetermined condition includes at least one of the following conditions: a signal strength of the second message is greater than or equal to a predetermined strength threshold; or a type of the second terminal included in the second message complies with a predetermined type; or an application description included in the second message complies with a predetermined application description.

The first terminal filters the monitored second message, and acquires the service identity of the at least one second terminal compliant with a predetermined requirement. For example, the service identity in the second message whose signal strength is greater than or equal to a threshold is acquired and used as the service identity of the second terminal; or if the second message including the service identity includes the type of the terminal corresponding to the second message (for example, an individual, a restaurant, or a shop), or if the second message including the service identity includes the application description corresponding to the second message, where the application description includes an application name (for example, QQ, SKYPE, or WECHAT) or an Application ID or an application type (for example, instant messaging, voice over Internet Protocol (VoIP), or streaming media), the service identity corresponding to the predetermined type is acquired.

Step 208: The first terminal acquires description information of the second terminal from a server according to the service identity of the second terminal.

The first terminal may send the acquired service identity of the second terminal to the server, or may first send the service identity of the second terminal to the management entity, for example, a Mobility Management Entity (MME), and then the management entity sends the service identity of the second terminal to the server. The first terminal may directly send the service identity of the second terminal to the server, or may send the service identity of the second terminal to the server in a form of a service identity array or a service identity list.

The first terminal may receive the description information of the second terminal that is sent by the server and corresponding to the service identity of the second terminal, where the description information of the second terminal is acquired by the server according to the service identity of the second terminal and sent to the first terminal. Alternatively, the first terminal may receive the description information of the second terminal that is sent by the management entity and corresponding to the service identity of the second terminal, where the description information of the second terminal is acquired by the server according to the service identity of the second terminal and sent to the management entity.

A method for acquiring the description information of the second terminal according to the service identity of the second terminal by the server may be that the server locally queries, according to a correspondence between a service identity of each terminal and description information stored in the server, the description information of the second terminal that is stored in a correspondence to the service identity of the second terminal. In addition, when multiple servers exist in the system, and a server that currently serves the first terminal and a server that currently serves the second terminal are not the same server, the server that services the first terminal may query, according to the service identity of the second terminal, the description information of the second terminal from the home server of the second terminal or the server that currently services the second terminal. For example, the server acquires, according to the service identity of the second terminal, the home server of the second terminal or the server that currently services the second terminal, and sends the service identity of the second terminal to the home server of the second terminal or the server that currently services the second terminal; then the home server of the second terminal or the server that currently services the second terminal acquires the description information of the second terminal according to the service identity of the second terminal and feeds it back to the server.

The description information of the second terminal includes one or a combination of the following: a name of the second terminal, an identity of the second terminal, a phone number of the second terminal, a temporary identity of the second terminal, an Application ID, an application user identity (for example, a QQ account, a MICROBLOG account, and a SKYPE account), so that a user of the first terminal can accurately identify the second terminal that needs to establish D2D communication.

Preferably, the first terminal may further send the service identity of the first terminal to the server. For example, the first terminal may directly send the service identity of the first terminal to the server through an Internet Protocol (IP) channel, so that after the server verifies, according to the service identity of the first terminal, that the first terminal has a discovery permission and that the second terminal corresponding to the service identity of the second terminal is authorized to be discovered, acquires the description information of the second terminal according to the service identity of the second terminal and sends the description information of the second terminal.

Alternatively, the first terminal may further send the service identity of the first terminal to the management entity, and the management entity sends the service identity of the first terminal to the server, so that after the server verifies, according to the service identity of the first terminal, that the first terminal has a discovery permission and that the second terminal corresponding to the service identity of the second terminal is authorized to be discovered, acquires the description information of the second terminal according to the service identity of the second terminal and sends the description information of the second terminal.

For example, to protect privacy of the second terminal, the second terminal may preset a discovery permission. For example, a second terminal corresponding to a service identity in service identities of multiple second terminals sent by the first terminal is preset to be discovered by only a buddy. While sending the service identity of the second terminal to the management entity, the first terminal further sends the service identity of the first terminal to the server. If the server verifies, according to the service identity of the first terminal, that the first terminal is not a buddy of the second terminal, the server verifies that the first terminal is not authorized to discover the second terminal, and therefore the server does not send the description information of the second terminal to the first terminal.

As described above, in the terminal discovery method provided by the embodiment of the present invention, a discovery resource is acquired, a message that is sent by at least one second terminal and includes a service identity of the second terminal is monitored according to the discovery resource, and the service identity of the second terminal is acquired; and description information of the second terminal is acquired from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, in the terminal discovery method provided by the embodiment of the present invention, a second message sent by the second terminal is monitored according to the acquired discovery resource, and thereby, an objective of reducing burden of the terminal and saving power of the terminal is achieved. Finally, in the terminal discovery method provided by the embodiment of the present invention, a service identity of the first terminal is sent to a management entity, so that the server verifies, according to the service identity of the first terminal, whether the first terminal is authorized to discover the second terminal, and thereby an objective of protecting privacy of the second terminal is achieved.

Figure 3:
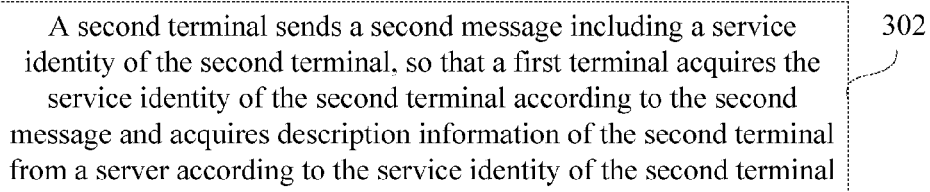
FIG. 3 is a method flowchart of a terminal discovery method according to an embodiment of the present invention.

Referring to FIG. 3, FIG. 3 shows a method flowchart of a terminal discovery method according to an embodiment of the present invention. The terminal discovery method may be applied to a second terminal in a D2D system. The terminal discovery method may include the following step.

Step 302: A second terminal sends a second message including a service identity of the second terminal, so that a first terminal acquires the service identity of the second terminal according to the second message and acquires description information of the second terminal from a server according to the service identity of the second terminal.

As described above, in the method provided by the embodiment of the present invention, a second terminal sends a second message including a service identity of the second terminal, so that a first terminal acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 4:
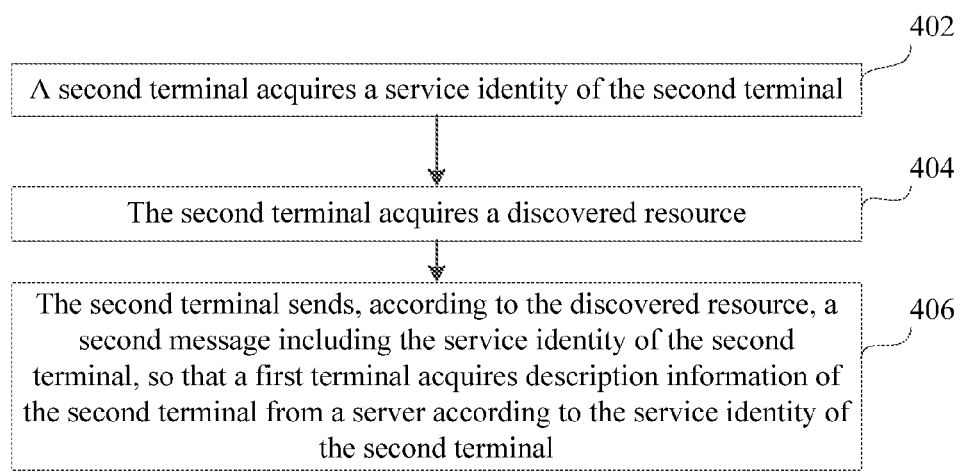
FIG. 4 is a method flowchart of a terminal discovery method according to another embodiment of the present invention.

For a more exemplary solution based on the foregoing terminal discovery method shown in FIG. 3, reference may be made to FIG. 4, which shows a method flowchart of a terminal discovery method according to another embodiment of the present invention. The terminal discovery method may be applied to a second terminal in a D2D system. The terminal discovery method may include the following steps.

Step 402: A second terminal acquires a service identity of the second terminal.

The second terminal may request a server to allocate the service identity, or request a server through a management entity to allocate the service identity. The server sends the service identity allocated to the second terminal, to the second terminal, or sends it to the second terminal through the management entity.

In addition, the second terminal may further send description information of the second terminal through the management entity, so that the server stores the description information of the second terminal in a correspondence to the service identity that is allocated to the second terminal. Alternatively, the second terminal sends the description information of the second terminal to the management entity, so that the management entity sends the description information of the second terminal to the server, so that the server stores the description information of the second terminal in a correspondence to the service identity that is allocated to the second terminal.

It should be noted that when a system includes multiple servers, the second terminal may acquire the service identity from a home server of the second terminal or a server that currently services the second terminal.

Step 404: The second terminal acquires a discovered resource.

The second terminal may send a third request to the management entity. The third request is used to request to acquire a discovered resource (discovered resource or radio resource or announcing resource or discovered radio resource or announcing radio resource). The discovered resource is used for broadcasting to the second terminal, so that a first terminal may monitor the second terminal. The management entity may send a fourth request to a base station according to the third request.

Alternatively, the second terminal may send a fifth request to the server, and the server sends a sixth request to the management entity after receiving the fifth request. The management entity may send the fourth request to the base station according to the sixth request.

The fourth request is used to instruct the base station to allocate the discovered resource to the second terminal. The second terminal may directly receive the discovered resource sent by the base station. For example, the second terminal may receive the discovered resource that is sent by the base station by using an RRC message, where the discovered resource is a resource that the base station sends after receiving the fourth request. The fourth request may be an S1-AP message including a third indication. After receiving the S1-AP message, the base station sends the discovered resource to the second terminal by using an RRC message. The third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal. It may be an indication for allocating the discovered resource or an indication for sending the discovered resource.

Alternatively, the fourth request is used to instruct the base station to allocate the discovered resource to the second terminal and send the discovered resource to the management entity. The second terminal may receive a discovered resource that is sent by the base station to the management entity and sent by the management entity to the second terminal. The discovered resource is the resource that is allocated by the base station according to the fourth request. The discovered resource that is sent by the management entity by using an NAS message is received. The discovered resource is the discovered resource that the base station sends to the management entity by using a container after receiving the fourth request. The fourth request may be an S1-AP message including a fourth indication. After receiving the S1-AP message, the base station sends the discovered resource to the management entity by using a container, and the management entity sends the container to the second terminal by using an NAS message. The fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity. It may be an indication for allocating the discovered resource or an indication for sending the discovered resource.

In addition, when the second terminal sends the third request to the management entity, the third request including an identity of the second terminal may be sent to the management entity. The identity may be a phone number of the second terminal; or the identity may be a device identity of the second terminal; or the identity may be an identity allocated by the server to the second terminal; or the identity may be a service identity of the second terminal; or the identity may be an identity configured in advance in the terminal and used for discovery and being discovered. The management entity sends the identity of the second terminal to the server. The server verifies, according to the identity of the second terminal, whether the second terminal is authorized to be discovered. When the server verifies that the second terminal is authorized to be discovered, the management entity sends the fourth request to the base station.

Alternatively, when the second terminal sends the third request to the management entity, the third request including an identity of the second terminal and an identity of an Application ID using a discovered service in the second terminal may be sent to the management entity. The management entity sends the identity of the second terminal and the identity of the application to the server. The server verifies, according to the identity of the second terminal and the identity of the application, whether the second terminal is authorized to be discovered by other terminals and whether the application is authorized to use a discovered function. When a verification result of the server is that the second terminal is authorized to be discovered by other terminals and that the application is authorized to use the discovered function, the management entity sends the fourth request to the base station.

Alternatively, in addition, when the second terminal sends the fifth request to the server, a GUTI of the second terminal may be included in the fifth request. The server sends a sixth request to the management entity according to the GUTI. The management entity sends the fourth request to the base station after receiving the sixth request.

Further, when the second terminal sends the fifth request to the server, the identity of the second terminal may be included in the fifth request, so that the server sends the sixth request to the management entity when the server verifies, according to the identity of the second terminal, that the second terminal is authorized to be discovered.

Alternatively, when the second terminal sends the fifth request to the server, the identity of the second terminal and the identity of the application using the discovered service in the second terminal may be included in the fifth request, so that the server sends the sixth request to the management entity when the server verifies, according to the identity of the second terminal, that the second terminal is authorized to be discovered and that the application is authorized to use the discovered function.

The discovered resource may include information such as a frequency band, a time, or a coding scheme for sending a second message by the second terminal.

Step 406: The second terminal sends, according to the discovered resource, a second message including the service identity of the second terminal, so that a first terminal acquires description information of the second terminal from a server according to the service identity of the second terminal.

The second terminal sends, according to the frequency band, time, or coding scheme, and so on in the discovered resource, the second message including the service identity of the second terminal.

After receiving the discovered resource, the second terminal may immediately send the second message; or after receiving a first message sent by the first terminal, the second terminal may send the second message according to the first message.

Further, if the first message includes description information of a terminal that the first terminal wishes to discover, for example, a type of terminal that the first terminal wishes to discover (for example, an individual, a restaurant, or a shop), or an identity of an application used by a terminal that the first terminal wishes to discover (for example, an identity of QQ, MICROBLOG, or SKYPE), a restriction manner of a terminal that the first terminal wishes to discover (for example, all persons may discover, or only a specific person is allowed to discover), the second terminal first determines whether the description information of the terminal that the first terminal wishes to discover complies with a specific condition, and if so, starts to send discovered information. For example, after receiving the first message sent by the first terminal, the second terminal resolves whether the type of the first terminal in the description information included in the first message is an individual, and if so, sends the second message in a broadcast mode.

In the solution provided by the embodiment of the present invention, a second terminal acquires a discovered resource allocated by a base station, and sends a second message according to the discovered resource; and the base station may allocate different discovered resources to multiple second terminals, so that interference is reduced when each second terminal sends a second message.

As described above, in the terminal discovery method provided by the embodiment of the present invention, a second message including a service identity of a second terminal is sent, so that a first terminal acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, in the terminal discovery method provided by the embodiment of the present invention, a discovered resource allocated by a base station is acquired, and the second message is sent according to the acquired discovered resource. Thereby, an objective of reducing interference between terminals is achieved.

Figure 5:
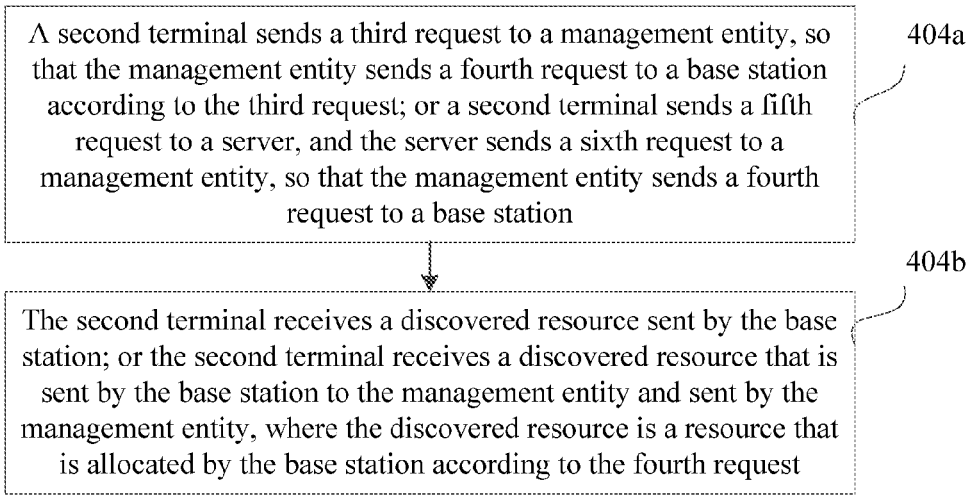
FIG. 5 is a method flowchart of a terminal discovery method according to an embodiment of the present invention.

For step 404 in FIG. 4, reference may be made to FIG. 5, which shows a method flowchart of a terminal discovery method according to an embodiment of the present invention. The terminal discovery method may be applied to a second terminal to acquire a discovered resource for the second terminal, so that the second terminal sends a second message according to the discovered resource. The terminal discovery method may include:

Step 404*a*: A second terminal sends a third request to a management entity, so that the management entity sends a fourth request to a base station according to the third request; or a second terminal sends a fifth request to a server, and the server sends a sixth request to a management entity, so that the management entity sends a fourth request to a base station.

Step 404*b*: The second terminal receives a discovered resource sent by the base station; or the second terminal receives a discovered resource that is sent by the base station to the management entity and sent by the management entity, where the discovered resource is a resource that is allocated by the base station according to the fourth request.

As described above, in the terminal discovery method provided by the embodiment of the present invention, a third request is sent to a management entity, so that the management entity sends a fourth request to a base station according to the third request; and a discovered resource sent by the base station is received; or a discovered resource that is sent by the base station to the management entity and sent by the management entity is received, so that a second terminal sends a second message according to the discovered resource, thereby achieving an objective of reducing interference between terminals.

Figure 6:
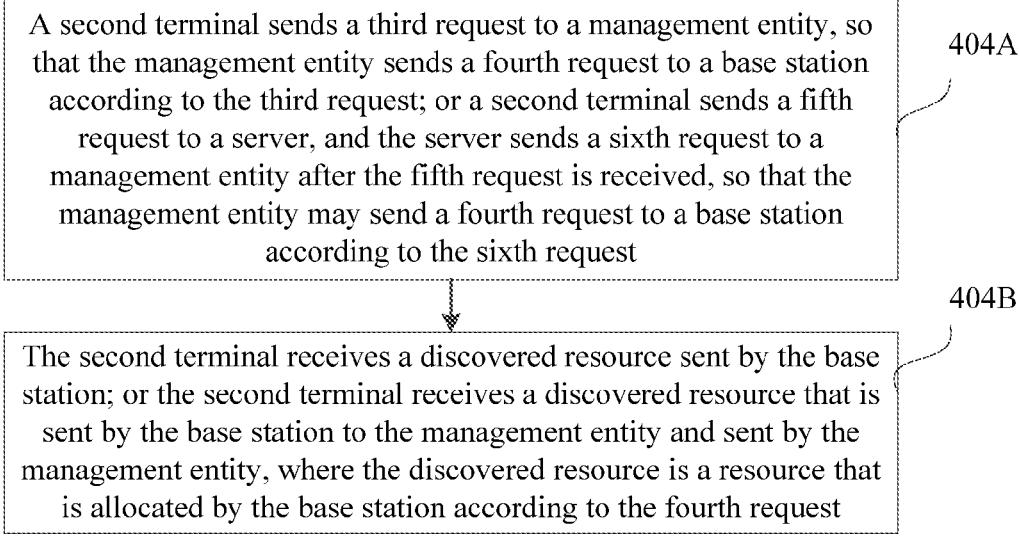
FIG. 6 is a method flowchart of a terminal discovery method according to another embodiment of the present invention.

For a more exemplary solution based on the foregoing terminal discovery method shown in FIG. 5, reference may be made to FIG. 6, which shows a method flowchart of a terminal discovery method according to another embodiment of the present invention. The terminal discovery method may be applied to a second terminal to acquire a discovered resource for the second terminal, so that the second terminal sends a second message according to the discovered resource. The terminal discovery method may include the following step.

Step 404A: A second terminal sends a third request to a management entity, so that the management entity sends a fourth request to a base station according to the third request; or a second terminal sends a fifth request to a server, and the server sends a sixth request to a management entity after receiving the fifth request, so that the management entity may send a fourth request to a base station according to the sixth request.

The second terminal may send the third request to the management entity. The third request is used to request to acquire a discovered resource (discovered resource or radio resource or announcing resource). The discovered resource is used for broadcasting to the second terminal, so that a first terminal may monitor the second terminal. The base station may allocate different discovered resources to multiple second terminals, so that interference is reduced when each second terminal sends a second message.

When the second terminal sends the fifth request to the server, a GUTI of the second terminal may be included in the fifth request. The server sends a sixth message to the management entity according to the GUTI. The management entity sends the fourth request to the base station after receiving the sixth request.

Further, when the second terminal sends the fifth request to the server, an identity of the second terminal may also be included in the fifth request. The server sends an identity of the first terminal to the management entity by using the sixth request. The management entity sends the fourth request to the base station, so that the base station allocates the discovered resource according to the identity of the second terminal.

Step 404B: The second terminal receives a discovered resource sent by the base station; or the second terminal receives a discovered resource that is sent by the base station to the management entity and sent by the management entity, where the discovered resource is a resource that is allocated by the base station according to the fourth request.

The fourth request is used to instruct the base station to allocate the discovered resource to the second terminal. The second terminal may directly receive the discovered resource sent by the base station. For example, the second terminal may receive the discovered resource that is sent by the base station by using an RRC message, where the discovered resource is a resource that the base station sends after receiving the fourth request. The fourth request may be an S1-AP message including a third indication. After receiving the S1-AP message, the base station sends the discovered resource to the second terminal by using an RRC message. The third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal. It may be an indication for allocating the discovered resource or an indication for sending the discovered resource.

Alternatively, the fourth request is used to instruct the base station to allocate the discovered resource to the second terminal and send the discovered resource to the management entity. The second terminal may receive a discovered resource that is sent by the base station to the management entity and sent by the management entity to the second terminal. The discovered resource is the resource that is allocated by the base station according to the fourth request. The discovered resource that is sent by the management entity by using an NAS message is received. The discovered resource is the discovered resource that the base station sends to the management entity by using a container after receiving the fourth request. The fourth request may be an S1-AP message including a fourth indication. After receiving the S1-AP message, the base station sends the discovered resource to the management entity by using a container, and the management entity sends the container to the second terminal by using an NAS message. The fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity. It may be an indication for allocating the discovered resource or an indication for sending the discovered resource.

As described above, in the terminal discovery method provided by the embodiment of the present invention, a third request is sent to a management entity, so that the management entity sends a fourth request to a base station according to the third request; and a discovered resource sent by the base station is received; or a discovered resource that is sent by the base station to the management entity and sent by the management entity is received, so that the second terminal sends a second message according to the discovered resource, thereby achieving an objective of reducing interference between terminals.

Figure 7:
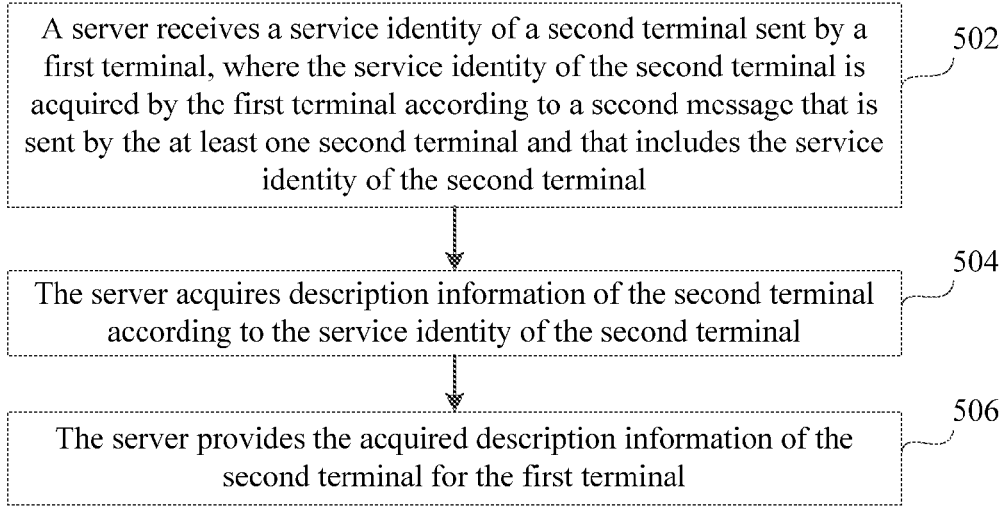
FIG. 7 is a method flowchart of a terminal discovery method according to an embodiment of the present invention.

Referring to FIG. 7, FIG. 7 shows a method flowchart of a terminal discovery method according to an embodiment of the present invention. The terminal discovery method may be applied to a server in a D2D system. The terminal discovery method may include the following steps.

Step 502: A server receives a service identity of a second terminal sent by a first terminal, where the service identity of the second terminal is acquired by the first terminal according to a second message that is sent by the at least one second terminal and that includes the service identity of the second terminal.

Step 504: The server acquires description information of the second terminal according to the service identity of the second terminal.

Step 506: The server provides the acquired description information of the second terminal for the first terminal.

As described above, in the terminal discovery method provided by the embodiment of the present invention, a service identity of a second terminal sent by a first terminal is received, and description information of the second terminal corresponding to the service identity of the second terminal is acquired and provided for the first terminal. Thereby, a problem in the prior art that a first terminal must learn a unique identity of a second terminal in advance is solved, and an objective of discovering a terminal of an unknown identity in a vicinity and extending an application scope is achieved.

Figure 8:
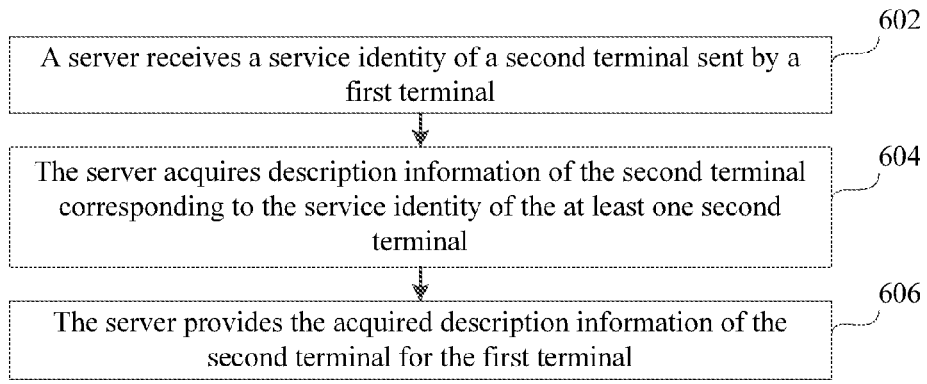
FIG. 8 is a method flowchart of a terminal discovery method according to another embodiment of the present invention.

For a more exemplary solution based on the foregoing terminal discovery method shown in FIG. 7, reference may be made to FIG. 8, which shows a method flowchart of a terminal discovery method according to another embodiment of the present invention. The terminal discovery method may be applied to a server in a D2D system. The terminal discovery method may include the following steps.

Step 602: A server receives a service identity of a second terminal sent by a first terminal.

The service identity of the second terminal is acquired by the first terminal according to a second message that is sent by the at least one second terminal and that includes the service identity of the second terminal.

The service identity is an identity that is allocated by the server to the second terminal.

The server may receive the service identity of the second terminal that is sent by the first terminal through an IP layer channel. Alternatively, the server may receive the service identity of the second terminal that is sent by a management entity, where the service identity of the second terminal is sent by the first terminal to the management entity.

Before receiving the service identity of the second terminal, the server may further allocate the service identity to the second terminal, and send the service identity allocated to the second terminal, to the second terminal, or send the service identity allocated to the second terminal, to the second terminal through the management entity.

Preferably, the server may further receive description information of the second terminal sent by the second terminal; or the server may further receive description information of the second terminal sent by the management entity, where the description information of the second terminal is sent by the second terminal to the management entity. After allocating the service identity to the second terminal, the server further stores the description information of the second terminal in a correspondence to the service identity that is allocated to the second terminal.

Step 604: The server acquires description information of the second terminal corresponding to the service identity of the at least one second terminal.

The server may locally query the description information of the second terminal that is stored in a correspondence to the service identity of the second terminal.

It should be noted that in the method provided by this embodiment, only one server that services both the first terminal and the second terminal in a D2D system is used for description. In actual application, the D2D system may include multiple servers, which respectively service terminals that belong to the servers or terminals in a specified cell. When the system includes multiple servers, the first terminal and the second terminal respectively acquire service identities from their home servers or from a server that currently provides services. The second terminal sends the description information of the second terminal directly or through the management entity to the home server of the second terminal or the server that currently serves the second terminal, so that the home server of the second terminal or the server that currently serves the second terminal stores the description information of the second terminal in a correspondence to the service identity that is allocated to the second terminal. If the server that currently services the first terminal does not store the description information of the second terminal, the server may query, according to the service identity of the second terminal, the description of the second terminal from the home server of the second terminal or the server that currently services the second terminal.

Preferably, before acquiring the description information of the second terminal corresponding to the service identity of the at least one second terminal, the server may further receive a service identity of the first terminal sent by the first terminal, for example, receive the service identity of the first terminal that is sent by the first terminal through an IP layer channel; or the server may receive the service identity of the first terminal sent by the management entity, where the service identity of the first terminal is sent by the first terminal to the management entity; the server verifies, according to the service identity of the first terminal, whether the first terminal is authorized to discover the second terminal corresponding to the service identity of the second terminal, and if a verification result is that the first terminal is authorized to discover the second terminal, the server executes the step of querying the description information of the second terminal that is stored in a correspondence to the service identity of the second terminal. The service identity of the first terminal may be one or a combination of the following: a D2D code, an expression code, an identity of the first terminal, and an identity of an application. For example, the service identity of the first terminal may be the identity of the first terminal plus the expression code, or the service identity of the first terminal may be the identity of the first terminal plus the identity of the application, or the service identity of the first terminal may be the identity of the first terminal plus the identity of the application plus the expression code.

For example, to protect privacy of the second terminal, the second terminal may preset a discovery permission. For example, a second terminal corresponding to a service identity in service identities of multiple second terminals sent by the first terminal is preset to be discovered by only a buddy. While sending the service identity of the second terminal to the management entity, the first terminal further sends the service identity of the first terminal to the server. If the server verifies, according to the service identity of the first terminal, that the first terminal is not a buddy of the second terminal, the server verifies that the first terminal is not authorized to discover the second terminal, and therefore the server does not send the description information of the second terminal to the first terminal.

Step 606: The server provides the acquired description information of the second terminal for the first terminal.

The server may send the acquired description information of the second terminal to the first terminal; or the server may send the acquired description information of the second terminal to the management entity, so that the management entity sends the description information of the second terminal to the first terminal.

The server may send the acquired description information of the second terminal to the first terminal through an IP layer channel; or the server may send the description information of the second terminal to the management entity, so that the management entity sends the description information of the second terminal to the first terminal.

Preferably, to reduce interference between second terminals and reduce burden of the first terminal and save power of the first terminal, the first terminal monitors, according to a discovery resource acquired from a base station, a second message that is sent by the second terminal by using a discovered resource allocated by the base station. When the first terminal acquires the discovery resource and the second terminal acquires the discovered resource, their permissions need to be verified, as follows.

When the first terminal acquires the discovery resource, the server may receive an identity of the first terminal sent by the management entity, where the identity of the first terminal is an identity included in a first request that is sent by the first terminal to the management entity; the server verifies, according to the identity of the first terminal, whether the first terminal is authorized to discover the second terminal; and if a verification result is that the first terminal is authorized to discover the second terminal, the server feeds back an indication indicating that the first terminal is authorized to discover the second terminal, to the management entity, so that the management entity sends a second request to the base station after receiving the indication; where the first request is used to request to acquire the discovery resource, the second request is used to request the base station to acquire the discovery resource and send the discovery resource to the first terminal, and the discovery resource is a resource used when the first terminal monitors the second message.

Alternatively, when the first terminal acquires the discovery resource, the server may receive an identity of the first terminal and an identity of an application using a discovery service in the first terminal that are sent by the management entity, where the identity of the first terminal and the identity of the application using the discovery service in the first terminal are identities included in a first request that is sent by the first terminal to the management entity; the server verifies, according to the identity of the first terminal, whether the first terminal is authorized to discover the second terminal, and verifies, according to the identity of the application using the discovery service in the first terminal, whether the application is authorized to use a discovery function; and if a verification result is that the first terminal is authorized to discover the second terminal and that the application is authorized to use the discovery function, the server feeds back an indication indicating that the first terminal is authorized to discover the second terminal and that the application is authorized to use the discovery function, to the management entity, so that the management entity sends a second request to the base station after receiving the indication; where the first request is used to request to acquire the discovery resource, the second request is used to request the base station to acquire the discovery resource and send the discovery resource to the first terminal, and the discovery resource is a resource used when the first terminal monitors the second message.

When the second terminal acquires the discovered resource, the server may receive an identity of the second terminal sent by the management entity, where the identity of the second terminal is an identity included in a third request that is sent by the second terminal to the management entity; the server verifies, according to the identity of the second terminal, whether the second terminal is authorized to be discovered; and if a verification result is that the second terminal is authorized to be discovered, the server feeds back an indication indicating that the second terminal is authorized to be discovered, to the management entity, so that the management entity sends a fourth request to the base station after receiving the indication; where the third request is used to request to acquire the discovered resource, the fourth request is used to request the base station to allocate and send the discovered resource to the second terminal, and the discovered resource is a resource used when the second terminal sends the second message.

Alternatively, when the second terminal acquires the discovered resource, the server may receive an identity of the second terminal and an identity of an application using a discovered service in the second terminal that are sent by the management entity, where the identity of the second terminal and the identity of the application using the discovered service in the second terminal are identities included in a third request that is sent by the second terminal to the management entity; the server verifies, according to the identity of the second terminal, whether the second terminal is authorized to be discovered, and verifies, according to the identity of the application using the discovered service in the second terminal, whether the application is authorized to use a discovered function; and if a verification result is that the second terminal is authorized to be discovered and that the application is authorized to use the discovered function, the server feeds back an indication indicating that the second terminal is authorized to be discovered and that the application is authorized to use the discovered function, to the management entity, so that the management entity sends a fourth request to the base station after receiving the indication; where the third request is used to request to acquire the discovered resource, the fourth request is used to request the base station to allocate and send the discovered resource to the second terminal, and the discovered resource is a resource used when the second terminal sends the second message.

In addition, when the second terminal acquires the discovered resource, the server may further receive a fifth request sent by the second terminal; and after receiving the fifth request, the server sends a sixth request to the management entity, so that the management entity sends the fourth request to the base station.

The fifth request is used to request to acquire the discovered resource, the fourth request is used to request the base station to allocate and send the discovered resource to the second terminal, and the discovered resource is a resource used when the second terminal sends the second message.

The fifth request may include a GUTI of the second terminal; and the server may send the sixth request to the management entity according to the GUTI.

In addition, the fifth request may further include the identity of the second terminal; before the server sends the sixth request to the management entity, the server may verify, according to the identity of the second terminal, whether the second terminal is authorized to be discovered; and if a verification result is that the second terminal is authorized to be discovered, the server executes the step of sending the sixth request to the management entity.

Alternatively, the fifth request includes the identity of the second terminal and the identity of the application using the discovered service in the second terminal; before the server sends the sixth request to the management entity, the server may further verify, according to the identity of the second terminal, whether the second terminal is authorized to be discovered, and verify, according to the identity of the application using the discovered service in the second terminal, whether the application is authorized to use the discovered function; and if a verification result is that the second terminal is authorized to be discovered and that the application is authorized to use the discovered function, the server executes the step of sending the sixth request to the management entity.

As described above, in the terminal discovery method provided by the embodiment of the present invention, a service identity of a second terminal sent by a first terminal is received, and description information of the second terminal corresponding to the service identity of the second terminal is acquired and provided for the first terminal. Thereby, a problem in the prior art that a first terminal must learn a unique identity of a second terminal in advance is solved, and an objective of discovering a terminal of an unknown identity in a vicinity and extending an application scope is achieved. In addition, in the terminal discovery method provided by the embodiment of the present invention, a service identity of the first terminal sent by a management entity is received, and whether the first terminal is authorized to discover the second terminal corresponding to the service identity in service identities of the at least one second terminal is verified according to the service identity of the first terminal, and thereby an objective of protecting privacy of the second terminal is achieved.

Figure 9:
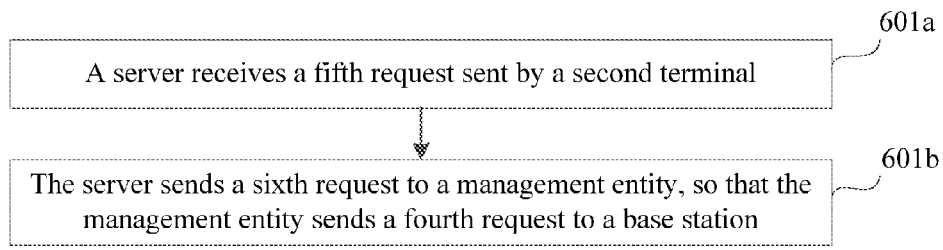
FIG. 9 is a method flowchart of a terminal discovery method according to an embodiment of the present invention.

Referring to FIG. 9, FIG. 9 shows a method flowchart of a terminal discovery method according to an embodiment of the present invention. The terminal discovery method may be applied to a server in a D2D system to request a discovered resource for a second terminal, so that the second terminal sends a second message according to the discovered resource. The terminal discovery method may include the following steps.

Step 601a: A server receives a fifth request sent by a second terminal.

Step 601b: The server sends a sixth request to a management entity, so that the management entity sends a fourth request to a base station.

The fifth request is used to request to acquire a discovered resource, the fourth request is used to request the base station to allocate and send the discovered resource to the second terminal, and the discovered resource is a resource used when the second terminal sends a second message.

As described above, in the terminal discovery method provided by the embodiment of the present invention, a server receives a fifth request sent by a second terminal, and sends a sixth request to a management entity, so that the management entity sends a fourth request to a base station to request the base station to allocate and send a discovered resource to the second terminal, so that the second terminal sends a second message according to the discovered resource allocated by the base station. Thereby, an objective of reducing interference between terminals is achieved.

Figure 10:
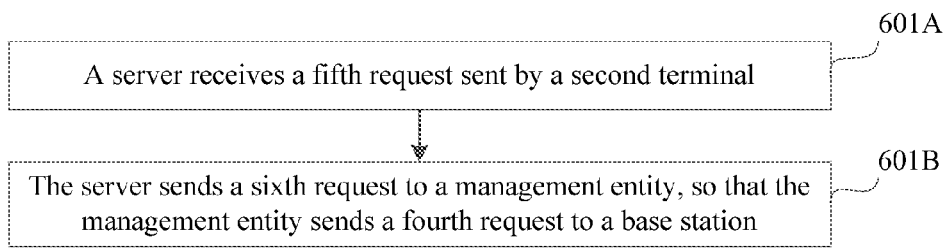
FIG. 10 is a method flowchart of a terminal discovery method according to another embodiment of the present invention.

For a more exemplary solution based on the foregoing terminal discovery method shown in FIG. 9, reference may be made to FIG. 10, which shows a method flowchart of a terminal discovery method according to an embodiment of the present invention. The terminal discovery method may be applied to a server in a D2D system to request a discovered resource for a second terminal, so that the second terminal sends a second message according to the discovered resource. The terminal discovery method may include the following steps.

Step 601A: A server receives a fifth request sent by a second terminal.

Step 601B: The server sends a sixth request to a management entity, so that the management entity sends a fourth request to a base station.

The fifth request is used to request to acquire a discovered resource, the fourth request is used to request the base station to allocate and send the discovered resource to the second terminal, and the discovered resource is a resource used when the second terminal sends a second message.

In addition, the fifth request includes a GUTI of the second terminal; and the server may send the sixth request to the management entity according to the GUTI.

As described above, in the terminal discovery method provided by the embodiment of the present invention, a server receives a fifth request sent by a second terminal, and sends a sixth request to a management entity, so that the management entity sends a fourth request to a base station to request the base station to allocate and send a discovered resource to the second terminal, so that the second terminal sends a second message according to the discovered resource allocated by the base station. Thereby, an objective of reducing interference between terminals is achieved.

Figure 11:
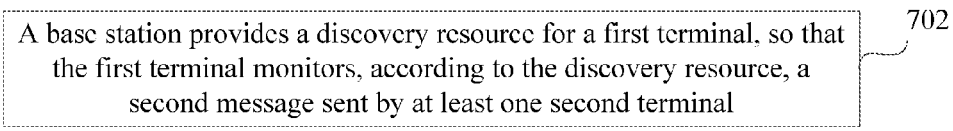
FIG. 11 is a method flowchart of a terminal discovery method according to an embodiment of the present invention.

Referring to FIG. 11, FIG. 11 shows a method flowchart of a terminal discovery method according to an embodiment of the present invention. The terminal discovery method may be applied to a base station in a D2D system. The terminal discovery method may include the following step.

Step 702: A base station provides a discovery resource for a first terminal, so that the first terminal monitors, according to the discovery resource, a second message sent by at least one second terminal.

The first terminal may acquire a service identity of the at least one second terminal according to the second message sent by the at least one second terminal, and acquire description information of the second terminal according to the service identity of the at least one second terminal.

As described above, in the terminal discovery method provided by the embodiment of the present invention, a discovery resource is provided for a first terminal, so that the first terminal monitors, according to the discovery resource, a second message sent by at least one second terminal, acquires a service identity of the second terminal according to the second message, and acquires description information of the second terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 12:
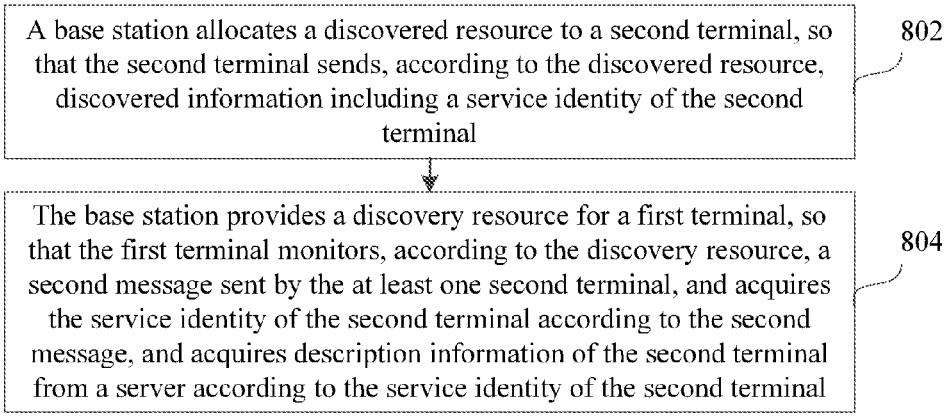
FIG. 12 is a method flowchart of a terminal discovery method according to another embodiment of the present invention.

For a more exemplary solution based on the foregoing terminal discovery method shown in FIG. 11, reference may be made to FIG. 12, which shows a method flowchart of a terminal discovery method according to another embodiment of the present invention. The terminal discovery method may be applied to a base station in a D2D system. The terminal discovery method may include the following steps.

Step 802: A base station allocates a discovered resource to a second terminal, so that the second terminal sends, according to the discovered resource, discovered information including a service identity of the second terminal.

The base station may receive a fourth request sent by a management entity, where the fourth request is sent by the management entity according to a third request sent by the second terminal or is sent by the management entity according to a sixth request sent by a server; and the base station allocates the discovered resource to the second terminal according to the fourth request, where the discovered resource is a resource used when the second terminal sends a second message.

The base station may directly send the discovered resource to the second terminal. The fourth request may be an S1-AP message including a third indication. After receiving the S1-AP message sent by the management entity, the base station allocates the discovered resource to the second terminal, and sends the discovered resource to the second terminal by using an RRC message. The third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal. It may be an indication for allocating the discovered resource or an indication for sending the discovered resource.

Alternatively, the base station sends the discovered resource to the management entity, so that the management entity sends the discovered resource to the second terminal. The fourth request may be an S1-AP including a fourth indication. After receiving the S1-AP message sent by the management entity, the base station sends the discovered resource to the management entity by using a container, and the management entity sends the container including the discovered resource to the second terminal by using an NAS message. The fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity. It may be an indication for allocating the discovered resource or an indication for sending the discovered resource.

The discovered resource may be information such as a frequency band, a time, or a coding scheme for sending the second message by the second terminal.

Step 804: The base station provides a discovery resource for a first terminal, so that the first terminal monitors, according to the discovery resource, the second message sent by the at least one second terminal, and acquires the service identity of the second terminal according to the second message, and acquires description information of the second terminal from a server according to the service identity of the second terminal.

The base station may receive a second request sent by the management entity, where the second request is sent by the management entity; and the base station acquires the discovery resource after receiving the second request.

The base station may directly send the discovery resource to the first terminal. The second request may be an S1-AP message including a first indication. After receiving the S1-AP message sent by the management entity, the base station sends the discovery resource to the first terminal by using an RRC message. The first indication is used to instruct the base station to send the discovery resource to the first terminal or used to instruct the base station to acquire the discovery resource and send the discovery resource to the first terminal. It may be an indication for sending the discovery resource.

Alternatively, the base station may send the acquired discovery resource to the management entity, so that the management entity sends the discovery resource to the first terminal. The second request may be an S1-AP message including a second indication. After receiving the S1-AP message sent by the management entity, the base station may send the discovery resource to the management entity by using a container, and the management entity sends the container including the discovery resource to the first terminal by using an NAS message. The second indication is used to instruct the base station to send the discovery resource to the management entity or used to instruct the base station to acquire the discovery resource and send the discovery resource to the management entity. It may be an indication for sending the discovery resource.

Alternatively, the base station may acquire the discovery resource corresponding to the first terminal; and send, in a cell in which the first terminal is located, system information including the discovery resource, so that the first terminal resolves the discovery resource in the system information.

It should be noted that the discovery resource includes a discovery resource of a serving cell of the first terminal or that the discovery resource includes a discovery resource of a serving cell of the first terminal and a discovery resource of a cell adjacent to the serving cell.

When acquiring the discovery resource corresponding to the first terminal, the base station may locally query the discovery resource of the current serving cell of the first terminal; or the base station may locally query the discovery resource of the current serving cell of the first terminal and the discovery resource of the cell adjacent to the serving cell; or the base station may locally query the discovery resource of the current serving cell of the first terminal, and query, from a neighboring base station through an X2 interface, the discovery resource of the cell adjacent to the serving cell.

Neighboring base stations are connected by the X2 interface. If the base stations exchange discovery resources of cells maintained by the base stations, or a neighboring base station is notified when a discovery resource of a cell in a base station changes, the base station stores the discovery resource of each cell maintained by the base station and the discovery resources of cells adjacent to each cell maintained by the base station. In this case, the base station may directly locally query the discovery resource of the current serving cell of the first terminal and the discovery resource of the cell adjacent to the serving cell. If the base station stores only the discovery resource of each cell maintained by the base station, and does not store the discovery resources of the cells adjacent to each cell maintained by the base station, the base station may query, from the neighboring base station through the X2 interface, the discovery resource of the cell adjacent to the serving cell of the first terminal.

In the solution provided by the embodiment of the present invention, a discovered resource is allocated to a second terminal, and a discovery resource is allocated to a first terminal, so that the first terminal monitors, according to the discovery resource, a second message that is sent by the second terminal according to the discovered resource. Because the first terminal needs to monitor only the second message of a frequency band, time, or specific coding scheme corresponding to the discovery resource, burden of the terminal can be reduced, and power of the terminal can be saved; in addition, when discovered resources corresponding to second terminals are different, interference between second messages sent by the second terminals can also be reduced effectively.

As described above, in the terminal discovery method provided by the embodiment of the present invention, a discovery resource is provided for a first terminal, so that the first terminal monitors, according to the discovery resource, a second message sent by at least one second terminal, and acquires a service identity of the second terminal according to the second message, and acquires description information of the second terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, in the terminal discovery method provided by the embodiment of the present invention, a discovered resource is allocated to the second terminal, and the discovery resource is allocated to the first terminal, so that the first terminal monitors, according to the discovery resource, the second message that is sent by the second terminal according to the discovered resource. Thereby, an objective of reducing burden of the terminal and saving power of the terminal while effectively reducing interference and saving hardware resources is achieved.

Figure 13:
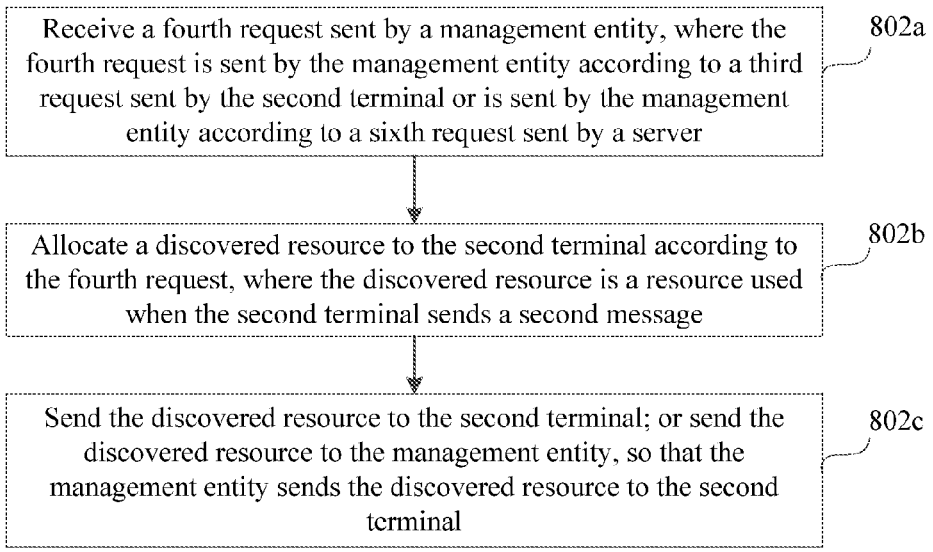
FIG. 13 is a method flowchart of a terminal discovery method according to an embodiment of the present invention.

For step 802 in FIG. 12, reference may be made to FIG. 13, which shows a method flowchart of a terminal discovery method according to an embodiment of the present invention. The terminal discovery method may be applied to a base station to allocate a discovered resource to a second terminal, so that the second terminal sends a second message according to the discovered resource. The terminal discovery method may include the following steps.

Step 802*a*: Receive a fourth request sent by a management entity, where the fourth request is sent by the management entity according to a third request sent by the second terminal or is sent by the management entity according to a sixth request sent by a server.

Step 802*b*: Allocate a discovered resource to the second terminal according to the fourth request, where the discovered resource is a resource used when the second terminal sends a second message.

Step 802*c*: Send the discovered resource to the second terminal; or send the discovered resource to the management entity, so that the management entity sends the discovered resource to the second terminal.

As described above, in the terminal discovery method provided by the embodiment of the present invention, a discovered resource is allocated to a second terminal according to a fourth request sent by a management entity, and the discovered resource is sent to the second terminal, or the discovered resource is sent to the second terminal through the management entity, so that the second terminal sends a second message according to the discovered resource. Thereby, an objective of reducing interference between terminals is achieved.

Figure 14:
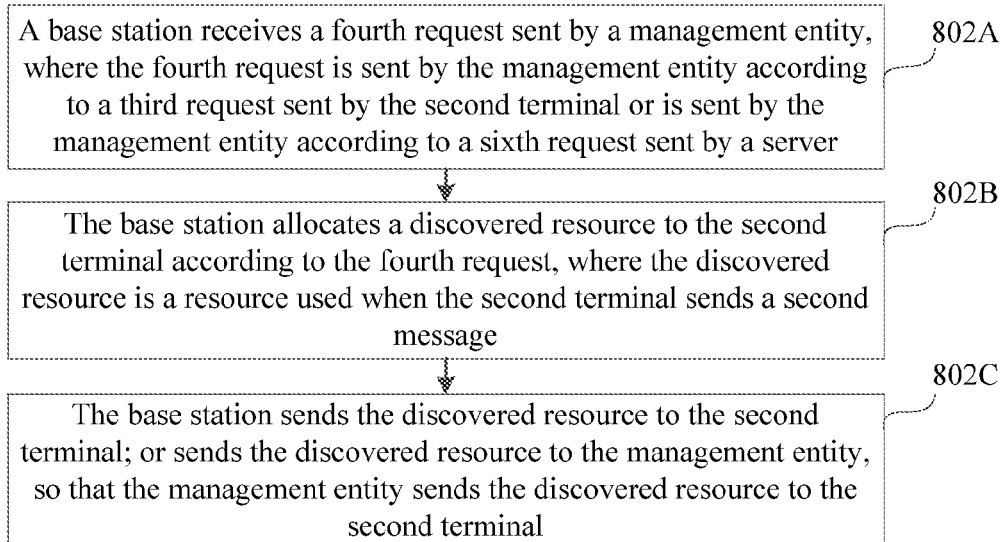
FIG. 14 is a method flowchart of a terminal discovery method according to another embodiment of the present invention.

For a more exemplary solution based on the foregoing method shown in FIG. 13, reference may be made to FIG. 14, which shows a method flowchart of a terminal discovery method according to another embodiment of the present invention. The terminal discovery method may be applied to a base station to allocate a discovered resource to a second terminal, so that the second terminal sends a second message according to the discovered resource. The terminal discovery method may include the following steps.

Step 802A: A base station receives a fourth request sent by a management entity, where the fourth request is sent by the management entity according to a third request sent by the second terminal or is sent by the management entity according to a sixth request sent by a server.

The fourth request may be an S1-AP message sent by the management entity.

The base station may receive an S1-AP message sent by the management entity, where the S1-AP message includes a third indication, where the third indication is used to instruct the base station to allocate a discovered resource, or allocate a discovered resource to the second terminal, or allocate a discovered resource and send the discovered resource to the second terminal, or allocate a discovered resource to the second terminal and send the discovered resource to the second terminal.

Alternatively, the base station may receive an S1-AP message sent by the management entity, where the S1-AP message includes a fourth indication, where the fourth indication is used to instruct the base station to allocate a discovered resource, or allocate a discovered resource to the second terminal, or allocate a discovered resource and send the discovered resource to the management entity, or allocate a discovered resource to the second terminal and send the discovered resource to the management entity.

Step 802B: The base station allocates a discovered resource to the second terminal according to the fourth request, where the discovered resource is a resource used when the second terminal sends a second message.

The discovered resource may include information such as a frequency band, a time, or a coding scheme for sending the second message by the second terminal.

Step 802C: The base station sends the discovered resource to the second terminal; or sends the discovered resource to the management entity, so that the management entity sends the discovered resource to the second terminal.

When the fourth request is an S1-AP message including a third indication, the base station sends the discovered resource to the second terminal by using an RRC message.

When the fourth request is an S1-AP message including a fourth indication, the base station sends the discovered resource to the management entity by using a container, so that the management entity sends the discovered resource to the second terminal by using an NAS message.

As described above, in the terminal discovery method provided by the embodiment of the present invention, a discovered resource is allocated to a second terminal according to a fourth request sent by a management entity, and the discovered resource is sent to the second terminal, or the discovered resource is sent to the second terminal through the management entity, so that the second terminal sends a second message according to the discovered resource. Thereby, an objective of reducing interference between terminals is achieved.

Figure 15:
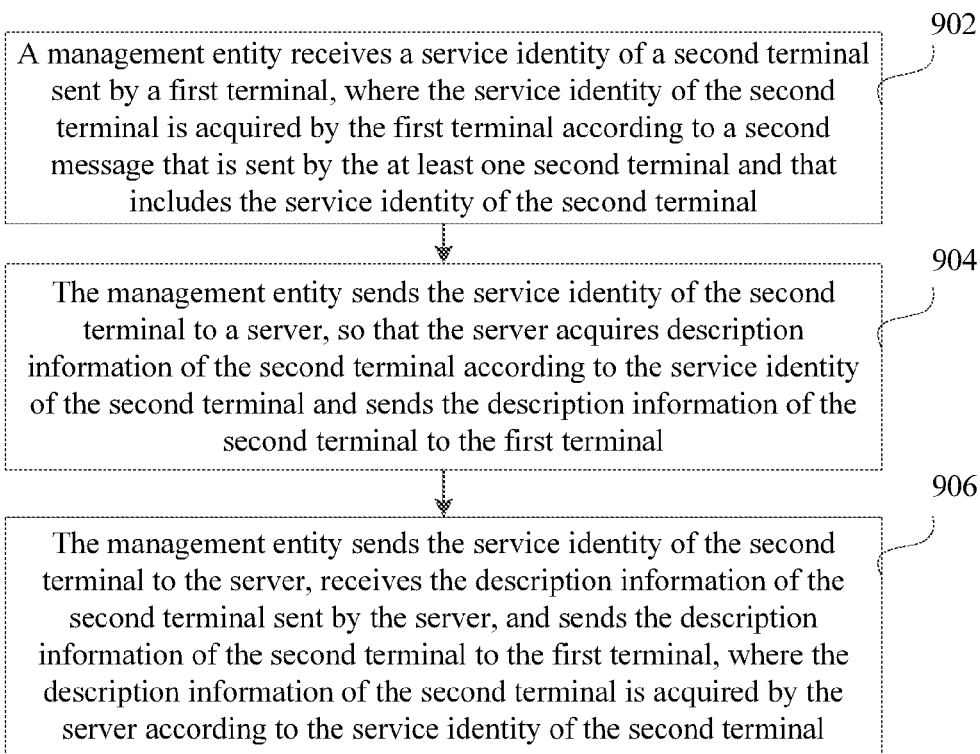
FIG. 15 is a method flowchart of a terminal discovery method according to an embodiment of the present invention.

Referring to FIG. 15, FIG. 15 shows a method flowchart of a terminal discovery method according to an embodiment of the present invention. The terminal discovery method may be applied to a management entity in a D2D system. The terminal discovery method may include the following steps.

Step 902: A management entity receives a service identity of a second terminal sent by a first terminal, where the service identity of the second terminal is acquired by the first terminal according to a second message that is sent by the at least one second terminal and that includes the service identity of the second terminal.

Step 904: The management entity sends the service identity of the second terminal to a server, so that the server acquires description information of the second terminal according to the service identity of the second terminal and sends the description information of the second terminal to the first terminal.

Step 906: The management entity sends the service identity of the second terminal to the server, receives the description information of the second terminal sent by the server, and sends the description information of the second terminal to the first terminal, where the description information of the second terminal is acquired by the server according to the service identity of the second terminal.

As described above, in the terminal discovery method provided by the embodiment of the present invention, a service identity of a second terminal sent by a first terminal is received and sent to a server, so that the server provides description information of the second terminal for the first terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 16:
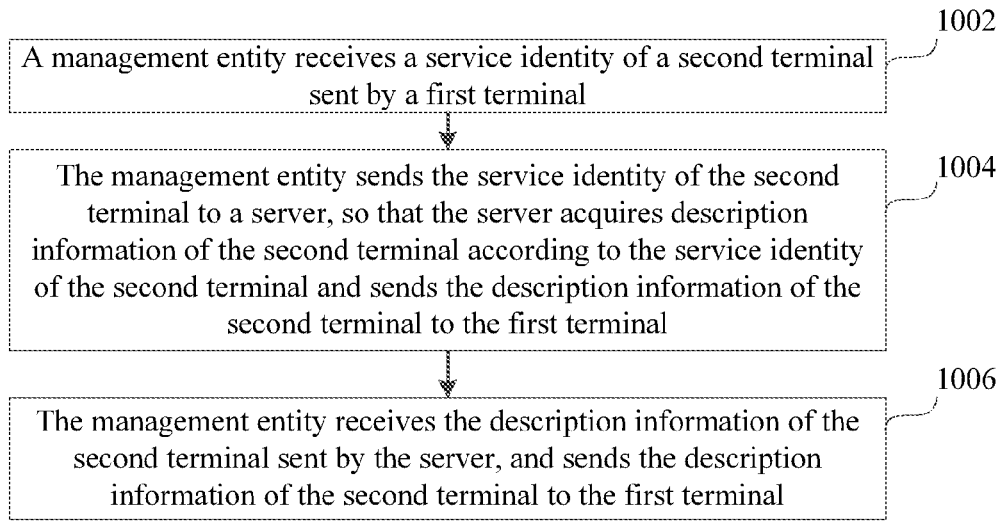
FIG. 16 is a method flowchart of a terminal discovery method according to another embodiment of the present invention.

For a more exemplary solution based on the foregoing terminal discovery method shown in FIG. 15, reference may be made to FIG. 16, which shows a method flowchart of a terminal discovery method according to another embodiment of the present invention. The terminal discovery method may be applied to a management entity in a D2D system. The terminal discovery method may include the following step.

Step 1002: A management entity receives a service identity of a second terminal sent by a first terminal.

The service identity of the at least one second terminal is acquired by the first terminal according to a second message that is sent by the at least one second terminal and that includes the service identity of the second terminal.

Preferably, the management entity may request a discovery resource for the first terminal in advance, and request a discovered resource for the second terminal in advance. Details are as follows below.

When requesting the discovery resource for the first terminal, the management entity receives a first request sent by the first terminal, where the first request is used to request to acquire the discovery resource; the management entity sends a second request to a base station according to the first request, where the second request is used to instruct the base station to send the discovery resource to the first terminal; and the base station may directly send the discovery resource to the first terminal according to the second request. Alternatively, the second request is used to instruct the base station to send the discovery resource to the management entity; and after receiving the discovery resource sent by the base station, the management entity sends the discovery resource to the first terminal, where the discovery resource is a resource used when the first terminal monitors the second message.

The second request may be an S1-AP message. The management entity may send an S1-AP message to the base station according to the first request, where the S1-AP message includes a first indication, where the first indication is used to instruct the base station to send the discovery resource to the first terminal or used to instruct the base station to acquire the discovery resource and send the discovery resource to the first terminal, so that the base station sends the discovery resource to the first terminal by using an RRC message. Alternatively, the management entity may send an S1-AP message to the base station according to the first request, where the S1-AP message includes a second indication, where the second indication is used to instruct the base station to send the discovery resource to the management entity or used to instruct the base station to acquire the discovery resource and send the discovery resource to the management entity; and the management entity receives the discovery resource that is sent by the base station by using a container, and sends the discovery resource to the first terminal by using an NAS message.

Preferably, the first request may further include an identity of the first terminal; before sending the second request to the base station according to the first request, the management entity may further send the identity of the first terminal to a server, so that the server verifies, according to the identity of the first terminal, whether the first terminal is authorized to discover the second terminal; the management entity may receive an indication fed back by the server and indicating that the first terminal is authorized to discover the second terminal; and after receiving the indication fed back by the server and indicating that the first terminal is authorized to discover the second terminal, the management entity sends the second request to the base station according to the first request, or otherwise, does not send the second request.

Alternatively, the first request may further include an identity of the first terminal and an identity of an application using a discovery service in the first terminal; before sending the second request to the base station according to the first request, the management entity may further send the identity of the first terminal and the identity of the application using the discovery service in the first terminal to a server, so that the server verifies, according to the identity of the first terminal and the identity of the application using the discovery service in the first terminal, whether the first terminal is authorized to discover the second terminal and whether the application is authorized to use a discovery function; the management entity may receive an indication fed back by the server and indicating that the first terminal is authorized to discover the second terminal and that the application is authorized to use the discovery function; and after receiving the indication fed back by the server and indicating that the first terminal is authorized to discover the second terminal and that the application is authorized to use the discovery function, the management entity may send the second request to the base station according to the first request, or otherwise, does not send the second request.

In addition, when requesting to allocate the discovered resource to the second terminal, the management entity may further receive a third request sent by the second terminal, and send a fourth request to the base station according to the third request, so that the base station allocates and sends the discovered resource to the second terminal according to the fourth request; or the management entity sends a fourth request to the base station according to the third request, and receives the discovered resource that is allocated and sent by the base station according to the fourth request, and sends the discovered resource to the second terminal; or when requesting to allocate the discovered resource to the second terminal, the management entity may further receive a sixth request sent by the server, and send a fourth request to the base station according to the sixth request, so that the base station allocates and sends the discovered resource to the second terminal according to the fourth request; or the management entity sends a fourth request to the base station according to the sixth request, and receives the discovered resource that is allocated and sent by the base station according to the fourth request, and sends the discovered resource to the second terminal. The discovered resource is a resource used when the second terminal sends the second message.

The fourth request may be an S1-AP message. The management entity may send an S1-AP message to the base station according to the third request, where the S1-AP message includes a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal, so that the base station sends the discovered resource to the second terminal by using an RRC message.

Alternatively, the management entity may send an S1-AP message to the base station according to the third request, where the S1-AP message includes a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity; and the management entity receives the discovered resource that is sent by the base station by using a container, and sends the discovered resource to the second terminal by using an NAS message.

Preferably, the third request may include an identity of the second terminal; before sending the fourth request to the base station according to the third request, the management entity may further send the identity of the second terminal to the server, so that the server verifies, according to the identity of the second terminal, whether the second terminal is authorized to be discovered; the management entity may receive an indication fed back by the server and indicating that the second terminal is authorized to be discovered; and after receiving the indication fed back by the server and indicating that the second terminal is authorized to be discovered, the management entity may send the fourth request to the base station according to the third request, or otherwise, does not send the fourth request.

Alternatively, the third request includes an identity of the second terminal and an identity of an application using a discovered service in the second terminal; before sending the fourth request to the base station according to the third request, the management entity may further send the identity of the second terminal and the identity of the application using the discovered service in the second terminal to the server, so that the server verifies, according to the identity of the second terminal and the identity of the application using the discovered service in the second terminal, whether the second terminal is authorized to be discovered and whether the application is authorized to use a discovered function; the management entity may receive an indication fed back by the server and indicating that the second terminal is authorized to be discovered and that the application is authorized to use the discovered function; and after receiving the indication fed back by the server and indicating that the second terminal is authorized to be discovered and that the application is authorized to use the discovered function, the management entity may send the fourth request to the base station according to the third request, or otherwise, does not send the fourth request.

Step 1004: The management entity sends the service identity of the second terminal to a server, so that the server acquires description information of the second terminal according to the service identity of the second terminal and sends the description information of the second terminal to the first terminal.

Step 1006: The management entity receives the description information of the second terminal sent by the server, and sends the description information of the second terminal to the first terminal.

The description information of the second terminal is acquired by the server by performing a query according to the service identity of the second terminal.

Preferably, the management entity may further receive a service identity of the first terminal sent by the first terminal, and send the service identity of the first terminal to the server, so that the server verifies, according to the service identity of the first terminal, whether the first terminal has a discovery permission and whether the second terminal is allowed to be discovered.

When a verification result received from the server is that the first terminal is authorized to discover the second terminal, the management entity may acquire and send the description information of the second terminal.

For example, to protect privacy of the second terminal, the second terminal may preset a discovery permission. For example, a second terminal corresponding to a service identity of a second terminal in multiple second terminals sent by the first terminal is preset to be discovered by only a buddy. While sending the service identity of the second terminal to the management entity, the first terminal further sends the service identity of the first terminal to the server. If the server verifies, according to the service identity of the first terminal, that the first terminal is not a buddy of the second terminal, the server verifies that the first terminal is not authorized to discover the second terminal, and therefore the server does not send the description information of the second terminal to the first terminal.

In the solution provided by the embodiment of the present invention, a discovery resource is requested to be allocated to a first terminal, and a discovered resource is requested to be allocated to a second terminal, so that the first terminal monitors, according to the discovery resource, a second message that is sent by the second terminal according to the discovered resource. Because the first terminal needs to monitor only the second message of a frequency band and time corresponding to the discovery resource, burden of the terminal can be reduced, and power of the terminal can be saved; in addition, when discovered resources corresponding to second terminals are different, interference between second messages sent by the second terminals can also be reduced effectively.

As described above, in the terminal discovery method provided by the embodiment of the present invention, a service identity of a second terminal sent by a first terminal is received and sent to a server, so that the server provides description information of the second terminal for the first terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, in the terminal discovery method provided by the embodiment of the present invention, a discovery resource is requested to be allocated to the first terminal, and a discovered resource is requested to be allocated to the second terminal, so that the first terminal monitors, according to the discovery resource, a second message that is sent by the second terminal according to the discovered resource. Thereby, an objective of reducing burden of the terminal, saving power of the terminal, and effectively reducing interference between second messages sent by the second terminals is achieved. Finally, in the terminal discovery method provided by the embodiment of the present invention, a service identity of the first terminal sent by the first terminal is further received, and the service identity is sent to the server, so that the server verifies, according to the service identity of the first terminal, whether the first terminal is authorized to discover the second terminal corresponding to the service identity of the at least one second terminal. Thereby, an objective of protecting privacy of the second terminal is protected.

Figure 17:
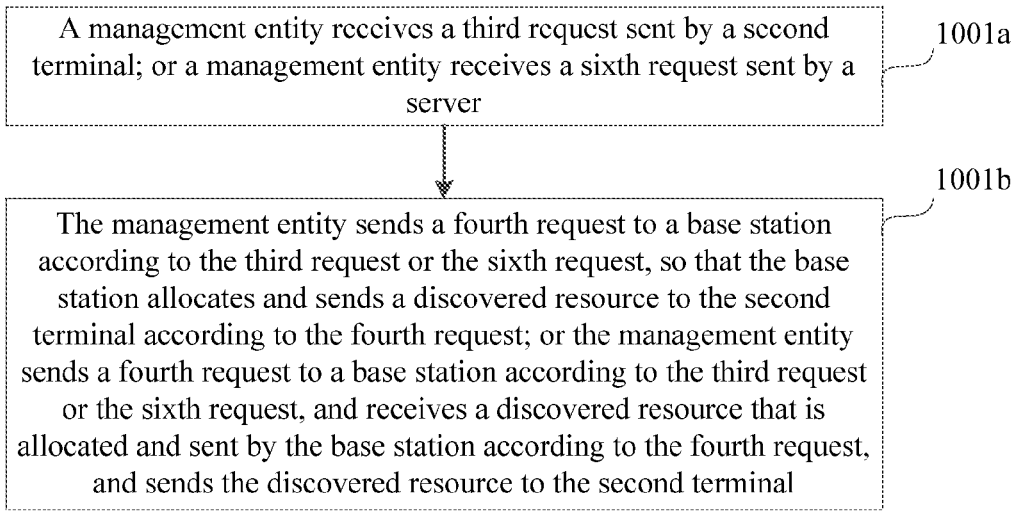
FIG. 17 is a method flowchart of a terminal discovery method according to an embodiment of the present invention.

For a step of requesting a discovered resource for a second terminal in advance by a management entity before step 1002 in FIG. 16, reference may be made to FIG. 17, which shows a method flowchart of a terminal discovery method according to an embodiment of the present invention. The terminal discovery method may be applied to a management entity to request a discovered resource for a second terminal, so that the second terminal sends a second message according to the discovered resource. The method may include the following steps.

Step 1001a: A management entity receives a third request sent by a second terminal; or a management entity receives a sixth request sent by a server.

Step 1001b: The management entity sends a fourth request to a base station according to the third request or the sixth request, so that the base station allocates and sends a discovered resource to the second terminal according to the fourth request; or the management entity sends a fourth request to a base station according to the third request or the sixth request, and receives a discovered resource that is allocated and sent by the base station according to the fourth request, and sends the discovered resource to the second terminal.

The discovered resource is a resource used when the second terminal sends a second message.

As described above, in the terminal discovery method provided by the embodiment of the present invention, a third request sent by a second terminal is received, or a sixth request sent by a server is received; a fourth request is sent to a base station according to the third request or the sixth request, so that the base station allocates and sends a discovered resource to the second terminal according to the fourth request; or a fourth request is sent to a base station according to the third request or the sixth request, and a discovered resource that is allocated and sent by the base station according to the fourth request is received, and the discovered resource is sent to the second terminal; therefore, the second terminal sends a second message according to the discovered resource. Thereby, an objective of reducing interference between terminals is achieved.

Figure 18:
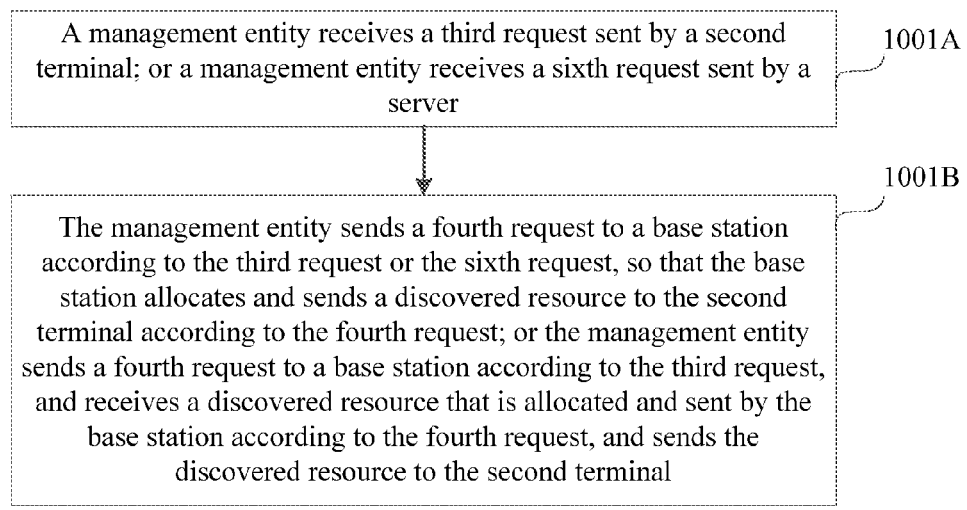
FIG. 18 is a method flowchart of a terminal discovery method according to another embodiment of the present invention.

For a more exemplary solution based on the foregoing terminal discovery method shown in FIG. 17, reference may be made to FIG. 18, which shows a terminal discovery method according to another embodiment of the present invention. The terminal discovery method may be applied to a management entity to request a discovered resource for a second terminal, so that the second terminal sends a second message according to the discovered resource. The method may include the following steps.

Step 1001A: A management entity receives a third request sent by a second terminal; or a management entity receives a sixth request sent by a server.

Step 1001B: The management entity sends a fourth request to a base station according to the third request or the sixth request, so that the base station allocates and sends a discovered resource to the second terminal according to the fourth request; or the management entity sends a fourth request to a base station according to the third request, and receives a discovered resource that is allocated and sent by the base station according to the fourth request, and sends the discovered resource to the second terminal.

The discovered resource is a resource used when the second terminal sends a second message.

The fourth request may be an S1-AP message.

The management entity may send an S1-AP message to the base station according to the third request, where the S1-AP message includes a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal, so that the base station sends the discovered resource to the second terminal by using an RRC message.

Alternatively, the management entity may send an S1-AP message to the base station according to the third request, where the S1-AP message includes a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity; and the management entity may receive the discovered resource that is sent by the base station by using a container, and send the discovered resource to the second terminal by using an NAS message.

As described above, in the terminal discovery method provided by the embodiment of the present invention, a third request sent by a second terminal is received, or a sixth request sent by a server is received; a fourth request is sent to a base station according to the third request or the sixth request, so that the base station allocates and sends a discovered resource to the second terminal according to the fourth request; or a fourth request is sent to a base station according to the third request or the sixth request, and a discovered resource that is allocated and sent by the base station according to the fourth request is received, and the discovered resource is sent to the second terminal; therefore, the second terminal sends a second message according to the discovered resource. Thereby, an objective of reducing interference between terminals is achieved.

Figure 19:
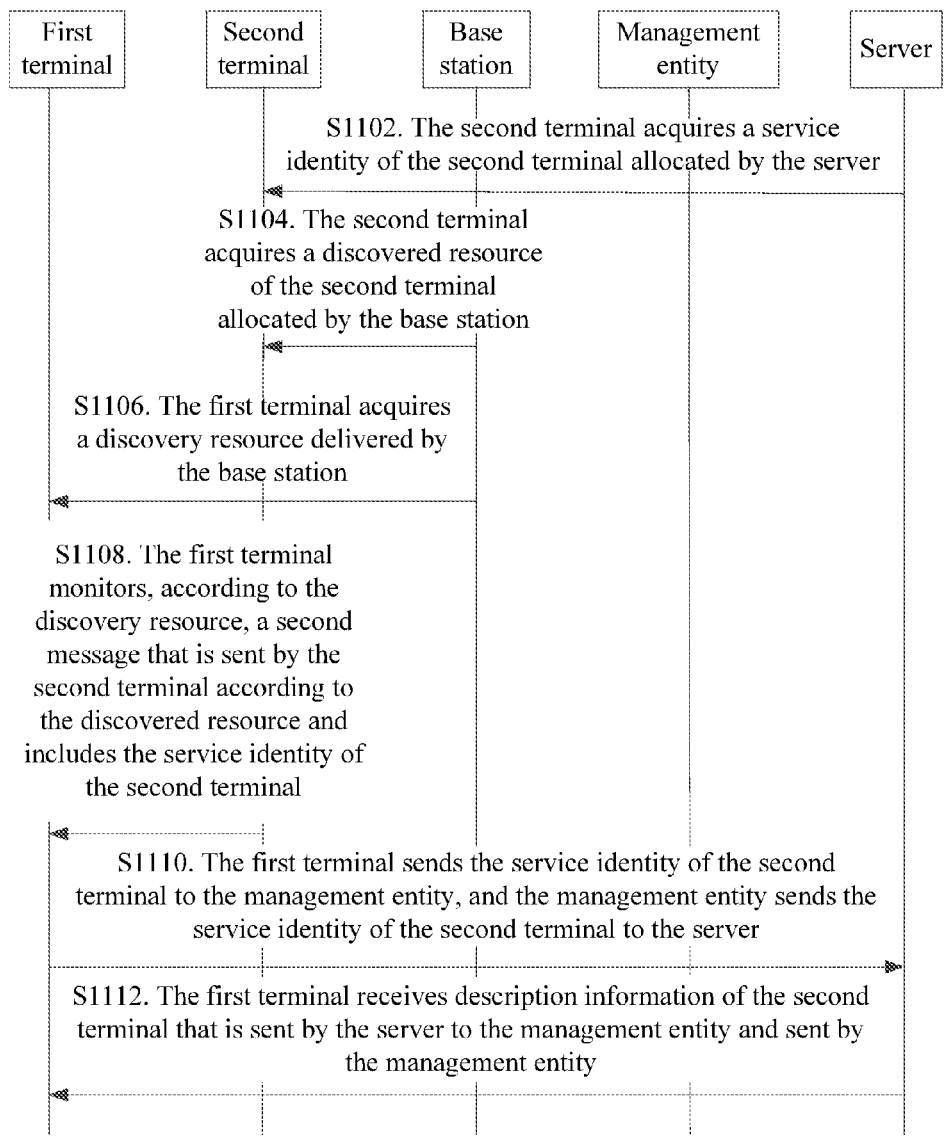
FIG. 19 is a method flowchart of a terminal discovery method according to an embodiment of the present invention.

Referring to FIG. 19, FIG. 19 shows a method flowchart of a terminal discovery method according to an embodiment of the present invention. The terminal discovery method may be applied to a D2D communication system including a first terminal, a second terminal, a management entity, a server, and a base station. The terminal discovery method may include the following steps.

Step 1102: A second terminal acquires a service identity of the second terminal allocated by a server.

Figure 20:
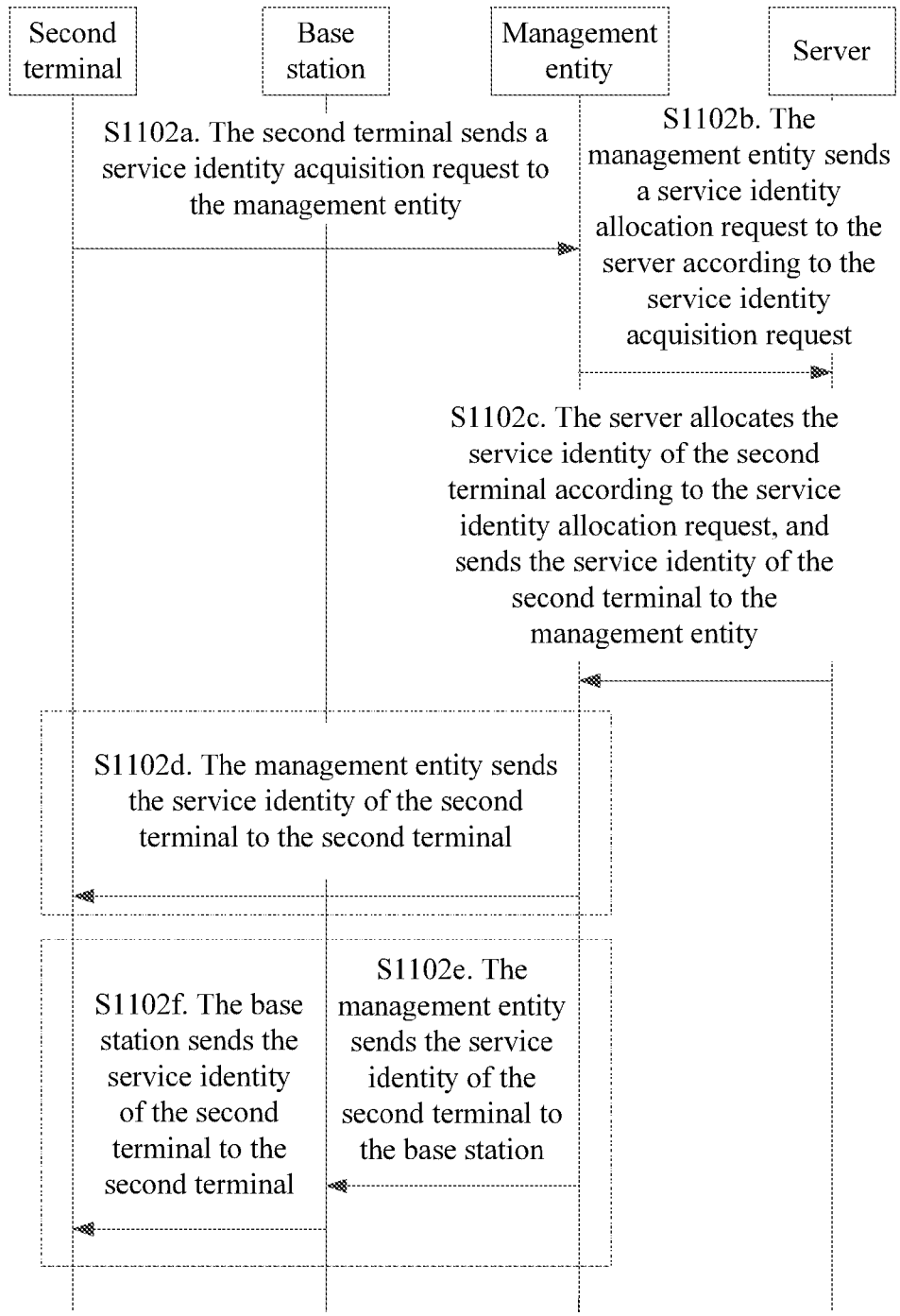
FIG. 20 is a method flowchart in a process of acquiring a service identity according to an embodiment of the present invention.

Reference may be made to FIG. 20, which shows a method flowchart in the process of acquiring the service identity according to the embodiment. The specific process in which the second terminal acquires the service identity of the second terminal allocated by the server is as follows.

Step 1102*a*: The second terminal sends a service identity acquisition request to a management entity.

The service identity acquisition request may include an identity and description information of the second terminal.

Step 1102*b*: The management entity sends a service identity allocation request to the server according to the service identity acquisition request.

The service identity allocation request may include the identity and description information of the second terminal. The identity of the second terminal may be the identity included in the service identity acquisition request that is sent by the second terminal; and the description information of the second terminal may be the description information included in the service identity acquisition request that is sent by the second terminal, or may be description information of the second terminal that is stored in advance by the management entity.

Step 1102*c*: The server allocates the service identity of the second terminal according to the service identity allocation request, and sends the service identity of the second terminal to the management entity.

The server may first verify, according to the identity of the second terminal included in the service identity allocation request, whether the second terminal is authorized to be discovered by other terminals, and if the second terminal is authorized to be discovered by other terminals, allocates the service identity to the second terminal.

After allocating the service identity to the second terminal, the server further stores the service identity of the second terminal in a correspondence to the description information of the second terminal.

The service identity may be a D2D code or an expression code.

Step 1102d: The management entity sends the service identity of the second terminal to the second terminal.

The management entity may send the service identity of the second terminal to the second terminal by using an NAS message.

Alternatively,

Step 1102e: The management entity sends the service identity of the second terminal to a base station.

The management entity may send the service identity of the second terminal to the base station by using an S1-AP message.

Step 1102f: The base station sends the service identity of the second terminal to the second terminal.

The base station may send the service identity of the second terminal to the second terminal by using an RRC message.

Step 1104: The second terminal acquires a discovered resource of the second terminal allocated by the base station.

Figure 21:
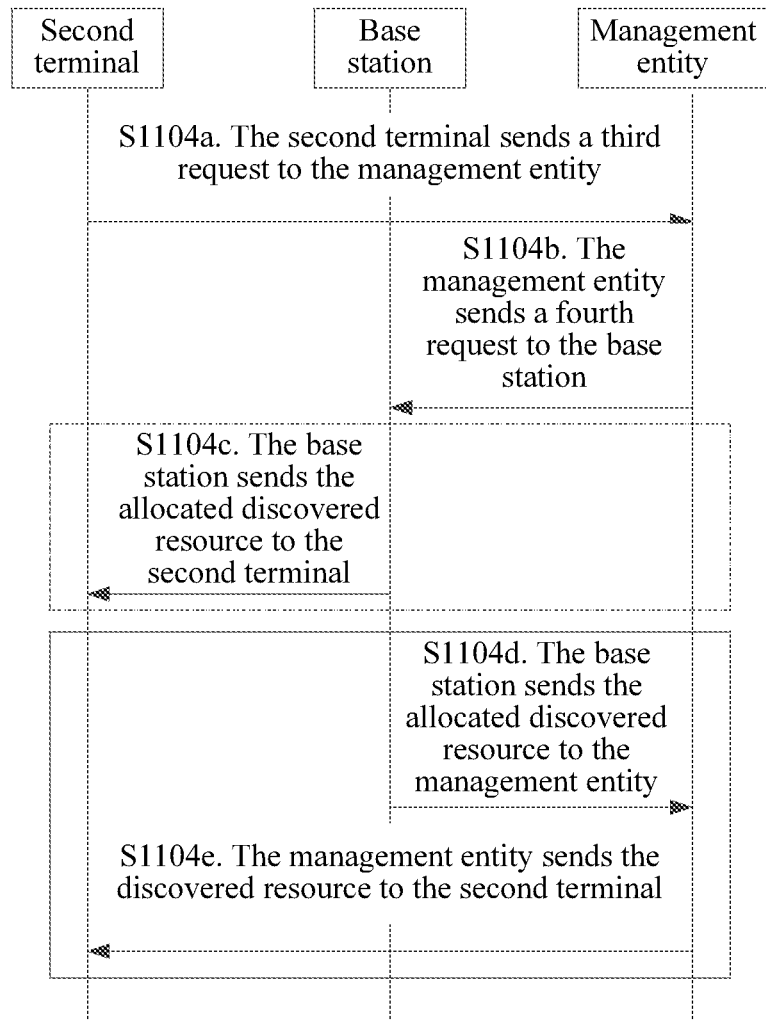
FIG. 21 is a method flowchart in a process of acquiring a discovered resource according to an embodiment of the present invention.

Reference may be made to FIG. 21, which shows a method flowchart in the process of acquiring the discovered resource according to the embodiment. The process in which the second terminal acquires the discovered resource of the second terminal allocated by the base station is as follows.

Step 1104a: The second terminal sends a third request to the management entity.

The request sent for acquiring the discovered resource by the second terminal may include the identity of the second terminal.

Step 1104b: The management entity sends a fourth request to the base station.

Before sending the fourth request to the base station, the management entity may further send the identity of the second terminal to the base station, and when the base station verifies, according to the identity of the second terminal, that the second terminal is authorized to acquire the discovered resource, sends the fourth request to the base station.

Step 1104c: The base station sends the allocated discovered resource to the second terminal.

The base station may send the discovered resource to the second terminal by using an RRC message.

Alternatively,

Step 1104d: The base station sends the allocated discovered resource to the management entity.

The base station may send the discovered resource to the management entity by using an S1-AP message.

Step 1104e: The management entity sends the discovered resource to the second terminal.

The management entity sends the discovered resource to the second terminal by using an NAS message.

The discovered resource may include information such as a frequency band and time for sending broadcast information by the second terminal.

Step 1106: A first terminal acquires a discovery resource sent by the base station.

Figure 22:
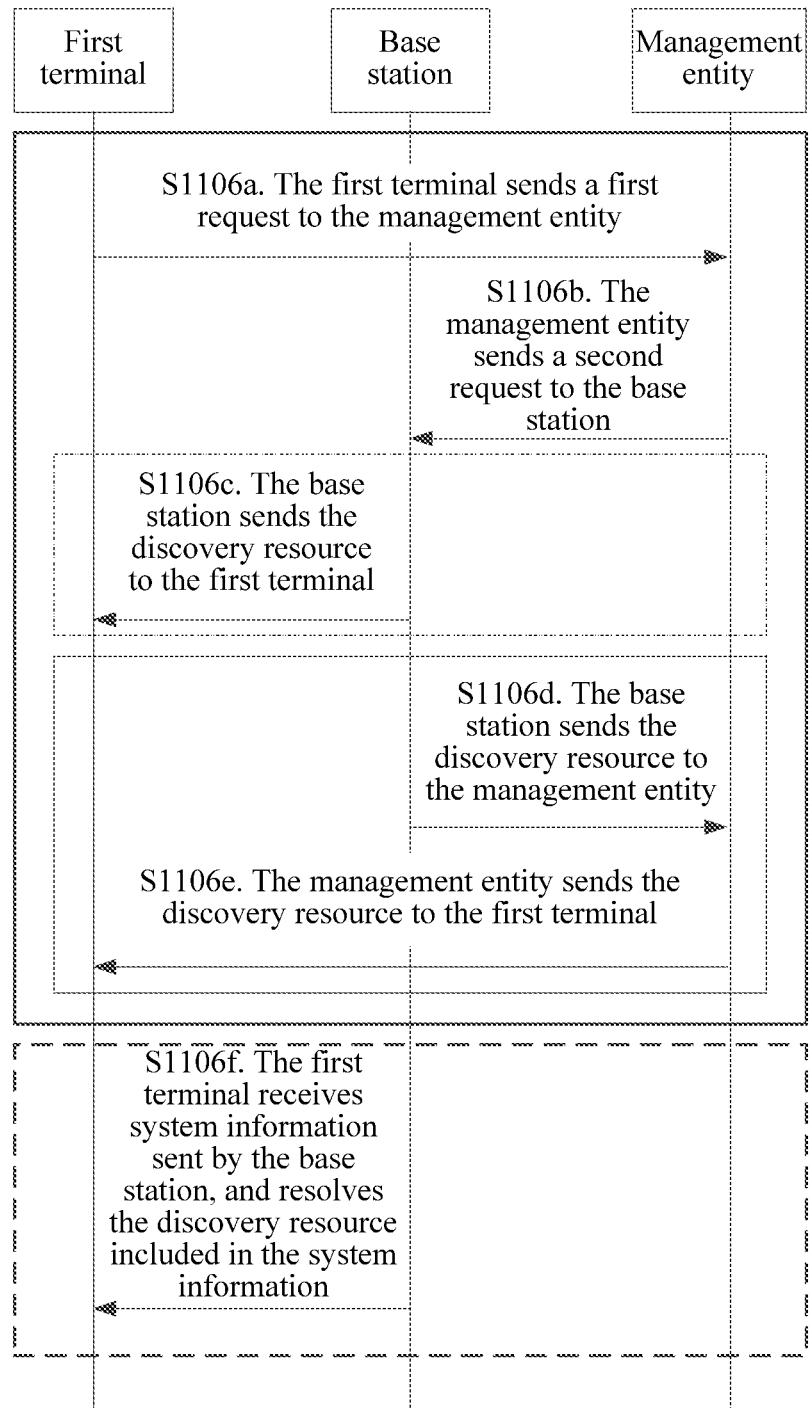
FIG. 22 is a method flowchart in a process of acquiring a discovery resource according to an embodiment of the present invention.

Reference may be made to FIG. 22, which shows a method flowchart in the process of acquiring the discovery resource according to the embodiment. The specific process in which the first terminal acquires the discovery resource sent by the base station is as follows.

Step 1106a: The first terminal sends a first request to the management entity.

The first request sent by the first terminal may include an identity of the first terminal.

Step 1106b: The management entity sends a second request to the base station.

Before sending the second request to the base station, the management entity may send the identity of the first terminal to the server, and when the server verifies, according to the identity of the first terminal, that the first terminal is authorized to discover other terminals, send the second request to the base station.

Step 1106c: The base station sends the discovery resource to the first terminal.

The base station may query the discovery resource corresponding to the first terminal, and send the discovery resource to the first terminal by using an RRC message.

Alternatively,

Step 1106d: The base station sends the discovery resource to the management entity.

The base station may query the discovery resource corresponding to the first terminal, and send the discovery resource to the management entity by using an S1-AP message.

Step 1106e: The management entity sends the discovery resource to the first terminal.

The management entity sends the discovery resource to the first terminal by using an NAS message.

The discovery resource may include information such as a frequency band, a time, and a coding scheme for monitoring a second message by the first terminal.

In addition, the discovery resource includes a discovery resource of a current serving cell of the first terminal; or the discovery resource includes a discovery resource of a current serving cell of the first terminal and a discovery resource of a cell adjacent to the serving cell.

When querying the discovery resource corresponding to the first terminal, the base station may locally query the discovery resource of the current serving cell of the first terminal and the discovery resource of the cell adjacent to the serving cell; or the base station may locally query the discovery resource of the current serving cell of the first terminal, and query, from a neighboring other base station, the discovery resource of the cell adjacent to the serving cell.

Neighboring base stations are connected by the X2 interface. If the base stations exchange discovery resources of cells maintained by the base stations, or a neighboring base station is notified when a discovery resource of a cell in a base station changes, the base station stores the discovery resource of each cell maintained by the base station and the discovery resources of cells adjacent to each cell maintained by the base station. In this case, the base station may directly locally query the discovery resource of the current serving cell of the first terminal and the discovery resource of the cell adjacent to the serving cell. If the base station stores only the discovery resource of each cell maintained by the base station, and does not store the discovery resources of the cells adjacent to each cell maintained by the base station, the base station may query, from the neighboring base station through the X2 interface, the discovery resource of the cell adjacent to the serving cell of the first terminal.

Alternatively,

Step 1106f: The first terminal receives system information sent by the base station, and resolves the discovery resource included in the system information.

The base station may actively send the discovery resource to the first terminal. The base station may extend existing system information to include the discovery resource into the system information, and send the system information including the discovery resource to the first terminal.

Step 1108: The first terminal monitors, according to the discovery resource, a second message that is sent by the second terminal according to the discovered resource and includes the service identity of the second terminal.

The second terminal may send the second message immediately after acquiring the discovered resource allocated by the base station, or may send the second message after receiving a first message sent by the first terminal.

The second terminal sends the second message according to the information included in the discovered resource, such as the frequency band, time, and coding scheme, where the second message includes the service identity of the second terminal.

The first terminal monitors, according to the information included in the discovery resource, such as the frequency band, time, and coding scheme, second messages sent by other terminals in a vicinity.

Step 1110: The first terminal sends the service identity of the second terminal to the management entity, and the management entity sends the service identity of the second terminal to the server.

The first terminal may acquire the service identity of the second terminal by filtering service identities included in all monitored second messages. For example, a service identity included in a second message whose signal strength reaches a threshold is acquired and used as the service identity of the second terminal, or types of service identities are detected, and a service identity that complies with a predetermined type is acquired and used as the service identity of the second terminal.

The first terminal sends the service identity of the second terminal and a service identity of the first terminal to the management entity, and the management entity sends the identities to the server.

A manner of acquiring the service identity of the first terminal is similar to the manner in step 1102 in which the second terminal acquires the service identity, and is not further described herein.

Step 1112: The first terminal receives description information of the second terminal that is sent by the server to the management entity and sent by the management entity.

After receiving the service identity of the second terminal and the service identity of the first terminal that are sent by the management device, the server may first verify, according to the service identity of the first terminal, whether the first terminal is authorized to discover the second terminal, and if a verification result is that the first terminal is authorized to discover the second terminal, query the description information of the second terminal that is stored in a correspondence to the service identity of the second terminal.

It should be noted that in the terminal discovery method provided by the embodiment of the present invention, the first terminal sends, through the management entity, the acquired service identity of the second terminal and the service identity of the first terminal to the server, and receives, through the management entity, the description information of the second terminal that is queried and sent by the server. In actual application, without using the management entity, the first terminal may also directly send the acquired service identity of the second terminal and the service identity of the first terminal to the server, and directly receive the service identity of the second terminal that is queried and sent by the server.

As described above, in the terminal discovery method provided by the embodiment of the present invention, a first terminal monitors broadcast information that is sent by at least one second terminal and includes a service identity of the second terminal, and acquires the service identity of the second terminal; and acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, in the terminal discovery method provided by the embodiment of the present invention, the first terminal monitors, according to an acquired discovery resource, a second message that is sent by the second terminal according to a discovered resource. Thereby, an objective of reducing burden of the terminal, saving power of the terminal, and effectively reducing interference between second messages sent by the second terminals is achieved. Finally, in the terminal discovery method provided by the embodiment of the present invention, the first terminal sends a service identity of the first terminal to a management entity, so that the server verifies, according to the service identity of the first terminal, whether the first terminal is authorized to discover the second terminal, and thereby an objective of protecting privacy of the second terminal is achieved.

Figure 23:
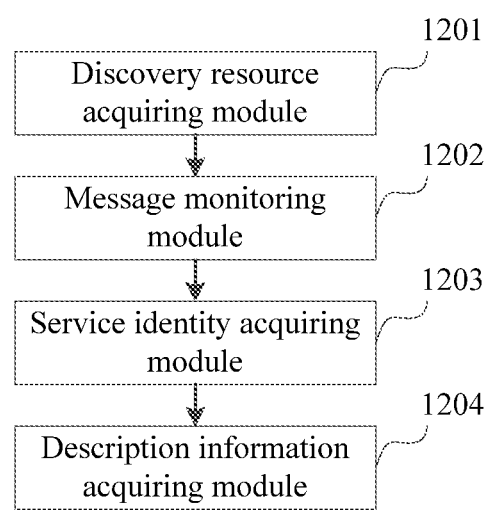
FIG. 23 is a device composition diagram of a first terminal according to an embodiment of the present invention.

Referring to FIG. 23, FIG. 23 shows a device composition diagram of a first terminal according to an embodiment of the present invention. The first terminal may include a discovery resource acquiring module 1201 configured to acquire a discovery resource; a message monitoring module 1202 configured to monitor, according to the discovery resource acquired by the discovery resource acquiring module 1201, a second message sent by at least one second terminal, where the second message includes a service identity of the second terminal; a service identity acquiring module 1203 configured to acquire the service identity of the second terminal according to the second message monitored by the message monitoring module 1202; and a description information acquiring module 1204 configured to acquire description information of the second terminal from a server according to the service identity of the second terminal acquired by the service identity acquiring module 1203.

As described above, the first terminal provided by the embodiment of the present invention acquires a discovery resource, monitors, according to the discovery resource, a message that is sent by at least one second terminal and includes a service identity of the second terminal, and acquires the service identity of the second terminal; and acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 24:
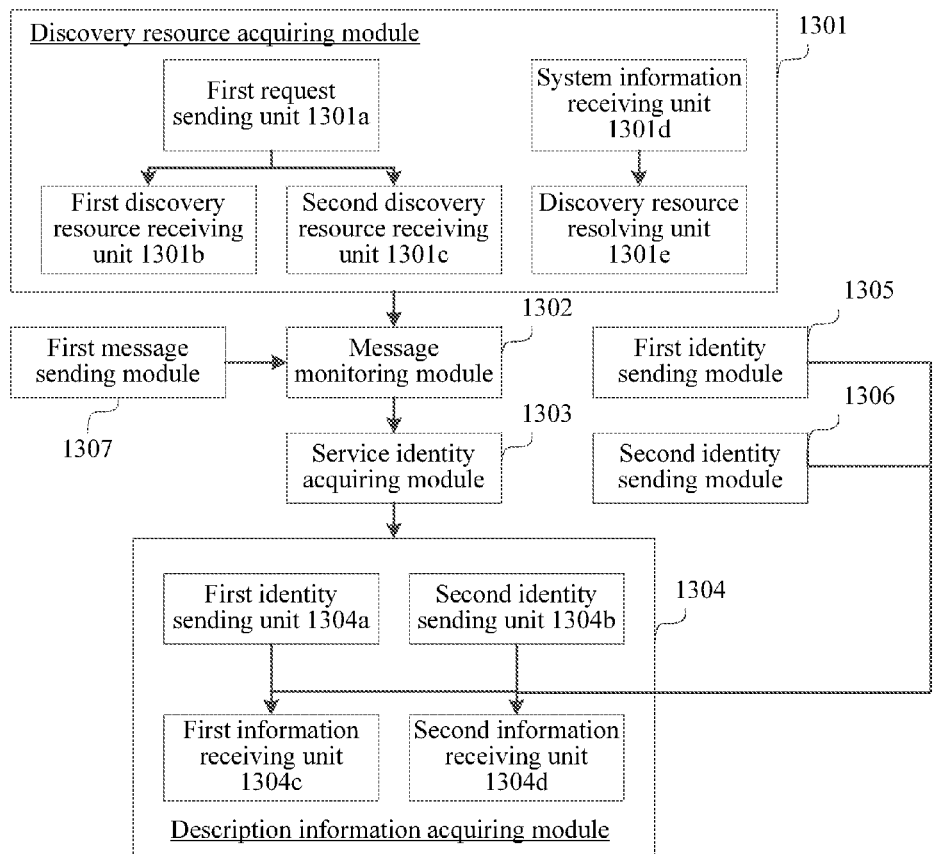
FIG. 24 is a device composition diagram of a first terminal according to another embodiment of the present invention.

For a more exemplary solution based on the foregoing first terminal shown in FIG. 23, reference may be made to FIG. 24, which shows a device composition diagram of a first terminal according to another embodiment of the present invention. The first terminal may include a discovery resource acquiring module 1301 configured to acquire a discovery resource; a message monitoring module 1302 configured to monitor, according to the discovery resource acquired by the discovery resource acquiring module 1301, a second message sent by at least one second terminal, where the second message includes a service identity of the second terminal; a service identity acquiring module 1303 configured to acquire the service identity of the second terminal according to the second message monitored by the message monitoring module 1302; and a description information acquiring module 1304 configured to acquire description information of the second terminal from a server according to the service identity of the second terminal acquired by the service identity acquiring module 1303.

The description information acquiring module 1304 includes a first identity sending unit 1304a configured to send the service identity of the second terminal to the server; a second identity sending unit 1304b configured to send the service identity of the second terminal to a management entity, so that the management entity sends the service identity of the second terminal to the server; a first information receiving unit 1304c configured to receive the description information of the second terminal sent by the server, where the description information of the second terminal is information that is acquired and sent by the server according to the service identity of the second terminal; and a second information receiving unit 1304d configured to receive the description information of the second terminal sent by the management entity, where the description information of the second terminal is information that is acquired by the server according to the service identity of the second terminal and sent to the management entity.

The first terminal further includes a first identity sending module 1305 configured to send a service identity of the first terminal to the server before the first information receiving unit 1304c receives the description information of the second terminal sent by the server or before the second information receiving unit 1304d receives the description information of the second terminal sent by the management entity, so that the server acquires the description information of the second terminal according to the service identity of the second terminal after the server verifies, according to the service identity of the first terminal, that the first terminal is authorized to discover the second terminal; and a second identity sending module 1306 configured to send the service identity of the first terminal to the management entity before the first information receiving unit 1304c receives the description information of the second terminal sent by the server or before the second information receiving unit 1304d receives the description information of the second terminal sent by the management entity, so that the management entity sends the service identity of the first terminal to the server, and the server acquires the description information of the second terminal according to the service identity of the second terminal after the server verifies, according to the service identity of the first terminal, that the first terminal is authorized to discover the second terminal.

The discovery resource acquiring module 1301 includes a first request sending unit 1301a configured to send a first request to the management entity, so that the management entity sends a second request to a base station according to the first request; a first discovery resource receiving unit 1301b configured to receive the discovery resource that is sent by the base station according to the second request; and a second discovery resource receiving unit 1301c configured to receive the discovery resource that is sent by the management entity, where the discovery resource is sent by the base station to the management entity according to the second request.

The discovery resource includes a discovery resource of a serving cell of the first terminal; or the discovery resource includes a discovery resource of a serving cell of the first terminal and a discovery resource of a cell adjacent to the serving cell.

The first discovery resource receiving unit 1301b is configured to receive the discovery resource that is sent by the base station by using an RRC message, where the discovery resource is the discovery resource that the base station sends after receiving the second request.

The second request is an S1-AP message including a first indication, where the first indication is used to instruct the base station to send the discovery resource to the first terminal or used to instruct the base station to acquire the discovery resource and send the discovery resource to the first terminal.

The second discovery resource receiving unit 1301c is configured to receive the discovery resource that is sent by the management entity by using an NAS message, where the discovery resource is the discovery resource that the base station sends to the management entity by using a container after receiving the second request.

The second request is an S1-AP message including a second indication, where the second indication is used to instruct the base station to send the discovery resource to the management entity or used to instruct the base station to acquire the discovery resource and send the discovery resource to the management entity.

The discovery resource acquiring module 1301 includes a system information receiving unit 1301d configured to receive system information sent by the base station; and a discovery resource resolving unit 1301e configured to resolve the discovery resource included in the system information that is received by the system information receiving unit 1301d.

The discovery resource includes the discovery resource of the serving cell of the first terminal; or the discovery resource includes the discovery resource of the serving cell of the first terminal and the discovery resource of the cell adjacent to the serving cell.

The first request sending unit 1301a is configured to send the first request including an identity of the first terminal to the management entity, so that the management entity sends the identity of the first terminal to the server and when the server verifies, according to the identity of the first terminal, that the first terminal is authorized to discover the second terminal, sends the second request to the base station.

The first request sending unit 1301a is configured to send the first request including the identity of the first terminal and an identity of an application using a discovery service in the first terminal to the management entity, so that the management entity sends the identity of the first terminal and the identity of the application using the discovery service in the first terminal to the server and when the server verifies, according to the identity of the first terminal and the identity of the application using the discovery service in the first terminal, that the first terminal is authorized to discover the second terminal and that the application is authorized to use a discovery function, sends the second request to the base station.

The service identity acquiring module 1303 is configured to determine that the service identity in the monitored second message and compliant with a predetermined condition is the service identity of the second terminal.

The predetermined condition includes at least one of the following conditions: a signal strength of the second message is greater than or equal to a predetermined strength threshold; or a type of the second terminal included in the second message complies with a predetermined type; or an application description included in the second message complies with a predetermined application description.

The first terminal further includes a first message sending module 1307 configured to send a first message before the message monitoring module 1302 monitors, according to the discovery resource, the second message sent by the at least one second terminal, so that the second terminal sends the second message according to the first message after receiving the first message.

As described above, the first terminal provided by the embodiment of the present invention acquires a discovery resource, monitors, according to the discovery resource, a message that is sent by at least one second terminal and includes a service identity of the second terminal, and acquires the service identity of the second terminal; and acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, the first terminal provided by the embodiment of the present invention monitors, according to the acquired discovery resource, a second message sent by the second terminal, and thereby, an objective of reducing burden of the terminal and saving power of the terminal is achieved. Finally, the first terminal provided by the embodiment of the present invention sends a service identity of the first terminal to a management entity, so that the server verifies, according to the service identity of the first terminal, whether the first terminal is authorized to discover the second terminal, and thereby an objective of protecting privacy of the second terminal is achieved.

Figure 25:
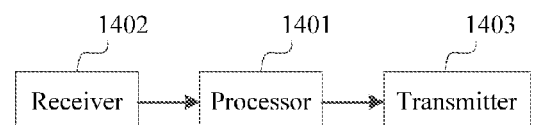
FIG. 25 is a device composition diagram of a first terminal according to an embodiment of the present invention.

Referring to FIG. 25, FIG. 25 shows a device composition diagram of a first terminal according to an embodiment of the present invention. The first terminal may include a processor 1401, a receiver 1402, and a transmitter 1403.

The processor 1401 is configured to control the receiver 1402 and transmitter 1403 to acquire a discovery resource.

The receiver 1402 is configured to monitor, according to the acquired discovery resource, a second message sent by at least one second terminal, where the second message includes a service identity of the second terminal.

The processor 1401 is configured to acquire the service identity of the second terminal according to the second message monitored by the receiver 1402.

The processor 1401 is configured to control the receiver 1402 and transmitter 1403 to acquire description information of the second terminal from a server according to the acquired service identity of the second terminal.

As described above, the first terminal provided by the embodiment of the present invention acquires a discovery resource, monitors, according to the discovery resource, a message that is sent by at least one second terminal and includes a service identity of the second terminal, and acquires the service identity of the second terminal; and acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 26:
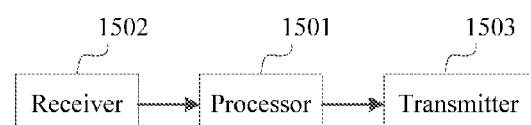
FIG. 26 is a device composition diagram of a first terminal according to another embodiment of the present invention.

For a more exemplary solution based on the foregoing first terminal shown in FIG. 25, reference may be made to FIG. 26, which shows a device composition diagram of a first terminal according to another embodiment of the present invention. The first terminal may include a processor 1501, a receiver 1502, and a transmitter 1503.

The processor 1501 is configured to control the receiver 1502 and transmitter 1503 to acquire a discovery resource.

The receiver 1502 is configured to monitor, according to the acquired discovery resource, a second message sent by at least one second terminal, where the second message includes a service identity of the second terminal.

The processor 1501 is configured to acquire the service identity of the second terminal according to the second message monitored by the receiver 1502.

The processor 1501 is configured to control the receiver 1502 and transmitter 1503 to acquire description information of the second terminal from a server according to the acquired service identity of the second terminal.

The processor 1501 is configured to control the transmitter 1503 to send the service identity of the second terminal to the server.

The processor 1501 is configured to control the transmitter 1503 to send the service identity of the second terminal to a management entity, so that the management entity sends the service identity of the second terminal to the server.

The receiver 1502 is configured to receive the description information of the second terminal sent by the server, where the description information of the second terminal is information that is acquired and sent by the server according to the service identity of the second terminal.

The receiver 1502 is configured to receive the description information of the second terminal sent by the management entity, where the description information of the second terminal is information that is acquired by the server according to the service identity of the second terminal and sent to the management entity.

The processor 1501 is further configured to control the transmitter 1503 to send the service identity of the first terminal to the server before the receiver 1502 receives the description information of the second terminal sent by the server or receives the description information of the second terminal sent by the management entity, so that the server acquires the description information of the second terminal according to the service identity of the second terminal after the server verifies, according to the service identity of the first terminal, that the first terminal is authorized to discover the second terminal.

The processor 1501 is further configured to control the transmitter 1503 to send the service identity of the first terminal to the management entity before the receiver 1502 receives the description information of the second terminal sent by the server or receives the description information of the second terminal sent by the management entity, so that the management entity sends the service identity of the first terminal to the server, and the server acquires the description information of the second terminal according to the service identity of the second terminal after the server verifies, according to the service identity of the first terminal, that the first terminal is authorized to discover the second terminal.

The processor 1501 is configured to control the transmitter 1503 to send a first request to the management entity, so that the management entity sends a second request to a base station according to the first request.

The receiver 1502 is configured to receive the discovery resource that is sent by the base station according to the second request.

The receiver 1502 is configured to receive the discovery resource that is sent by the management entity, where the discovery resource is sent by the base station to the management entity according to the second request.

The discovery resource includes a discovery resource of a serving cell of the first terminal; or the discovery resource includes a discovery resource of a serving cell of the first terminal and a discovery resource of a cell adjacent to the serving cell.

The receiver 1502 is configured to receive the discovery resource that is sent by the base station by using an RRC message, where the discovery resource is the resource that the base station sends after receiving the second request.

The second request is an S1-AP message including a first indication, where the first indication is used to instruct the base station to send the discovery resource to the first terminal or used to instruct the base station to acquire the discovery resource and send the discovery resource to the first terminal.

The receiver 1502 is configured to receive the discovery resource that is sent by the management entity by using an NAS message, where the discovery resource is the discovery resource that the base station sends to the management entity by using a container after receiving the second request.

The second request is an S1-AP message including a second indication, where the second indication is used to instruct the base station to send the discovery resource to the management entity or used to instruct the base station to acquire the discovery resource and send the discovery resource to the management entity.

The receiver 1502 is configured to receive system information sent by the base station.

The processor 1501 is configured to resolve the discovery resource included in the system information that is received by the receiver 1502.

The discovery resource includes the discovery resource of the serving cell of the first terminal; or the discovery resource includes the discovery resource of the serving cell of the first terminal and the discovery resource of the cell adjacent to the serving cell.

The processor 1501 is configured to control the transmitter 1503 to send the first request including an identity of the first terminal to the management entity, so that the management entity sends the identity of the first terminal to the server and when the server verifies, according to the identity of the first terminal, that the first terminal is authorized to discover the second terminal, sends the second request to the base station.

The processor 1501 is configured to control the transmitter 1503 to send the first request including the identity of the first terminal and an identity of an application using a discovery service in the first terminal to the management entity, so that the management entity sends the identity of the first terminal and the identity of the application using the discovery service in the first terminal to the server and when the server verifies, according to the identity of the first terminal and the identity of the application using the discovery service in the first terminal, that the first terminal is authorized to discover the second terminal and that the application is authorized to use a discovery function, sends the second request to the base station.

The processor 1501 is configured to determine that the service identity in the monitored second message and compliant with a predetermined condition is the service identity of the second terminal.

The predetermined condition includes at least one of the following conditions: a signal strength of the second message is greater than or equal to a predetermined strength threshold; or a type of the second terminal included in the second message complies with a predetermined type; or an application description included in the second message complies with a predetermined application description.

The processor 1501 is further configured to control the transmitter 1503 to send a first message before the receiver 1502 monitors, according to the discovery resource, the second message sent by the at least one second terminal, so that the second terminal sends the second message according to the first message after receiving the first message.

As described above, the first terminal provided by the embodiment of the present invention acquires a discovery resource, monitors, according to the discovery resource, a message that is sent by at least one second terminal and includes a service identity of the second terminal, and acquires the service identity of the second terminal; and acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, the first terminal provided by the embodiment of the present invention monitors, according to the acquired discovery resource, a second message sent by the second terminal, and thereby, an objective of reducing burden of the terminal and saving power of the terminal is achieved. Finally, the first terminal provided by the embodiment of the present invention sends a service identity of the first terminal to a management entity, so that the server verifies, according to the service identity of the first terminal, whether the first terminal is authorized to discover the second terminal, and thereby an objective of protecting privacy of the second terminal is achieved.

Figure 27:
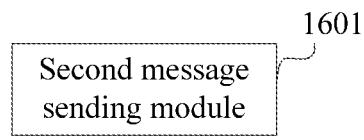
FIG. 27 is a device composition diagram of a second terminal according to an embodiment of the present invention.

Referring to FIG. 27, FIG. 27 shows a device composition diagram of a second terminal according to an embodiment of the present invention. The second terminal may include a second message sending module 1601 configured to send a second message including a service identity of the second terminal, so that a first terminal acquires the service identity of the second terminal according to the second message and acquires description information of the second terminal from a server according to the service identity of the second terminal.

As described above, the second terminal provided by the embodiment of the present invention sends a second message including a service identity of the second terminal, so that a first terminal acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 28:
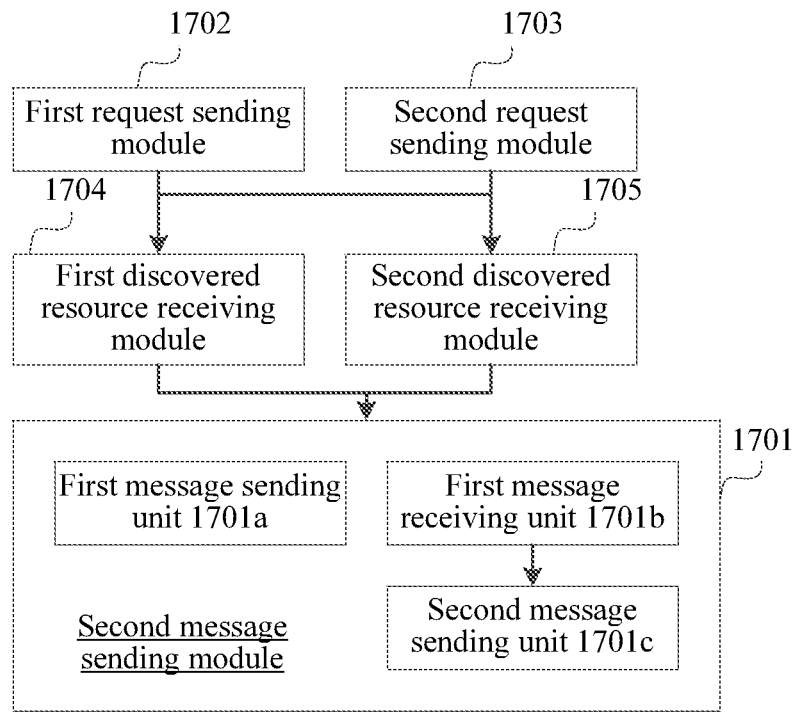
FIG. 28 is a device composition diagram of a second terminal according to another embodiment of the present invention.

For a more exemplary solution based on the foregoing second terminal shown in FIG. 27, reference may be made to FIG. 28, which shows a device composition diagram of a second terminal according to another embodiment of the present invention. The second terminal may include a second message sending module 1701 configured to send a second message including a service identity of the second terminal, so that a first terminal acquires the service identity of the second terminal according to the second message and acquires description information of the second terminal from a server according to the service identity of the second terminal.

The second terminal further includes a first request sending module 1702 configured to send a third request to a management entity before the second message sending module 1701 sends the second message including the service identity of the second terminal, so that the management entity sends a fourth request to a base station according to the third request; a second request sending module 1703 configured to send a fifth request to the server before the second message sending module 1701 sends the second message including the service identity of the second terminal, so that the server sends a sixth request to a management entity, and the management entity sends a fourth request to a base station; a first discovered resource receiving module 1704 configured to receive a discovered resource sent by the base station, where the discovered resource is a resource that is allocated by the base station according to the fourth request; and a second discovered resource receiving module 1705 configured to receive a discovered resource that is sent by the base station to the management entity and sent by the management entity to the second terminal, where the discovered resource is the resource that is allocated by the base station according to the fourth request; where the second message sending module 1701 is configured to send, according to the discovered resource received by the first discovered resource receiving module 1704 or the second discovered resource receiving module 1705, the second message including the service identity.

The first discovered resource receiving module 1704 is configured to receive the discovered resource that is sent by the base station by using an RRC message, where the discovered resource is the resource that the base station sends after receiving the fourth request.

The fourth request is an S1-AP message including a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal.

The second discovered resource receiving module 1705 is configured to receive the discovered resource that is sent by the management entity by using an NAS message, where the discovered resource is the discovered resource that the base station sends to the management entity by using a container after receiving the fourth request.

The fourth request is an S1-AP message including a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity.

The first request sending module 1702 is configured to send the third request including an identity of the second terminal to the management entity, so that the management entity sends the identity of the second terminal to the server and when the server verifies, according to the identity of the second terminal, that the second terminal is authorized to be discovered, sends the fourth request to the base station.

The first request sending module 1702 is configured to send the third request including the identity of the second terminal and an identity of an application using a discovered service in the second terminal to the management entity, so that the management entity sends the identity of the second terminal and the identity of the application using the discovered service in the second terminal to the server and when the server verifies, according to the identity of the second terminal and the identity of the application using the discovered service in the second terminal, that the second terminal is authorized to be discovered and that the application is authorized to use a discovered function, sends the fourth request to the base station.

The second request sending module 1703 is configured to send the fifth request including the identity of the second terminal to the server, so that the server sends the sixth request to the management entity when the server verifies, according to the identity of the second terminal, that the second terminal is authorized to be discovered.

The second request sending module 1703 is configured to send the fifth request including the identity of the second terminal and the identity of the application using the discovered service in the second terminal to the server, so that the server sends the sixth request to the management entity when the server verifies, according to the identity of the second terminal, that the second terminal is authorized to be discovered and that the application is authorized to use the discovered function.

The second request sending module 1703 is configured to send the fifth request including a GUTI of the second terminal to the server, so that the server sends the sixth request to the management entity according to the GUTI.

The second message sending module 1701 includes a first message sending unit 1701*a* configured to send the second message immediately after the first discovered resource receiving module 1704 or the second discovered resource receiving module 1705 receives the discovered resource; a first message receiving unit 1701*b* configured to receive a first message sent by the first terminal; and a second message sending unit 1701*c* configured to send the second message according to the first message received by the first message receiving unit 1701*b*.

As described above, the second terminal provided by the embodiment of the present invention sends a second message including a service identity of the second terminal, so that a first terminal acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, the second terminal provided by the embodiment of the present invention acquires a discovered resource allocated by a base station, and sends the second message according to the acquired discovered resource. Thereby, an objective of reducing interference between second terminals is achieved.

Figure 29:
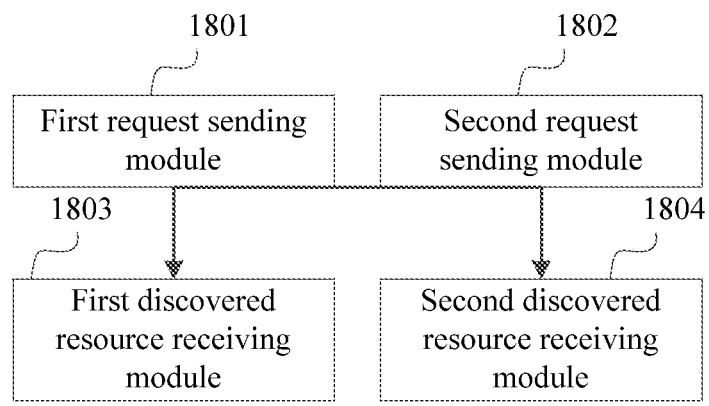
FIG. 29 is a device composition diagram of a second terminal according to an embodiment of the present invention.

Referring to FIG. 29, FIG. 29 shows a device composition diagram of a second terminal according to an embodiment of the present invention. The second terminal may include a first request sending module 1801 configured to send a third request to a management entity, so that the management entity sends a fourth request to a base station according to the third request; a second request sending module 1802 configured to send a fifth request to a server, so that the server sends a sixth request to a management entity, and the management entity sends a fourth request to a base station; a first discovered resource receiving module 1803 configured to receive a discovered resource sent by the base station, where the discovered resource is a resource that is allocated by the base station according to the fourth request; and a second discovered resource receiving module 1804 configured to receive a discovered resource that is sent by the base station to the management entity and sent by the management entity to the second terminal, where the discovered resource is the resource that is allocated by the base station according to the fourth request.

As described above, the second terminal provided by the embodiment of the present invention sends a third request to a management entity, so that the management entity sends a fourth request to a base station according to the third request; and receives a discovered resource sent by the base station; or receives a discovered resource that is sent by the base station to the management entity and sent by the management entity, so that the second terminal sends a second message according to the discovered resource, thereby achieving an objective of reducing interference between terminals.

Figure 30:
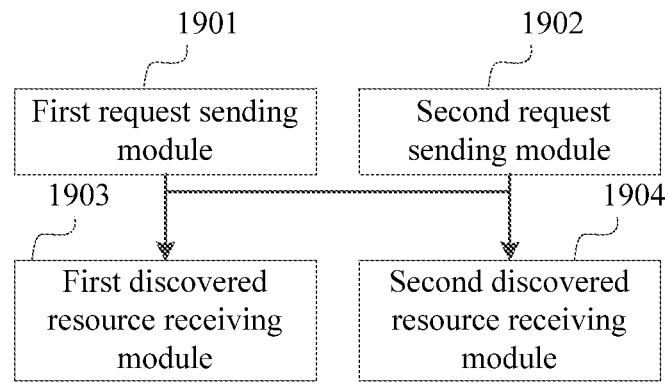
FIG. 30 is a device composition diagram of a second terminal according to another embodiment of the present invention.

For a more exemplary solution based on the foregoing second terminal shown in FIG. 29, reference may be made to FIG. 30, which shows a device composition diagram of a second terminal according to another embodiment of the present invention. The second terminal may include a first request sending module 1901 configured to send a third request to a management entity, so that the management entity sends a fourth request to a base station according to the third request; a second request sending module 1902 configured to send a fifth request to a server, so that the server sends a sixth request to a management entity, and the management entity sends a fourth request to a base station; a first discovered resource receiving module 1903 configured to receive a discovered resource sent by the base station, where the discovered resource is a resource that is allocated by the base station according to the fourth request; and a second discovered resource receiving module 1904 configured to receive a discovered resource that is sent by the base station to the management entity and sent by the management entity to the second terminal, where the discovered resource is the resource that is allocated by the base station according to the fourth request.

The second request sending module 1902 is configured to send the fifth request including a GUTI of the second terminal to the server, so that the server sends the sixth request to the management entity according to the GUTI.

The first discovered resource receiving module 1903 is configured to receive the discovered resource that is sent by the base station by using an RRC message, where the discovered resource is the resource that the base station sends after receiving the fourth request.

The fourth request is an S1-AP message including a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal.

The second discovered resource receiving module 1904 is configured to receive the discovered resource that is sent by the management entity by using an NAS message, where the discovered resource is the discovered resource that the base station sends to the management entity by using a container after receiving the fourth request.

The fourth request is an S1-AP message including a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity.

As described above, the second terminal provided by the embodiment of the present invention sends a third request to a management entity, so that the management entity sends a fourth request to a base station according to the third request; and receives a discovered resource sent by the base station; or receives a discovered resource that is sent by the base station to the management entity and sent by the management entity, so that the second terminal sends a second message according to the discovered resource, thereby achieving an objective of reducing interference between terminals.

Figure 31:
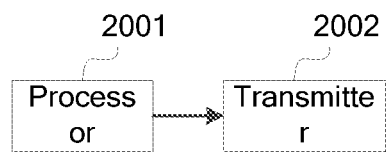
FIG. 31 is a device composition diagram of a second terminal according to an embodiment of the present invention.

Referring to FIG. 31, FIG. 31 shows a device composition diagram of a second terminal according to an embodiment of the present invention. The second terminal may include a processor 2001 and a transmitter 2002.

The processor 2001 is configured to control the transmitter 2002 to send a second message including a service identity of the second terminal, so that a first terminal acquires the service identity of the second terminal according to the second message and acquires description information of the second terminal from a server according to the service identity of the second terminal, where the service identity is an identity allocated by the server.

As described above, the second terminal provided by the embodiment of the present invention sends a second message including a service identity of the second terminal, so that a first terminal acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 32:
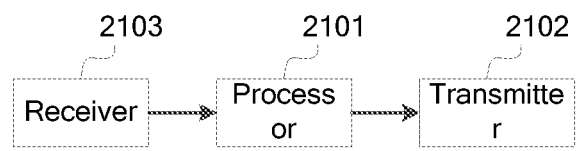
FIG. 32 is a device composition diagram of a second terminal according to another embodiment of the present invention.

For a more exemplary solution based on the foregoing second terminal shown in FIG. 31, reference may be made to FIG. 32, which shows a device composition diagram of a second terminal according to another embodiment of the present invention. The second terminal may include a processor 2101, a transmitter 2102, and a receiver 2103.

The processor 2101 is configured to control the transmitter 2102 to send a second message including a service identity of the second terminal, so that a first terminal acquires the service identity of the second terminal according to the second message and acquires description information of the second terminal from a server according to the service identity of the second terminal, where the service identity is an identity allocated by the server.

The processor 2101 is configured to control the transmitter 2102 to send a third request to a management entity before controlling the transmitter 2102 to send the second message including the service identity of the second terminal, so that the management entity sends a fourth request to a base station according to the third request.

The processor 2101 is configured to control the transmitter 2102 to send a fifth request to the server before controlling the transmitter 2102 to send the second message including the service identity of the second terminal, so that the server sends a sixth request to a management entity, and the management entity sends a fourth request to a base station.

The receiver 2103 is configured to receive a discovered resource sent by the base station, where the discovered resource is a resource that is allocated by the base station according to the fourth request.

The receiver 2103 is configured to receive a discovered resource that is sent by the base station to the management entity and sent by the management entity to the second terminal, where the discovered resource is the resource that is allocated by the base station according to the fourth request.

The processor 2101 is configured to control the transmitter 2102 to send, according to the discovered resource received by the receiver 2103, the second message including the service identity.

The receiver 2103 is configured to receive the discovered resource that is sent by the base station by using an RRC message, where the discovered resource is the resource that the base station sends after receiving the fourth request.

The fourth request is an S1-AP message including a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal.

The receiver 2103 is configured to receive the discovered resource that is sent by the management entity by using an NAS message, where the discovered resource is the discovered resource that the base station sends to the management entity by using a container after receiving the fourth request.

The fourth request is an S1-AP message including a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity.

The processor 2101 is configured to control the transmitter 2102 to send the third request including an identity of the second terminal to the management entity, so that the management entity sends the identity of the second terminal to the server and when the server verifies, according to the identity of the second terminal, that the second terminal is authorized to be discovered, sends the fourth request to the base station.

The processor 2101 is configured to control the transmitter 2102 to send the third request including the identity of the second terminal and an identity of an application using a discovered service in the second terminal to the management entity, so that the management entity sends the identity of the second terminal and the identity of the application using the discovered service in the second terminal to the server and when the server verifies, according to the identity of the second terminal and the identity of the application using the discovered service in the second terminal, that the second terminal is authorized to be discovered and that the application is authorized to use a discovered function, sends the fourth request to the base station.

The processor 2101 is configured to control the transmitter 2102 to send the fifth request including the identity of the second terminal to the server, so that the server sends the sixth request to the management entity when the server verifies, according to the identity of the second terminal, that the second terminal is authorized to be discovered.

The processor 2101 is configured to control the transmitter 2102 to send the fifth request including the identity of the second terminal and the identity of the application using the discovered service in the second terminal to the server, so that the server sends the sixth request to the management entity when the server verifies, according to the identity of the second terminal, that the second terminal is authorized to be discovered and that the application is authorized to use the discovered function.

The processor 2101 is configured to control the transmitter 2102 to send the fifth request including a GUTI of the second terminal to the server, so that the server sends the sixth request to the management entity according to the GUTI.

The processor 2101 is configured to control the transmitter 2102 to send the second message immediately after the receiver 2103 receives the discovered resource.

The receiver 2103 is configured to receive a first message sent by the first terminal.

The processor 2101 is configured to control the transmitter 2102 to send the second message according to the first message received by the receiver 2103.

As described above, the second terminal provided by the embodiment of the present invention sends a second message including a service identity of the second terminal, so that a first terminal acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, the second terminal provided by the embodiment of the present invention acquires a discovered resource allocated by a base station, and sends the second message according to the acquired discovered resource. Thereby, an objective of reducing interference between second terminals is achieved.

Figure 33:
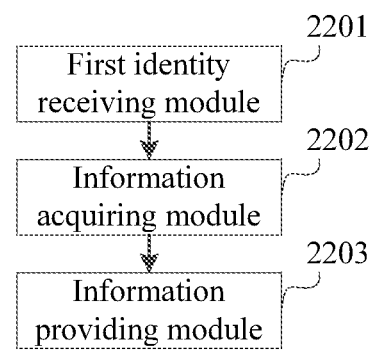
FIG. 33 is a device composition diagram of a server according to an embodiment of the present invention.

Referring to FIG. 33, FIG. 33 shows a device composition diagram of a server according to an embodiment of the present invention. The server may include a first identity receiving module 2201 configured to receive a service identity of a second terminal sent by a first terminal, where the service identity of the second terminal is acquired by the first terminal according to a second message that is sent by the at least one second terminal and that includes the service identity of the second terminal; an information acquiring module 2202 configured to acquire description information of the second terminal according to the service identity of the second terminal received by the first identity receiving module 2201; and an information providing module 2203 configured to provide the description information of the second terminal acquired by the information acquiring module 2202 for the first terminal.

As described above, the server provided by the embodiment of the present invention receives a service identity of a second terminal sent by a first terminal, and queries description information of the second terminal corresponding to the service identity of the second terminal and provides the description information of the second terminal for the first terminal. Thereby, a problem in the prior art that a first terminal must learn a unique identity of a second terminal in advance is solved, and an objective of discovering a terminal of an unknown identity in a vicinity and extending an application scope is achieved.

Figure 34:
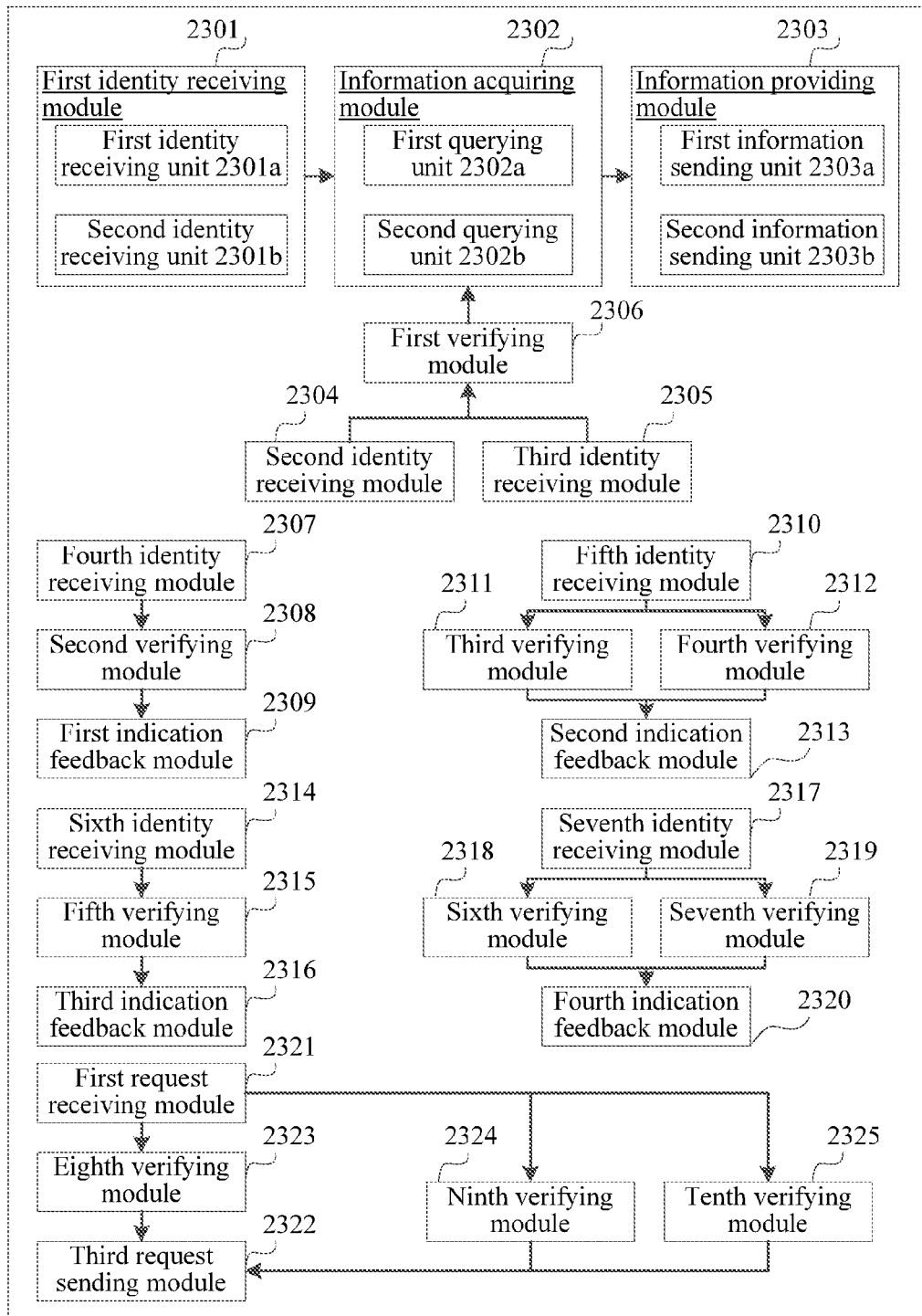
FIG. 34 is a device composition diagram of a server according to another embodiment of the present invention.

For a more exemplary solution based on the foregoing server shown in FIG. 33, reference may be made to FIG. 34, which shows a device composition diagram of a server according to another embodiment of the present invention. The server may include a first identity receiving module 2301 configured to receive a service identity of a second terminal sent by a first terminal, where the service identity of the second terminal is acquired by the first terminal according to a second message that is sent by the at least one second terminal and that includes the service identity of the second terminal; an information acquiring module 2302 configured to acquire description information of the second terminal according to the service identity of the second terminal received by the first identity receiving module

2301; and an information providing module 2303 configured to provide the description information of the second terminal acquired by the information acquiring module 2302 for the first terminal.

The first identity receiving module 2301 includes a first identity receiving unit 2301a configured to receive the service identity of the second terminal sent by the first terminal; and a second identity receiving unit 2301b configured to receive the service identity of the second terminal sent by a management entity, where the service identity of the second terminal is a service identity sent by the first terminal to the management entity.

The information acquiring module 2302 includes a first querying unit 2302a configured to locally query the description information of the second terminal corresponding to the service identity of the second terminal; and a second querying unit 2302b configured to query, according to the service identity of the second terminal, the description information of the second terminal from a home server of the second terminal or a server that currently services the second terminal.

The information providing module 2303 includes a first information sending unit 2303a configured to send the description information of the second terminal acquired by the information acquiring module 2302 to the first terminal; and a second information sending unit 2303b configured to send the description information of the second terminal acquired by the information acquiring module 2302 to the management entity, so that the management entity sends the description information of the second terminal to the first terminal.

The server further includes a second identity receiving module 2304 configured to receive, before the information acquiring module 2302 acquires the description information of the second terminal corresponding to the service identity of the second terminal, a service identity of the first terminal sent by the first terminal; a third identity receiving module 2305 configured to receive, before the information acquiring module 2302 acquires the description information of the second terminal corresponding to the service identity of the second terminal, the service identity of the first terminal sent by the management entity, where the service identity of the first terminal is sent by the first terminal to the management entity; and a first verifying module 2306 configured to verify, according to the service identity of the first terminal received by the second identity receiving module 2304 or the third identity receiving module 2305, whether the first terminal is authorized to discover the second terminal; where the information acquiring module 2302 is configured to execute, if a verification result of the first verifying module 2306 is that the first terminal is authorized to discover the second terminal, the step of acquiring the description information of the second terminal according to the service identity of the second terminal.

The server further includes a fourth identity receiving module 2307 configured to receive, before the first identity receiving module 2301 receives the service identity of the second terminal sent by the first terminal, an identity of the first terminal sent by the management entity, where the identity of the first terminal is an identity included in a first request that is sent by the first terminal to the management entity; a second verifying module 2308 configured to verify, according to the identity of the first terminal, whether the first terminal is authorized to discover the second terminal; and a first indication feedback module 2309 configured to feed back, if a verification result of the second verifying module 2308 is that the first terminal is authorized to discover the second terminal, an indication indicating that the first terminal is authorized to discover the second terminal, to the management entity, so that the management entity sends a second request to a base station after receiving the indication.

The first request is used to request to acquire a discovery resource, the second request is used to request the base station to acquire the discovery resource and send the discovery resource to the first terminal, and the discovery resource is a resource used when the first terminal monitors the second message.

The server further includes a fifth identity receiving module 2310 configured to receive, before the first identity receiving module 2301 receives the service identity of the second terminal sent by the first terminal, the identity of the first terminal and an identity of an application using a discovery service in the first terminal that are sent by the management entity, where the identity of the first terminal and the identity of the application using the discovery service in the first terminal are identities included in the first request that is sent by the first terminal to the management entity; a third verifying module 2311 configured to verify, according to the identity of the first terminal, whether the first terminal is authorized to discover the second terminal; a fourth verifying module 2312 configured to verify, according to the identity of the application using the discovery service in the first terminal, whether the application is authorized to use a discovery function; and a second indication feedback module 2313 configured to feed back, if a verification result of the third verifying module 2311 is that the first terminal is authorized to discover the second terminal and a verification result of the fourth verifying module 2312 is that the application is authorized to use the discovery function, an indication indicating that the first terminal is authorized to discover the second terminal and that the application is authorized to use the discovery function, to the management entity, so that the management entity sends the second request to the base station after receiving the indication.

The first request is used to request to acquire a discovery resource, the second request is used to request the base station to acquire the discovery resource and send the discovery resource to the first terminal, and the discovery resource is a resource used when the first terminal monitors the second message.

The server further includes a sixth identity receiving module 2314 configured to receive, before the first identity receiving module 2301 receives the service identity of the second terminal sent by the first terminal, an identity of the second terminal sent by the management entity, where the identity of the second terminal is an identity included in a third request that is sent by the second terminal to the management entity; a fifth verifying module 2315 configured to verify, according to the identity of the second terminal, whether the second terminal is authorized to be discovered; and a third indication feedback module 2316 configured to feed back, if a verification result of the fifth verifying module 2315 is that the second terminal is authorized to be discovered, an indication indicating that the second terminal is authorized to be discovered, to the management entity, so that the management entity sends a fourth request to the base station after receiving the indication.

The third request is used to request to acquire a discovered resource, the fourth request is used to request the base station to allocate and send the discovered resource to the second terminal, and the discovered resource is a resource used when the second terminal sends the second message.

The server further includes a seventh identity receiving module 2317 configured to receive, before the first identity receiving module 2301 receives the service identity of the second terminal sent by the first terminal, the identity of the second terminal and an identity of an application using a discovered service in the second terminal that are sent by the management entity, where the identity of the second terminal and the identity of the application using the discovered service in the second terminal are identities included in the third request that is sent by the second terminal to the management entity; a sixth verifying module 2318 configured to verify, according to the identity of the second terminal, whether the second terminal is authorized to be discovered; a seventh verifying module 2319 configured to verify, according to the identity of the application using the discovered service in the second terminal, whether the application is authorized to use a discovered function; and a fourth indication feedback module 2320 configured to feed back, if a verification result of the sixth verifying module 2318 is that the second terminal is authorized to be discovered and a verification result of the seventh verifying module 2319 is that the application is authorized to use the discovered function, an indication indicating that the second terminal is authorized to be discovered and that the application is authorized to use the discovered function, to the management entity, so that the management entity sends the fourth request to the base station after receiving the indication.

The third request is used to request to acquire a discovered resource, the fourth request is used to request the base station to allocate and send the discovered resource to the second terminal, and the discovered resource is a resource used when the second terminal sends the second message.

The server further includes a first request receiving module 2321 configured to receive, before the first identity receiving module 2301 receives the service identity of the second terminal sent by the first terminal, a fifth request sent by the second terminal; and a third request sending module 2322 configured to send a sixth request to the management entity, so that the management entity sends the fourth request to the base station.

The fifth request is used to request to acquire a discovered resource, the fourth request is used to request the base station to allocate and send the discovered resource to the second terminal, and the discovered resource is a resource used when the second terminal sends the second message.

The fifth request includes a GUTI of the second terminal.

The third request sending module 2322 is configured to send the sixth request to the management entity according to the GUTI.

The fifth request further includes the identity of the second terminal, and the server further includes an eighth verifying module 2323 configured to verify, according to the identity of the second terminal before the third request sending module 2322 sends the sixth request to the management entity, whether the second terminal is authorized to be discovered; where the third request sending module 2322 is configured to execute, if a verification result of the eighth verifying module 2323 is that the second terminal is authorized to be discovered, the step of sending the sixth request to the management entity.

The fifth request may further include the identity of the second terminal and the identity of the application using the discovered service in the second terminal, and the server further includes a ninth verifying module 2324 configured to verify, according to the identity of the second terminal before the third request sending module 2322 sends the sixth request to the management entity, whether the second terminal is authorized to be discovered; and a tenth verifying module 2325 configured to verify, according to the identity of the application using the discovered service in the second terminal, before the third request sending module 2322 sends the sixth request to the management entity, whether the application is authorized to use the discovered function; where the third request sending module 2322 is configured to execute, if a verification result of the ninth verifying module 2324 is that the second terminal is authorized to be discovered and a verification result of the tenth verifying module 2325 is that the application is authorized to use the discovered function, the step of sending the sixth request to the management entity.

As described above, the server provided by the embodiment of the present invention receives a service identity of a second terminal sent by a first terminal, and queries description information of the second terminal corresponding to the service identity of the second terminal and provides the description information of the second terminal for the first terminal. Thereby, a problem in the prior art that a first terminal must learn a unique identity of a second terminal in advance is solved, and an objective of discovering a terminal of an unknown identity in a vicinity and extending an application scope is achieved. In addition, the server provided by the embodiment of the present invention receives a service identity of the first terminal sent by a management entity, and verifies, according to the service identity of the first terminal, whether the first terminal is authorized to discover the second terminal corresponding to the service identity of the at least one second terminal, and thereby an objective of protecting privacy of the second terminal is achieved.

Figure 35:
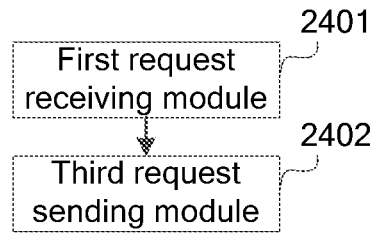
FIG. 35 is a device composition diagram of a server according to an embodiment of the present invention.

Referring to FIG. 35, FIG. 35 shows a device composition diagram of a server according to an embodiment of the present invention. The server may include a first request receiving module 2401 configured to receive a fifth request sent by a second terminal; and a third request sending module 2402 configured to send a sixth request to a management entity, so that the management entity sends a fourth request to a base station; where the fifth request is used to request to acquire a discovered resource, the fourth request is used to request the base station to allocate and send the discovered resource to the second terminal, and the discovered resource is a resource used when the second terminal sends a second message.

As described above, the server provided by the embodiment of the present invention receives a fifth request sent by a second terminal, and sends a sixth request to a management entity, so that the management entity sends a fourth request to a base station to request the base station to allocate and send a discovered resource to the second terminal, so that the second terminal sends a second message according to the discovered resource. Thereby, an objective of reducing interference between terminals is achieved.

Figure 36:
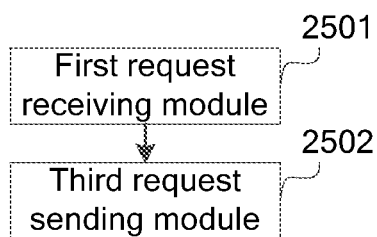
FIG. 36 is a device composition diagram of a server according to another embodiment of the present invention.

For a more exemplary solution based on the foregoing server shown in FIG. 35, reference may be made to FIG. 36, which shows a device composition diagram of a server according to another embodiment of the present invention. The server may include a first request receiving module 2501 configured to receive a fifth request sent by a second terminal; and a third request sending module 2502 configured to send a sixth request to a management entity, so that the management entity sends a fourth request to a base station; where the fifth request is used to request to acquire a discovered resource, the fourth request is used to request the base station to allocate and send the discovered resource to the second terminal, and the discovered resource is a resource used when the second terminal sends a second message.

In addition, the fifth request includes a GUTI of the second terminal; and the third request sending module 2502 is configured to send the sixth request to the management entity according to the GUTI.

As described above, the server provided by the embodiment of the present invention receives a fifth request sent by a second terminal, and sends a sixth request to a management entity, so that the management entity sends a fourth request to a base station to request the base station to allocate and send a discovered resource to the second terminal, so that the second terminal sends a second message according to the discovered resource. Thereby, an objective of reducing interference between terminals is achieved.

Figure 37:
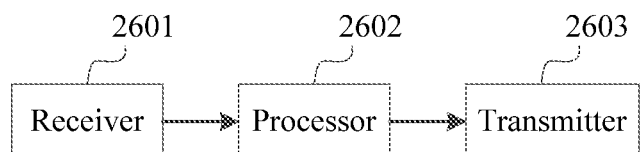
FIG. 37 is a device composition diagram of a server according to an embodiment of the present invention.

Referring to FIG. 37, FIG. 37 shows a device composition diagram of a server according to an embodiment of the present invention. The server may include a receiver 2601, a processor 2602, and a transmitter 2603.

The receiver 2601 is configured to receive a service identity of a second terminal sent by a first terminal, where the service identity of the second terminal is acquired by the first terminal according to a second message that is sent by the at least one second terminal and that includes the service identity of the second terminal.

The processor 2602 is configured to acquire description information of the second terminal according to the service identity of the second terminal received by the receiver 2601.

The processor 2602 is configured to control the transmitter 2603 to provide the acquired description information of the second terminal for the first terminal.

As described above, the server provided by the embodiment of the present invention receives a service identity of a second terminal sent by a first terminal, and queries description information of the second terminal corresponding to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 38:
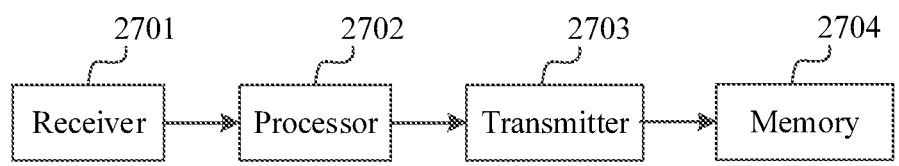
FIG. 38 is a device composition diagram of a server according to another embodiment of the present invention.

For a more exemplary solution based on the foregoing server shown in FIG. 37, reference may be made to FIG. 38, which shows a device composition diagram of a server according to another embodiment of the present invention. The server may include a receiver 2701, a processor 2702, a transmitter 2703, and a memory 2704.

The receiver 2701 is configured to receive a service identity of a second terminal sent by a first terminal, where the service identity of the second terminal is acquired by the first terminal according to a second message that is sent by the at least one second terminal and that includes the service identity of the second terminal.

The processor 2702 is configured to query description information of the second terminal according to the service identity of the second terminal received by the receiver 2701.

The processor 2702 is configured to control the transmitter 2703 to provide the queried description information of the second terminal for the first terminal.

The receiver 2701 is configured to receive the service identity of the second terminal sent by the first terminal.

The receiver 2701 is configured to receive the service identity of the second terminal sent by a management entity, where the service identity of the second terminal is a service identity sent by the first terminal to the management entity.

The processor 2702 is configured to locally query the description information of the second terminal corresponding to the service identity of the second terminal.

The processor 2702 is configured to query, according to the service identity of the second terminal, the description information of the second terminal from a home server of the second terminal or a server that currently services the second terminal.

The processor 2702 is configured to control the transmitter 2703 to send the acquired description information of the second terminal to the first terminal.

The processor 2702 is configured to control the transmitter 2703 to send the acquired description information of the second terminal to the management entity, so that the management entity sends the description information of the second terminal to the first terminal.

The receiver 2701 is configured to receive, before the processor 2702 acquires the description information of the second terminal corresponding to the service identity of the second terminal, a service identity of the first terminal sent by the first terminal.

The receiver 2701 is configured to receive, before the processor 2702 queries the description information of the second terminal corresponding to the service identity of the second terminal, the service identity of the first terminal sent by the management entity, where the service identity of the first terminal is sent by the first terminal to the management entity.

The processor 2702 is configured to verify, according to the service identity of the first terminal received by the receiver 2701, whether the first terminal is authorized to discover the second terminal.

The processor 2702 is configured to execute, if a verification result is that the first terminal is authorized to discover the second terminal, the step of querying the description information of the second terminal according to the service identity of the second terminal.

The receiver 2701 is configured to receive, before receiving the service identity of the second terminal sent by the first terminal, an identity of the first terminal sent by the management entity, where the identity of the first terminal is an identity included in a first request that is sent by the first terminal to the management entity.

The processor 2702 is configured to verify, according to the identity of the first terminal, whether the first terminal is authorized to discover the second terminal.

The processor 2702 is configured to control the transmitter 2703 to feed back, if a verification result is that the first terminal is authorized to discover the second terminal, an indication indicating that the first terminal is authorized to discover the second terminal, to the management entity, so that the management entity sends a second request to a base station after receiving the indication.

The first request is used to request to acquire a discovery resource, the second request is used to request the base station to acquire the discovery resource and send the discovery resource to the first terminal, and the discovery resource is a resource used when the first terminal monitors the second message.

The receiver 2701 is configured to receive, before receiving the service identity of the second terminal sent by the first terminal, the identity of the first terminal and an identity of an application using a discovery service in the first terminal that are sent by the management entity, where the identity of the first terminal and the identity of the application using the discovery service in the first terminal are identities included in the first request that is sent by the first terminal to the management entity.

The processor 2702 is configured to verify, according to the identity of the first terminal, whether the first terminal is authorized to discover the second terminal.

The processor 2702 is configured to verify, according to the identity of the application using the discovery service in the first terminal, whether the application is authorized to use a discovery function.

The processor 2702 is configured to control the transmitter 2703 to feed back, if a verification result is that the first terminal is authorized to discover the second terminal and that the application is authorized to use the discovery function, an indication indicating that the first terminal is authorized to discover the second terminal and that the application is authorized to use the discovery function, to the management entity, so that the management entity sends the second request to the base station after receiving the indication.

The first request is used to request to acquire a discovery resource, the second request is used to request the base station to acquire the discovery resource and send the discovery resource to the first terminal, and the discovery resource is a resource used when the first terminal monitors the second message.

The receiver 2701 is configured to receive, before receiving the service identity of the second terminal sent by the first terminal, an identity of the second terminal sent by the management entity, where the identity of the second terminal is an identity included in a third request that is sent by the second terminal to the management entity.

The processor 2702 is configured to verify, according to the identity of the second terminal, whether the second terminal is authorized to be discovered.

The processor 2702 is configured to control the transmitter 2703 to feed back, if a verification result is that the second terminal is authorized to be discovered, an indication indicating that the second terminal is authorized to be discovered, to the management entity, so that the management entity sends a fourth request to the base station after receiving the indication.

The third request is used to request to acquire a discovered resource, the fourth request is used to request the base station to allocate and send the discovered resource to the second terminal, and the discovered resource is a resource used when the second terminal sends the second message.

The receiver 2701 is configured to receive, before receiving the service identity of the second terminal sent by the first terminal, the identity of the second terminal and an identity of an application using a discovered service in the second terminal that are sent by the management entity, where the identity of the second terminal and the identity of the application using the discovered service in the second terminal are identities included in the third request that is sent by the second terminal to the management entity.

The processor 2702 is configured to verify, according to the identity of the second terminal, whether the second terminal is authorized to be discovered.

The processor 2702 is configured to verify, according to the identity of the application using the discovered service in the second terminal, whether the application is authorized to use a discovered function.

The processor 2702 is configured to control the transmitter 2703 to feed back, if a verification result is that the second terminal is authorized to be discovered and that the application is authorized to use the discovered function, an indication indicating that the second terminal is authorized to be discovered and that the application is authorized to use the discovered function, to the management entity, so that the management entity sends the fourth request to the base station after receiving the indication.

The third request is used to request to acquire a discovered resource, the fourth request is used to request the base station to allocate and send the discovered resource to the second terminal, and the discovered resource is a resource used when the second terminal sends the second message.

The receiver 2701 is configured to receive, before receiving the service identity of the second terminal sent by the first terminal, a fifth request sent by the second terminal.

The processor 2702 is configured to control the transmitter 2703 to send a sixth request to the management entity, so that the management entity sends the fourth request to the base station.

The fifth request is used to request to acquire a discovered resource, the fourth request is used to request the base station to allocate and send the discovered resource to the second terminal, and the discovered resource is a resource used when the second terminal sends the second message.

The fifth request includes a GUTI of the second terminal.

The processor 2702 is configured to control the transmitter 2703 to send the sixth request to the management entity according to the GUTI.

The fifth request further includes the identity of the second terminal.

The processor 2702 is configured to verify, according to the identity of the second terminal before controlling the transmitter 2703 to send the sixth request to the management entity, whether the second terminal is authorized to be discovered.

The processor 2702 is configured to execute, if a verification result is that the second terminal is authorized to be discovered, the step of controlling the transmitter 2703 to send the sixth request to the management entity.

The fifth request may further include the identity of the second terminal and the identity of the application using the discovered service in the second terminal.

The processor 2702 is configured to verify, according to the identity of the second terminal before controlling the transmitter 2703 to send the sixth request to the management entity, whether the second terminal is authorized to be discovered.

The processor 2703 is configured to verify, according to the identity of the application using the discovered service in the second terminal, before controlling the transmitter 2703 to send the sixth request to the management entity, whether the application is authorized to use the discovered function.

The processor 2702 is configured to execute, if a verification result is that the second terminal is authorized to be discovered and that the application is authorized to use the discovered function, the step of controlling the transmitter 2703 to send the sixth request to the management entity.

As described above, the server provided by the embodiment of the present invention receives a service identity of a second terminal sent by a first terminal, queries description information of the second terminal corresponding to the service identity of the second terminal, and provides the description information of the second terminal for the first terminal. Thereby, a problem in the prior art that a first terminal must learn a unique identity of a second terminal in advance is solved, and an objective of discovering a terminal of an unknown identity in a vicinity and extending an application scope is achieved. In addition, the server provided by the embodiment of the present invention receives a service identity of the first terminal sent by a management entity, and verifies, according to the service identity of the first terminal, whether the first terminal is authorized to discover the second terminal corresponding to the service identity of the at least one second terminal, and thereby an objective of protecting privacy of the second terminal is achieved.

Figure 39:
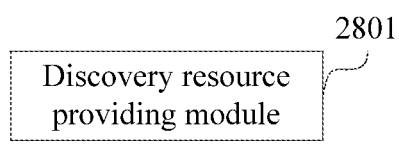
FIG. 39 is a device composition diagram of a base station according to an embodiment of the present invention.

Referring to FIG. 39, FIG. 39 shows a device composition diagram of a base station according to an embodiment of the present invention. The base station may include a discovery resource providing module 2801 configured to provide a discovery resource for a first terminal, so that the first terminal monitors, according to the discovery resource, a second message sent by at least one second terminal.

The first terminal may acquire a service identity of the second terminal according to the second message, and acquire description information of the second terminal from a server according to the service identity of the second terminal.

As described above, the base station provided by the embodiment of the present invention provides a discovery resource for a first terminal, so that the first terminal monitors, according to the discovery resource, a second message sent by at least one second terminal, acquires a service identity of the second terminal according to the second message, and acquires description information of the second terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 40:
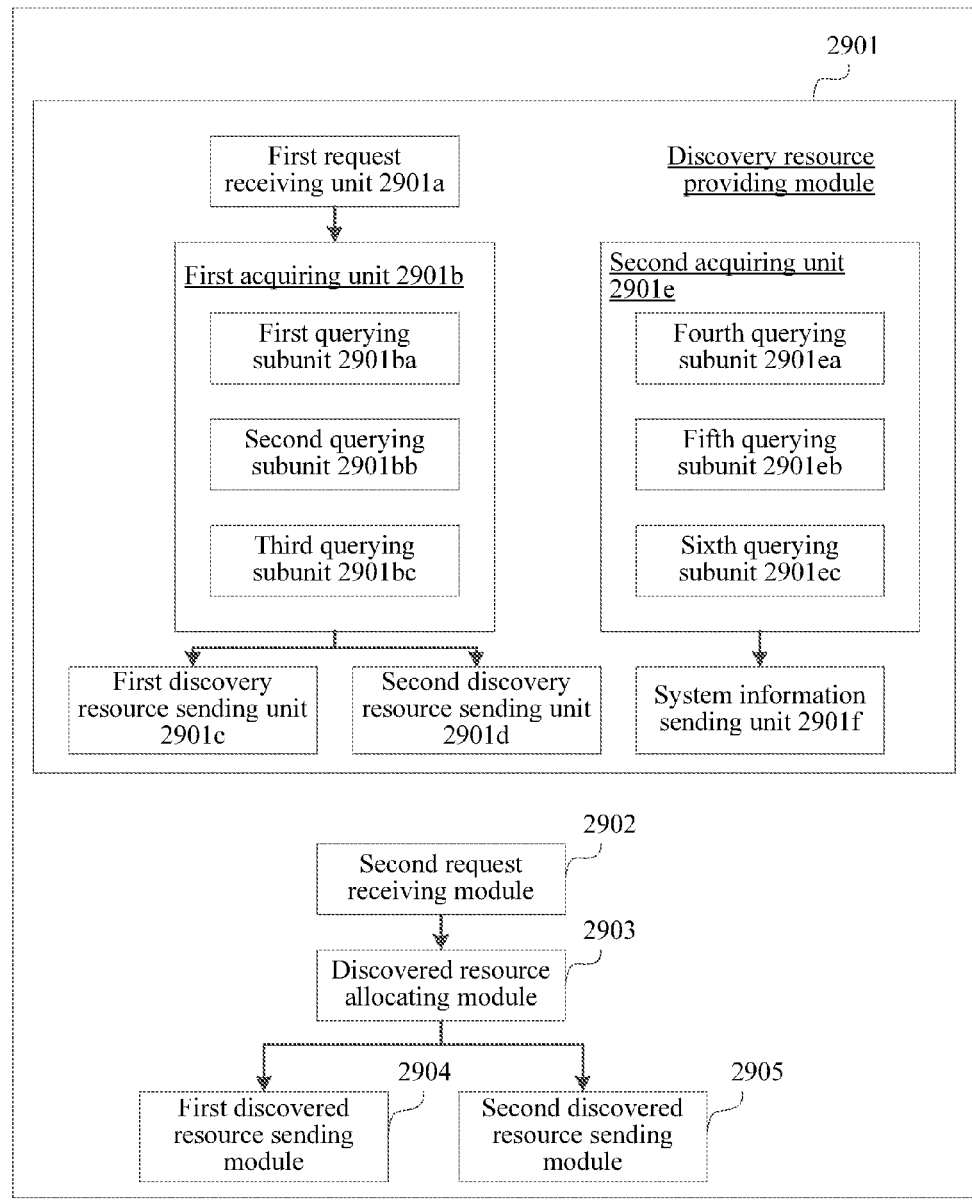
FIG. 40 is a device composition diagram of a base station according to another embodiment of the present invention.

For a more exemplary solution based on the foregoing base station shown in FIG. 39, reference may be made to FIG. 40, which shows a device composition diagram of a base station according to another embodiment of the present invention. The base station may include a discovery resource providing module 2901 configured to provide a discovery resource for a first terminal, so that the first terminal monitors, according to the discovery resource, a second message sent by at least one second terminal.

The first terminal may acquire a service identity of the second terminal according to the second message, and acquire description information of the second terminal from a server according to the service identity of the second terminal.

The discovery resource providing module 2901 includes a first request receiving unit 2901a configured to receive a second request sent by a management entity, where the second request is sent by the management entity according to a first request sent by the first terminal; a first acquiring unit 2901b configured to acquire the discovery resource; a first discovery resource sending unit 2901c configured to send the discovery resource acquired by the first acquiring unit 2901b to the first terminal; and a second discovery resource sending unit 2901d configured to send the discovery resource acquired by the first acquiring unit 2901b to the management entity, so that the management entity sends the discovery resource to the first terminal.

The discovery resource includes a discovery resource of a serving cell of the first terminal; or the discovery resource includes a discovery resource of a serving cell of the first terminal and a discovery resource of a cell adjacent to the serving cell.

The first request receiving unit 2901a is configured to receive an S1-AP message sent by the management entity, where the S1-AP message includes a first indication, where the first indication is used to instruct the base station to send the discovery resource to the first terminal or used to instruct the base station to acquire the discovery resource and send the discovery resource to the first terminal.

The first discovery resource sending unit 2901c is configured to send the discovery resource to the first terminal by using an RRC message.

The first request receiving unit 2901a is configured to receive an S1-AP message sent by the management entity, where the S1-AP message includes a second indication, where the second indication is used to instruct the base station to send the discovery resource to the management entity or used to instruct the base station to acquire the discovery resource and send the discovery resource to the management entity.

The second discovery resource sending unit 2901d is configured to send the discovery resource to the management entity by using a container, so that the management entity sends the discovery resource to the first terminal by using an NAS message.

The discovery resource providing module 2901 includes a second acquiring unit 2901e configured to acquire the discovery resource corresponding to the first terminal; and a system information sending unit 2901f configured to send, in a cell in which the first terminal is located, system information including the discovery resource acquired by the second acquiring unit 2901e.

The discovery resource includes the discovery resource of the serving cell of the first terminal; or the discovery resource includes the discovery resource of the serving cell of the first terminal and the discovery resource of the cell adjacent to the serving cell.

The first acquiring unit 2901b includes a first querying subunit 2901ba configured to locally query the discovery resource of the current serving cell of the first terminal; a second querying subunit 2901bb configured to locally query the discovery resource of the current serving cell of the first terminal and the discovery resource of the cell adjacent to the serving cell; and a third querying subunit 2901bc configured to locally query the discovery resource of the current serving cell of the first terminal, and query, from a neighboring base station through an X2 interface, the discovery resource of the cell adjacent to the serving cell.

The second acquiring unit 2901e includes a fourth querying subunit 2901ea configured to locally query the discovery resource of the current serving cell of the first terminal; a fifth querying subunit 2901eb configured to locally query the discovery resource of the current serving cell of the first terminal and the discovery resource of the cell adjacent to the serving cell; and a sixth querying subunit 2901ec configured to locally query the discovery resource of the current serving cell of the first terminal, and query, from the neighboring base station through the X2 interface, the discovery resource of the cell adjacent to the serving cell.

Neighboring base stations are connected by the X2 interface. If the base stations exchange discovery resources of cells maintained by the base stations, or a neighboring base station is notified when a discovery resource of a cell in a base station changes, the base station stores the discovery resource of each cell maintained by the base station and the discovery resources of cells adjacent to each cell maintained by the base station. In this case, the base station may directly locally query the discovery resource of the current serving cell of the first terminal and the discovery resource of the cell adjacent to the serving cell. If the base station stores only the discovery resource of each cell maintained by the base station, and does not store the discovery resources of the cells adjacent to each cell maintained by the base station, the base station may query, from the neighboring base station through the X2 interface, the discovery resource of the cell adjacent to the serving cell of the first terminal.

The base station further includes a second request receiving module 2902 configured to receive a fourth request sent by the management entity, where the fourth request is sent by the management entity according to a third request sent by the second terminal; a discovered resource allocating module 2903 configured to allocate a discovered resource to the second terminal according to the fourth request received by the second request receiving module 2902, where the discovered resource is a resource used when the second terminal sends the second message; a first discovered resource sending module 2904 configured to send the discovered resource allocated by the discovered resource allocating module 2903, to the second terminal; and a second discovered resource sending module 2905 configured to send the discovered resource allocated by the discovered resource allocating module 2903, to the management entity, so that the management entity sends the discovered resource to the second terminal.

The second request receiving module 2902 is configured to receive an S1-AP message sent by the management entity, where the S1-AP message includes a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal.

The first discovered resource sending module 2904 is configured to send the discovered resource to the second terminal by using an RRC message.

The second request receiving module 2902 is configured to receive an S1-AP message sent by the management entity, where the S1-AP message includes a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity.

The second discovered resource sending module 2905 is configured to send the discovered resource to the management entity by using a container, so that the management entity sends the discovered resource to the second terminal by using an NAS message.

As described above, the base station provided by the embodiment of the present invention provides a discovery resource for a first terminal, so that the first terminal monitors, according to the discovery resource, a second message sent by at least one second terminal, and acquires a service identity of the second terminal according to the second message, and acquires description information of the second terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, the base station provided by the embodiment of the present invention allocates a discovered resource to the second terminal, and allocates a discovery resource to the first terminal, so that the first terminal monitors, according to the discovery resource, the second message that is sent by the second terminal according to the discovered resource. Thereby, an objective of reducing burden of the terminal and saving power of the terminal while effectively reducing interference and saving hardware resources is achieved.

Figure 41:
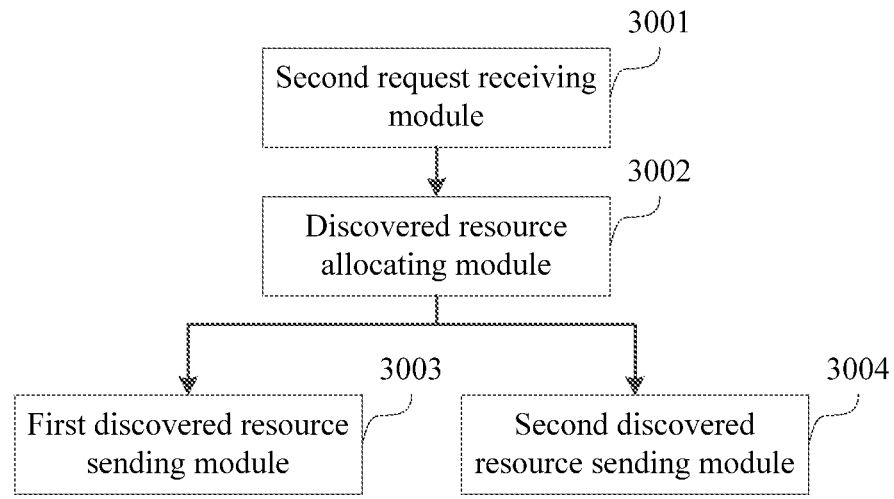
FIG. 41 is a device composition diagram of a base station according to an embodiment of the present invention.

Referring to FIG. 41, FIG. 41 shows a device composition diagram of a base station according to an embodiment of the present invention. The base station may include a second request receiving module 3001 configured to receive a fourth request sent by a management entity, where the fourth request is sent by the management entity according to a third request sent by a second terminal; a discovered resource allocating module 3002 configured to allocate a discovered resource to the second terminal according to the fourth request received by the second request receiving module 3001, where the discovered resource is a resource used when the second terminal sends a second message; a first discovered resource sending module 3003 configured to send the discovered resource allocated by the discovered resource allocating module 3002, to the second terminal; and a second discovered resource sending module 3004 configured to send the discovered resource allocated by the discovered resource allocating module 3002, to the management entity, so that the management entity sends the discovered resource to the second terminal.

As described above, the base station provided by the embodiment of the present invention allocates a discovered resource to a second terminal according to a fourth request sent by a management entity, and sends the discovered resource to the second terminal, or sends the discovered resource to the second terminal through the management entity, so that the second terminal sends a second message according to the discovered resource. Thereby, an objective of reducing interference between terminals is achieved.

Figure 42:
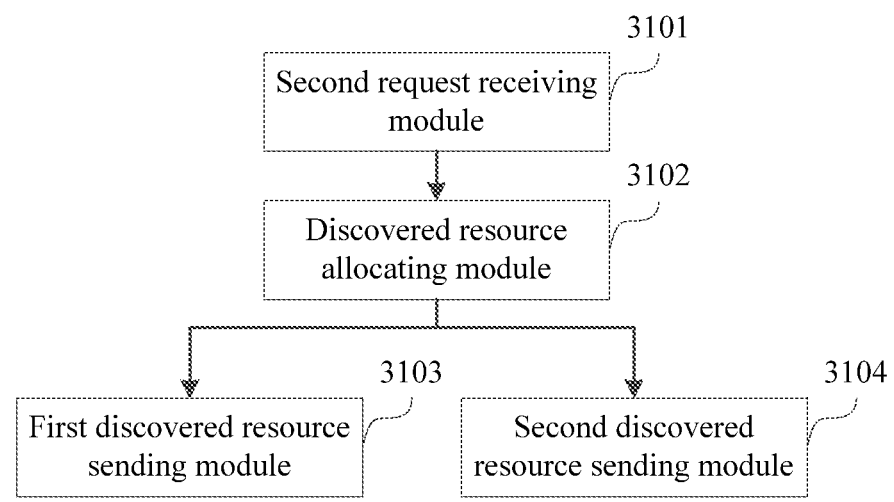
FIG. 42 is a device composition diagram of a base station according to another embodiment of the present invention.

For a more exemplary solution based on the foregoing base station shown in FIG. 41, reference may be made to FIG. 42, which shows a device composition diagram of a base station according to another embodiment of the present invention. The base station may include a second request receiving module 3101 configured to receive a fourth request sent by a management entity, where the fourth request is sent by the management entity according to a third request sent by a second terminal; a discovered resource allocating module 3102 configured to allocate a discovered resource to the second terminal according to the fourth request received by the second request receiving module 3101, where the discovered resource is a resource used when the second terminal sends a second message; a first discovered resource sending module 3103 configured to send the discovered resource allocated by the discovered resource allocating module 3102, to the second terminal; and a second discovered resource sending module 3104 configured to send the discovered resource allocated by the discovered resource allocating module 3102, to the management entity, so that the management entity sends the discovered resource to the second terminal.

The second request receiving module 3101 is configured to receive an S1-AP message sent by the management entity, where the S1-AP message includes a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal.

The first discovered resource sending module 3103 is configured to send the discovered resource to the second terminal by using an RRC message.

The second request receiving module 3101 is configured to receive an S1-AP message sent by the management entity, where the S1-AP message includes a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity.

The second discovered resource sending module 3104 is configured to send the discovered resource to the management entity by using a container, so that the management entity sends the discovered resource to the second terminal by using an NAS message.

Figure 43:
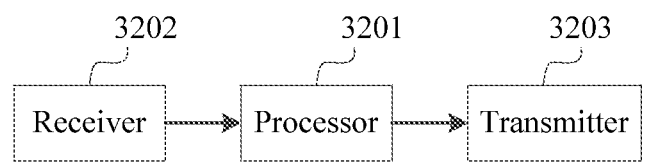
FIG. 43 is a device composition diagram of a base station according to an embodiment of the present invention.

Referring to FIG. 43, FIG. 43 shows a device composition diagram of a base station according to an embodiment of the present invention. The base station may include a processor 3201, a receiver 3202, and a transmitter 3203.

The processor 3201 is configured to control the receiver 3202 and transmitter 3203 to provide a discovery resource for a first terminal, so that the first terminal monitors, according to the discovery resource, a second message sent by at least one second terminal, and acquires a service identity of the second terminal according to the second message.

The first terminal may acquire description information of the second terminal from a server according to the service identity of the second terminal.

As described above, the base station provided by the embodiment of the present invention provides a discovery resource for a first terminal, so that the first terminal monitors, according to the discovery resource, a second message sent by at least one second terminal, acquires a service identity of the second terminal according to the second message, and acquires description information of the second terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 44:
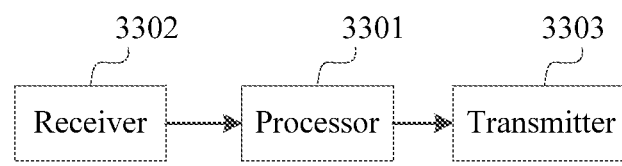
FIG. 44 is a device composition diagram of a base station according to another embodiment of the present invention.

For a more exemplary solution based on the foregoing base station shown in FIG. 43, reference may be made to FIG. 44, which shows a device composition diagram of a base station according to another embodiment of the present invention. The base station may include a processor 3301, a receiver 3302, and a transmitter 3303.

The processor 3301 is configured to control the receiver 3302 and transmitter 3303 to provide a discovery resource for a first terminal, so that the first terminal monitors, according to the discovery resource, a second message sent by at least one second terminal.

The first terminal may acquire a service identity of the second terminal according to the second message, and acquire description information of the second terminal from a server according to the service identity of the second terminal.

The receiver 3302 is configured to receive a second request sent by a management entity, where the second request is sent by the management entity according to a first request sent by the first terminal.

The processor 3301 is configured to acquire the discovery resource.

The processor 3301 is configured to control the transmitter 3303 to send the acquired discovery resource to the first terminal.

The processor 3301 is configured to control the transmitter 3303 to send the acquired discovery resource to the management entity, so that the management entity sends the discovery resource to the first terminal.

The discovery resource includes a discovery resource of a serving cell of the first terminal; or the discovery resource includes a discovery resource of a serving cell of the first terminal and a discovery resource of a cell adjacent to the serving cell.

The receiver 3302 is configured to receive an S1-AP message sent by the management entity, where the S1-AP message includes a first indication, where the first indication is used to instruct the base station to send the discovery resource to the first terminal or used to instruct the base station to acquire the discovery resource and send the discovery resource to the first terminal.

The processor 3301 is configured to control the transmitter 3303 to send the discovery resource to the first terminal by using an RRC message.

The receiver 3302 is configured to receive an S1-AP message sent by the management entity, where the S1-AP message includes a second indication, where the second indication is used to instruct the base station to send the discovery resource to the management entity or used to instruct the base station to acquire the discovery resource and send the discovery resource to the management entity.

The processor 3301 is configured to control the transmitter 3303 to send the discovery resource to the management entity by using a container, so that the management entity sends the discovery resource to the first terminal by using an NAS message.

The processor 3301 is configured to acquire the discovery resource corresponding to the first terminal.

The processor 3301 is configured to control the transmitter 3303 to send, in a cell in which the first terminal is located, system information including the acquired discovery resource.

The discovery resource includes the discovery resource of the serving cell of the first terminal; or the discovery resource includes the discovery resource of the serving cell of the first terminal and the discovery resource of the cell adjacent to the serving cell.

The processor 3301 is configured to locally query the discovery resource of the current serving cell of the first terminal.

The processor 3301 is configured to locally query the discovery resource of the current serving cell of the first terminal and the discovery resource of the cell adjacent to the serving cell.

The processor 3301 is configured to locally query the discovery resource of the current serving cell of the first terminal, and control the receiver 3302 and transmitter 3303 to query, from a neighboring base station through an X2 interface, the discovery resource of the cell adjacent to the serving cell.

Neighboring base stations are connected by the X2 interface. If the base stations exchange discovery resources of cells maintained by the base stations, or a neighboring base station is notified when a discovery resource of a cell in a base station changes, the base station stores the discovery resource of each cell maintained by the base station and the discovery resources of cells adjacent to each cell maintained by the base station. In this case, the base station may directly locally query the discovery resource of the current serving cell of the first terminal and the discovery resource of the cell adjacent to the serving cell. If the base station stores only the discovery resource of each cell maintained by the base station, and does not store the discovery resources of the cells adjacent to each cell maintained by the base station, the base station may query, from the neighboring base station through the X2 interface, the discovery resource of the cell adjacent to the serving cell of the first terminal.

The receiver 3302 is configured to receive a fourth request sent by the management entity, where the fourth request is sent by the management entity according to a third request sent by the second terminal.

The processor 3301 is configured to allocate a discovered resource to the second terminal according to the fourth request received by the receiver 3302, where the discovered resource is a resource used when the second terminal sends the second message.

The processor 3301 is configured to control the transmitter 3303 to send the allocated discovered resource to the second terminal.

The processor 3301 is configured to control the transmitter 3303 to send the allocated discovered resource to the management entity, so that the management entity sends the discovered resource to the second terminal.

The receiver 3302 is configured to receive an S1-AP message sent by the management entity, where the S1-AP message includes a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal.

The processor 3301 is configured to control the transmitter 3303 to send the discovered resource to the second terminal by using an RRC message.

The receiver 3302 is configured to receive an S1-AP message sent by the management entity, where the S1-AP message includes a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity.

The processor 3301 is configured to control the transmitter 3303 to send the discovered resource to the management entity by using a container, so that the management entity sends the discovered resource to the second terminal by using an NAS message.

As described above, the base station provided by the embodiment of the present invention provides a discovery resource for a first terminal, so that the first terminal monitors, according to the discovery resource, a second message sent by at least one second terminal, and acquires a service identity of the second terminal according to the second message, and acquires description information of the second terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, the base station provided by the embodiment of the present invention allocates a discovered resource to the second terminal, and allocates a discovery resource to the first terminal, so that the first terminal monitors, according to the discovery resource, the second message that is sent by the second terminal according to the discovered resource. Thereby, an objective of reducing burden of the terminal and saving power of the terminal while effectively reducing interference and saving hardware resources is achieved.

Figure 45:
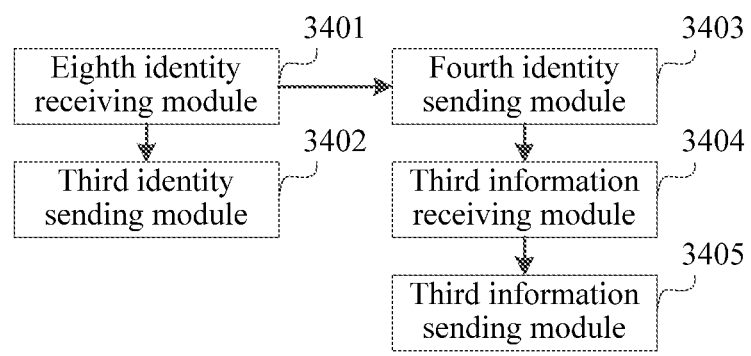
FIG. 45 is a device composition diagram of a management entity according to an embodiment of the present invention.

Referring to FIG. 45, FIG. 45 shows a device composition diagram of a management entity according to an embodiment of the present invention. The management entity may include an eighth identity receiving module 3401 configured to receive a service identity of a second terminal sent by a first terminal, where the service identity of the second terminal is acquired by the first terminal according to a second message that is sent by the at least one second terminal and that includes the service identity of the second terminal; a third identity sending module 3402 configured to send the service identity of the second terminal received by the eighth identity receiving module 3401 to a server, so that the server acquires description information of the second terminal according to the service identity of the second terminal and sends the description information of the second terminal to the first terminal; a fourth identity sending module 3403 configured to send the service identity of the second terminal received by the eighth identity receiving module 3401 to the server; a third information receiving module 3404 configured to receive the description information of the second terminal sent by the server; and a third information sending module 3405 configured to send the description information of the second terminal to the first terminal, where the description information of the second terminal is acquired by the server according to the service identity of the second terminal sent by the fourth identity sending module 3403.

As described above, the management entity provided by the embodiment of the present invention receives a service identity of a second terminal sent by a first terminal, and sends the service identity of the second terminal to a server, so that the server provides description information of the second terminal for the first terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 46:
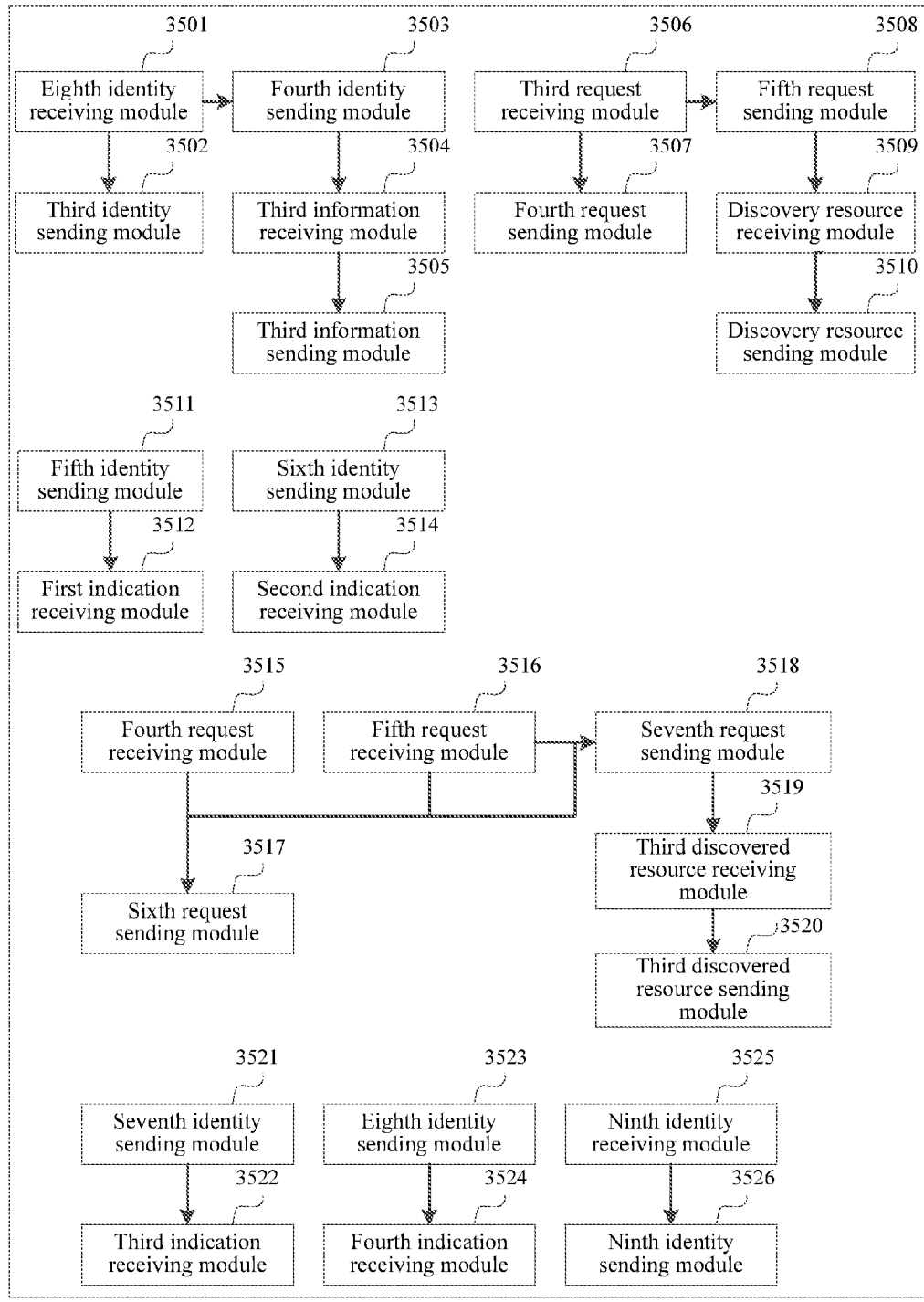
FIG. 46 is a device composition diagram of a management entity according to another embodiment of the present invention.

For a more exemplary solution based on the foregoing management entity shown in FIG. 45, reference may be made to FIG. 46, which shows a device composition diagram of a management entity according to another embodiment of the present invention. The management entity may include an eighth identity receiving module 3501 configured to receive a service identity of a second terminal sent by a first terminal, where the service identity of the second terminal is acquired by the first terminal according to a second message that is sent by the at least one second terminal and that includes the service identity of the second terminal; a third identity sending module 3502 configured to send the service identity of the second terminal received by the eighth identity receiving module 3501 to a server, so that the server acquires description information of the second terminal according to the service identity of the second terminal and sends the description information of the second terminal to the first terminal; a fourth identity sending module 3503 configured to send the service identity of the second terminal received by the eighth identity receiving module 3501 to the server; a third information receiving module 3504 configured to receive the description information of the second terminal sent by the server; and a third information sending module 3505 configured to send the description information of the second terminal to the first terminal, where the description information of the second terminal is acquired by the server according to the service identity of the second terminal sent by the fourth identity sending module 3503.

The management entity further includes a third request receiving module 3506 configured to receive, before the eighth identity receiving module 3501 receives the service identity of the second terminal sent by the first terminal, a first request sent by the first terminal; a fourth request sending module 3507 configured to send a second request to a base station according to the first request received by the third request receiving module 3506, so that the base station sends a discovery resource to the first terminal according to the second request; a fifth request sending module 3508 configured to send the second request to the base station according to the first request received by the third request receiving module 3506; a discovery resource receiving module 3509 configured to receive a discovery resource that is sent by the base station according to the second request sent by the fifth request sending module 3508; and a discovery resource sending module 3510 configured to send the discovery resource received by the discovery resource receiving module 3509 to the first terminal.

The discovery resource is a resource used when the first terminal monitors the second message.

The fourth request sending module 3507 is configured to send an S1-AP message to the base station according to the first request, where the S1-AP message includes a first indication, where the first indication is used to instruct the base station to send the discovery resource to the first terminal or used to instruct the base station to acquire the discovery resource and send the discovery resource to the first terminal, so that the base station sends the discovery resource to the first terminal by using an RRC message.

The fifth request sending module 3508 is configured to send an S1-AP message to the base station according to the first request, where the S1-AP message includes a second indication, where the second indication is used to instruct the base station to send the discovery resource to the management entity or used to instruct the base station to acquire the discovery resource and send the discovery resource to the management entity.

The discovery resource receiving module 3509 is configured to receive the discovery resource that is sent by the base station by using a container.

The discovery resource sending module 3510 is configured to send the discovery resource to the first terminal by using an NAS message.

The management entity further includes a fifth identity sending module 3511 configured to send, before the fourth request sending module 3507 or the fifth request sending module 3508 sends the second request to the base station according to the first request, an identity of the first terminal to the server, so that the server verifies, according to the identity of the first terminal, whether the first terminal is authorized to discover the second terminal; and a first indication receiving module 3512 configured to receive an indication fed back by the server and indicating that the first terminal is authorized to discover the second terminal; where the fourth request sending module 3507 is configured to send the second request to the base station according to the first request after the first indication receiving module 3512 receives the indication fed back by the server and indicating that the first terminal is authorized to discover the second terminal; and the fifth request sending module 3508 is configured to send the second request to the base station according to the first request after the first indication receiving module 3512 receives the indication fed back by the server and indicating that the first terminal is authorized to discover the second terminal.

The first request includes the identity of the first terminal.

The management entity further includes a sixth identity sending module 3513 configured to send, before the fourth request sending module 3507 or the fifth request sending module 3508 sends the second request to the base station according to the first request, the identity of the first terminal and an identity of an application using a discovery service in the first terminal to the server, so that the server verifies, according to the identity of the first terminal and the identity of the application using the discovery service in the first terminal, whether the first terminal is authorized to discover the second terminal and whether the application is authorized to use a discovery function; and a second indication receiving module 3514 configured to receive an indication fed back by the server and indicating that the first terminal is authorized to discover the second terminal and that the application is authorized to use the discovery function; where the fourth request sending module 3507 is configured to send the second request to the base station according to the first request after the second indication receiving module 3514 receives the indication fed back by the server and indicating that the first terminal is authorized to discover the second terminal and that the application is authorized to use the discovery function; and the fifth request sending module 3508 is configured to send the second request to the base station according to the first request after the second indication receiving module 3514 receives the indication fed back by the server and indicating that the first terminal is authorized to discover the second terminal and that the application is authorized to use the discovery function.

The first request includes the identity of the first terminal and the identity of the application using the discovery service in the first terminal.

The management entity further includes a fourth request receiving module 3515 configured to receive, before the eighth identity receiving module 3501 receives the service identity of the second terminal sent by the first terminal, a third request sent by the second terminal; a fifth request receiving module 3516 configured to receive, before the eighth identity receiving module 3501 receives the service identity of the second terminal sent by the first terminal, a sixth request sent by the server; a sixth request sending module 3517 configured to send a fourth request to the base station after the fourth request receiving module 3515 receives the third request or the fifth request receiving module 3516 receives the sixth request, so that the base station allocates and sends a discovered resource to the second terminal according to the fourth request; a seventh request sending module 3518 configured to send the fourth request to the base station after the fourth request receiving module 3515 receives the third request or the fifth request receiving module 3516 receives the sixth request; a third discovered resource receiving module 3519 configured to receive a discovered resource that is allocated and sent by the base station according to the fourth request sent by the seventh request sending module 3518; and a third discovered resource sending module 3520 configured to send the discovered resource received by the third discovered resource receiving module 3519 to the second terminal.

The discovered resource is a resource used when the second terminal sends the second message.

The sixth request sending module 3517 is configured to send an S1-AP message to the base station according to the third request, where the S1-AP message includes a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal, so that the base station sends the discovered resource to the second terminal by using an RRC message.

The seventh request sending module 3518 is configured to send an S1-AP message to the base station according to the third request, where the S1-AP message includes a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity.

The third discovered resource receiving module 3519 is configured to receive the discovered resource that is sent by the base station by using a container.

The third discovered resource sending module 3520 is configured to send the discovered resource to the second terminal by using an NAS message.

The management entity further includes a seventh identity sending module 3521 configured to send, before the sixth request sending module 3517 or the seventh request sending module 3518 sends the fourth request to the base station according to the third request, an identity of the second terminal to the server, so that the server verifies, according to the identity of the second terminal, whether the second terminal is authorized to be discovered; and a third indication receiving module 3522 configured to receive an indication fed back by the server and indicating that the second terminal is authorized to be discovered; where the sixth request sending module 3517 is configured to send the fourth request to the base station according to the third request after the third indication receiving module 3522 receives the indication fed back by the server and indicating that the second terminal is authorized to be discovered; and the seventh request sending module 3518 is configured to send the fourth request to the base station according to the third request after the third indication receiving module 3522 receives the indication fed back by the server and indicating that the second terminal is authorized to be discovered.

The third request includes the identity of the second terminal.

The management entity further includes an eighth identity sending module 3523 configured to send, before the sixth request sending module 3517 or the seventh request sending module 3518 sends the fourth request to the base station according to the third request, the identity of the second terminal and an identity of an application using a discovered service in the second terminal to the server, so that the server verifies, according to the identity of the second terminal and the identity of the application using the discovered service in the second terminal, whether the second terminal is authorized to be discovered and whether the application is authorized to use a discovered function; and a fourth indication receiving module 3524 configured to receive an indication fed back by the server and indicating that the second terminal is authorized to be discovered and that the application is authorized to use the discovered function; where the sixth request sending module 3517 is configured to send the fourth request to the base station according to the third request after the fourth indication receiving module 3524 receives the indication fed back by the server and indicating that the second terminal is authorized to be discovered and that the application is authorized to use the discovered function; and the seventh request sending module 3518 is configured to send the fourth request to the base station according to the third request after the fourth indication receiving module 3524 receives the indication fed back by the server and indicating that the second terminal is authorized to be discovered and that the application is authorized to use the discovered function.

The third request includes the identity of the second terminal and the identity of the application using the discovered service in the second terminal.

The management entity further includes a ninth identity receiving module 3525 configured to receive a service identity of the first terminal sent by the first terminal; and a ninth identity sending module 3526 configured to send the service identity of the first terminal received by the ninth identity receiving module 3525 to the server, so that the server acquires the description information of the second terminal according to the service identity of the second terminal after the server verifies, according to the service identity of the first terminal, that the first terminal is authorized to discover the second terminal.

As described above, the management entity provided by the embodiment of the present invention receives a service identity of a second terminal sent by a first terminal, and sends the service identity of the second terminal to a server, so that the server provides description information of the second terminal for the first terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, the management entity provided by the embodiment of the present invention requests to allocate a discovery resource to the first terminal, and requests to allocate a discovered resource to the second terminal, so that the first terminal monitors, according to the discovery resource, a second message that is sent by the second terminal according to the discovered resource. Thereby, an objective of reducing burden of the terminal, saving power of the terminal, and effectively reducing interference between second messages sent by the second terminals is achieved. Finally, the management entity provided by the embodiment of the present invention further receives a service identity of the first terminal sent by the first terminal, and sends the service identity to the server, so that the server verifies, according to the service identity of the first terminal, whether the first terminal is authorized to discover the second terminal corresponding to the service identity of the at least one second terminal. Thereby, an objective of protecting privacy of the second terminal is protected.

Figure 47:
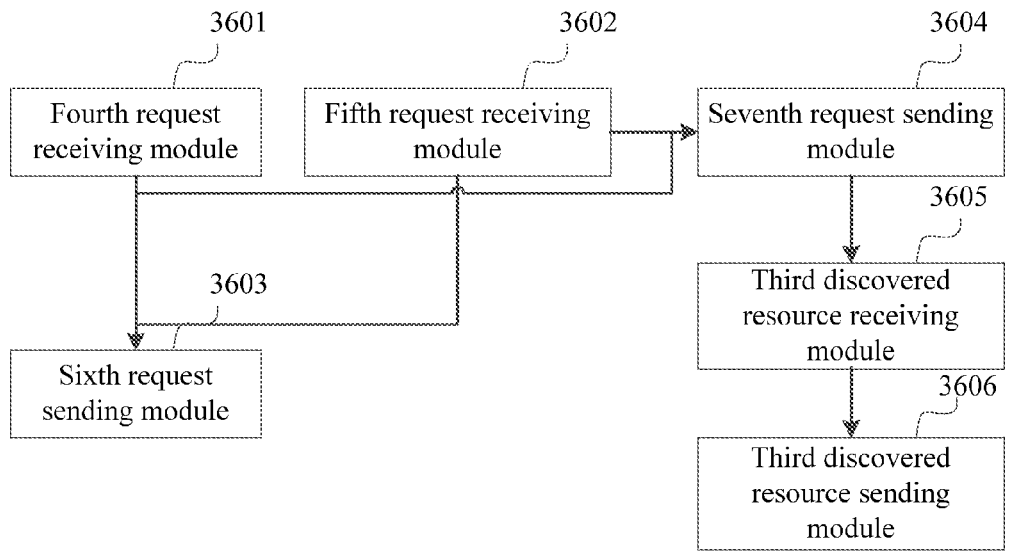
FIG. 47 is a device composition diagram of a management entity according to an embodiment of the present invention.

Referring to FIG. 47, FIG. 47 shows a device composition diagram of a management entity according to an embodiment of the present invention. The management entity may include a fourth request receiving module 3601 configured to receive a third request sent by a second terminal; a fifth request receiving module 3602 configured to receive a sixth request sent by a server; a sixth request sending module 3603 configured to send a fourth request to a base station according to the third request received by the fourth request receiving module 3601 or the sixth request received by the fifth request receiving module 3602, so that the base station allocates and sends a discovered resource to the second terminal according to the fourth request; a seventh request sending module 3604 configured to send the fourth request to the base station according to the third request received by the fourth request receiving module 3601 or the sixth request received by the fifth request receiving module 3602; a third discovered resource receiving module 3605 configured to receive a discovered resource that is allocated and sent by the base station according to the fourth request sent by the seventh request sending module 3604; and a third discovered resource sending module 3606 configured to send the discovered resource received by the third discovered resource receiving module 3605 to the second terminal.

The discovered resource is a resource used when the second terminal sends a second message.

As described above, the management entity provided by the embodiment of the present invention receives a third request sent by a second terminal; and sends a fourth request to a base station according to the third request, so that the base station allocates and sends a discovered resource to the second terminal according to the fourth request; or sends a fourth request to a base station according to the third request, and receives a discovered resource that is allocated and sent by the base station according to the fourth request, and sends the discovered resource to the second terminal; therefore, the second terminal sends a second message according to the discovered resource. Thereby, an objective of reducing interference between terminals is achieved.

Figure 48:
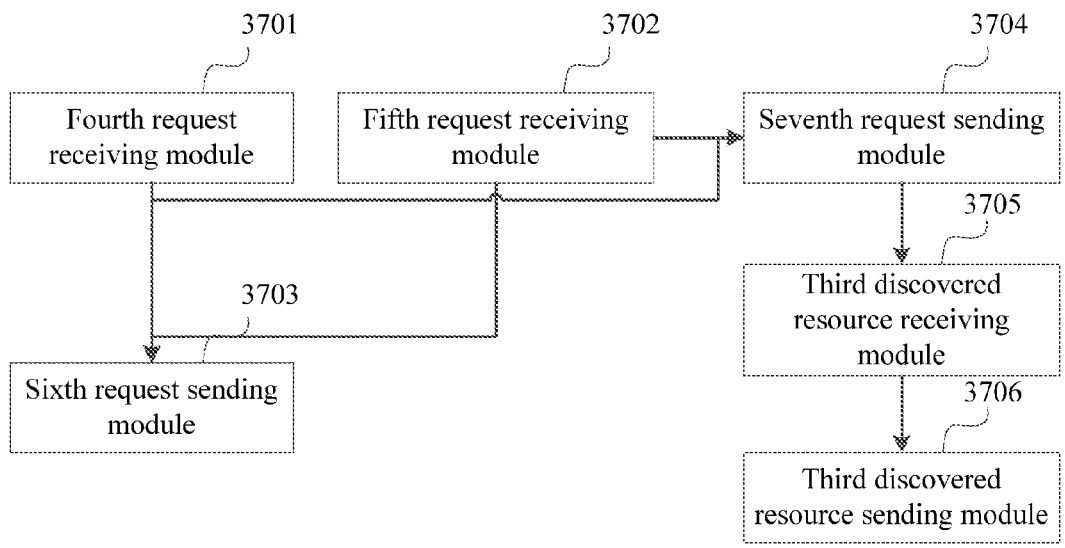
FIG. 48 is a device composition diagram of a management entity according to another embodiment of the present invention.

For a more exemplary solution based on the foregoing management entity shown in FIG. 47, reference may be made to FIG. 48, which shows a device composition diagram of a management entity according to another embodiment of the present invention. The management entity may include a fourth request receiving module 3701 configured to receive a third request sent by a second terminal; a fifth request receiving module 3702 configured to receive a sixth request sent by a server; a sixth request sending module 3703 configured to send a fourth request to a base station according to the third request received by the fourth request receiving module 3701 or the sixth request received by the fifth request receiving module 3702, so that the base station allocates and sends a discovered resource to the second terminal according to the fourth request; a seventh request sending module 3704 configured to send the fourth request to the base station according to the third request received by the fourth request receiving module 3701 or the sixth request received by the fifth request receiving module 3702; a third discovered resource receiving module 3705 configured to receive a discovered resource that is allocated and sent by the base station according to the fourth request sent by the seventh request sending module 3704; and a third discovered resource sending module 3706 configured to send the discovered resource received by the third discovered resource receiving module 3705 to the second terminal.

The discovered resource is a resource used when the second terminal sends a second message.

The sixth request sending module 3703 is configured to send an S1-AP message to the base station according to the third request, where the S1-AP message includes a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal, so that the base station sends the discovered resource to the second terminal by using an RRC message.

The seventh request sending module 3704 is configured to send an S1-AP message to the base station according to the third request, where the S1-AP message includes a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity.

The third discovered resource receiving module 3705 is configured to receive the discovered resource that is sent by the base station by using a container.

The third discovered resource sending module 3706 is configured to send the discovered resource to the second terminal by using an NAS message.

As described above, the management entity provided by the embodiment of the present invention receives a third request sent by a second terminal; and sends a fourth request to a base station according to the third request, so that the base station allocates and sends a discovered resource to the second terminal according to the fourth request; or sends a fourth request to a base station according to the third request, and receives a discovered resource that is allocated and sent by the base station according to the fourth request, and sends the discovered resource to the second terminal; therefore, the second terminal sends a second message according to the discovered resource. Thereby, an objective of reducing interference between terminals is achieved.

Figure 49:
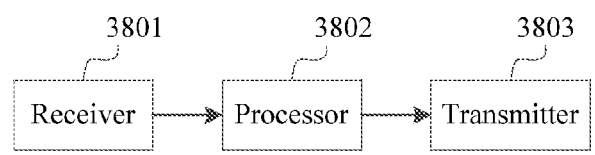
FIG. 49 is a device composition diagram of a management entity according to an embodiment of the present invention.

Referring to FIG. 49, FIG. 49 shows a device composition diagram of a management entity according to an embodiment of the present invention. The management entity may include a receiver 3801, a processor 3802, and a transmitter 3803.

The receiver 3801 is configured to receive a service identity of a second terminal sent by a first terminal, where the service identity of the second terminal is acquired by the first terminal according to a second message that is sent by the at least one second terminal and that includes the service identity of the second terminal, and the service identity is an identity allocated by a server.

The processor 3802 is configured to control the transmitter 3803 to send the service identity of the second terminal received by the receiver 3803 to the server, so that the server queries description information of the second terminal according to the service identity of the second terminal and sends the description information of the second terminal to the first terminal.

The processor 3802 is configured to control the transmitter 3803 to send the service identity of the second terminal received by the receiver 3801 to the server.

The receiver 3801 is configured to receive the description information of the second terminal sent by the server.

The processor 3802 is configured to control the transmitter 3803 to send the description information of the second terminal to the first terminal, where the description information of the second terminal is acquired by the server according to the service identity of the second terminal sent by the transmitter 3803.

As described above, the management entity provided by the embodiment of the present invention receives a service identity of a second terminal sent by a first terminal, and sends the service identity of the second terminal to a server, so that the server provides description information of the second terminal for the first terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved.

Figure 50:
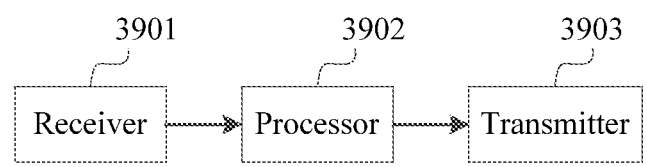
FIG. 50 is a device composition diagram of a management entity according to another embodiment of the present invention.

For a more exemplary solution based on the foregoing management entity shown in FIG. 49, reference may be made to FIG. 50, which shows a device composition diagram of a management entity according to another embodiment of the present invention. The management entity may be applied to a D2D system. The management entity may include a receiver 3901, a processor 3902, and a transmitter 3903.

The receiver 3901 is configured to receive a service identity of a second terminal sent by a first terminal, where the service identity of the second terminal is acquired by the first terminal according to a second message that is sent by the at least one second terminal and that includes the service identity of the second terminal, and the service identity is an identity allocated by a server.

The processor 3902 is configured to control the transmitter 3903 to send the service identity of the second terminal received by the receiver 3901 to the server, so that the server queries description information of the second terminal according to the service identity of the second terminal and sends the description information of the second terminal to the first terminal.

The processor 3902 is configured to control the transmitter 3903 to send the service identity of the second terminal received by the receiver 3901 to the server.

The receiver 3901 is configured to receive the description information of the second terminal sent by the server.

The processor 3902 is configured to control the transmitter 3903 to send the description information of the second terminal to the first terminal, where the description information of the second terminal is acquired by the server according to the service identity of the second terminal sent by the transmitter 3903.

The receiver 3901 is configured to receive, before receiving the service identity of the second terminal sent by the first terminal, a first request sent by the first terminal.

The processor 3902 is configured to control the transmitter 3903 to send a second request to a base station according to the first request received by the receiver 3901, so that the base station sends a discovery resource to the first terminal according to the second request.

The processor 3902 is configured to control the transmitter 3903 to send the second request to the base station according to the first request received by the receiver 3901.

The receiver 3901 is configured to receive the discovery resource that is sent by the base station according to the second request sent by the transmitter 3903.

The processor 3902 is configured to control the transmitter 3903 to send the discovery resource received by the receiver 3901 to the first terminal.

The discovery resource is a resource used when the first terminal monitors the second message.

The processor 3902 is configured to control the transmitter 3903 to send an S1-AP message to the base station according to the first request, where the S1-AP message includes a first indication, where the first indication is used to instruct the base station to send the discovery resource to the first terminal or used to instruct the base station to acquire the discovery resource and send the discovery resource to the first terminal, so that the base station sends the discovery resource to the first terminal by using an RRC message.

The processor 3902 is configured to control the transmitter 3903 to send an S1-AP message to the base station according to the first request, where the S1-AP message includes a second indication, where the second indication is used to instruct the base station to send the discovery resource to the management entity or used to instruct the base station to acquire the discovery resource and send the discovery resource to the management entity.

The receiver 3901 is configured to receive the discovery resource that is sent by the base station by using a container.

The processor 3902 is configured to control the transmitter 3903 to send the discovery resource to the first terminal by using an NAS message.

The processor 3902 is configured to control the transmitter 3903 to send, before controlling the transmitter 3903 to send the second request to the base station according to the first request, an identity of the first terminal to the server, so that the server verifies, according to the identity of the first terminal, whether the first terminal is authorized to discover the second terminal.

The receiver 3901 is configured to receive an indication fed back by the server and indicating that the first terminal is authorized to discover the second terminal.

The processor 3902 is configured to control the transmitter 3903 to send the second request to the base station according to the first request after the receiver 3901 receives the indication fed back by the server and indicating that the first terminal is authorized to discover the second terminal.

The first request includes the identity of the first terminal.

The processor 3902 is configured to control the transmitter 3903 to send, before controlling the transmitter 3903 to send the second request to the base station according to the first request, the identity of the first terminal and an identity of an application using a discovery service in the first terminal to the server, so that the server verifies, according to the identity of the first terminal and the identity of the application using the discovery service in the first terminal, whether the first terminal is authorized to discover the second terminal and whether the application is authorized to use a discovery function.

The receiver 3901 is configured to receive an indication fed back by the server and indicating that the first terminal is authorized to discover the second terminal and that the application is authorized to use the discovery function.

The processor 3902 is configured to control the transmitter 3903 to send the second request to the base station according to the first request after the receiver 3901 receives the indication fed back by the server and indicating that the first terminal is authorized to discover the second terminal and that the application is authorized to use the discovery function.

The first request includes the identity of the first terminal and the identity of the application using the discovery service in the first terminal.

The receiver 3901 is configured to receive, before receiving the service identity of the second terminal sent by the first terminal, a third request sent by the second terminal.

The receiver 3901 is further configured to receive, before receiving the service identity of the second terminal sent by the first terminal, a sixth request sent by the server.

The processor 3902 is configured to control the transmitter 3903 to send a fourth request to the base station after the receiver 3901 receives the third request or the sixth request, so that the base station allocates and sends a discovered resource to the second terminal according to the fourth request.

The processor 3902 is further configured to control the transmitter 3903 to send the fourth request to the base station after the receiver 3901 receives the third request or the sixth request.

The receiver 3901 is configured to receive the discovered resource that is allocated and sent by the base station according to the fourth request sent by the transmitter 3903.

The processor 3902 is configured to control the transmitter 3903 to send the discovered resource received by the receiver 3901 to the second terminal.

The discovered resource is a resource used when the second terminal sends the second message.

The processor 3902 is configured to control the transmitter 3903 to send an S1-AP message to the base station according to the third request, where the S1-AP message includes a third indication, where the third indication is used to instruct the base station to allocate the discovered resource, or allocate the discovered resource to the second terminal, or allocate the discovered resource and send the discovered resource to the second terminal, or allocate the discovered resource to the second terminal and send the discovered resource to the second terminal, so that the base station sends the discovered resource to the second terminal by using an RRC message.

The processor 3902 is configured to control the transmitter 3903 to send an S1-AP message to the base station according to the third request, where the S1-AP message includes a fourth indication, where the fourth indication is used to instruct the base station to allocate the discovered resource, or allocate the discovered resource to the second terminal, or allocate the discovered resource and send the discovered resource to the management entity, or allocate the discovered resource to the second terminal and send the discovered resource to the management entity.

The receiver 3901 is configured to receive the discovered resource that is sent by the base station by using a container.

The processor 3902 is configured to control the transmitter 3903 to send the discovered resource to the second terminal by using an NAS message.

The management entity further includes the processor 3902 that is configured to control the transmitter 3903 to send, before controlling the transmitter 3903 to send the fourth request to the base station according to the third request, an identity of the second terminal to the server, so that the server verifies, according to the identity of the second terminal, whether the second terminal is authorized to be discovered; the receiver 3901 is configured to receive an indication fed back by the server and indicating that the second terminal is authorized to be discovered; and the processor 3902 is configured to control the transmitter 3903 to send the fourth request to the base station according to the third request after the receiver 3901 receives the indication fed back by the server and indicating that the second terminal is authorized to be discovered.

The third request includes the identity of the second terminal.

The management entity further includes the processor 3902 that is configured to control the transmitter 3903 to send, before controlling the transmitter 3903 to send the fourth request to the base station according to the third request, the identity of the second terminal and an identity of an application using a discovered service in the second terminal to the server, so that the server verifies, according to the identity of the second terminal and the identity of the application using the discovered service in the second terminal, whether the second terminal is authorized to be discovered and whether the application is authorized to use a discovered function; the receiver 3901 is configured to receive an indication fed back by the server and indicating that the second terminal is authorized to be discovered and that the application is authorized to use the discovered function; and the processor 3902 is configured to control the transmitter 3903 to send the fourth request to the base station according to the third request after the receiver 3901 receives the indication fed back by the server and indicating that the second terminal is authorized to be discovered and that the application is authorized to use the discovered function.

The third request includes the identity of the second terminal and the identity of the application using the discovered service in the second terminal.

The receiver 3901 is configured to receive, before receiving the description information of the second terminal sent by the server, a service identity of the first terminal sent by the first terminal.

The processor 3902 is configured to control the transmitter 3903 to send the service identity of the first terminal received by the receiver 3901 to the server, so that the server queries the description information of the second terminal according to the service identity of the second terminal after the server verifies, according to the service identity of the first terminal, that the first terminal is authorized to discover the second terminal.

As described above, the management entity provided by the embodiment of the present invention receives a service identity of a second terminal sent by a first terminal, and sends the service identity of the second terminal to a server, so that the server provides description information of the second terminal for the first terminal according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, the management entity provided by the embodiment of the present invention requests to allocate a discovery resource to the first terminal, and requests to allocate a discovered resource to the second terminal, so that the first terminal monitors, according to the discovery resource, a second message that is sent by the second terminal according to the discovered resource. Thereby, an objective of reducing burden of the terminal, saving power of the terminal, and effectively reducing interference between second messages sent by the second terminals is achieved. Finally, the management entity provided by the embodiment of the present invention further receives a service identity of the first terminal sent by the first terminal, and sends the service identity to the server, so that the server verifies, according to the service identity of the first terminal, whether the first terminal is authorized to discover the second terminal corresponding to the service identity of the at least one second terminal. Thereby, an objective of protecting privacy of the second terminal is protected.

Figure 51:
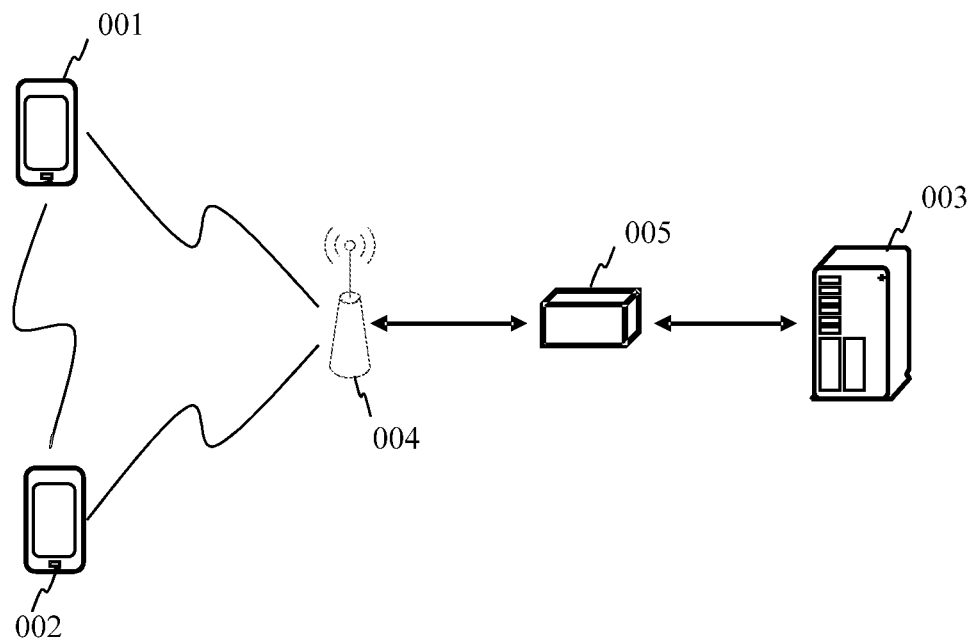
FIG. 51 is a system composition diagram of a terminal discovery system according to an embodiment of the present invention.

Referring to FIG. 51, FIG. 51 shows a system composition diagram of a terminal discovery system according to an embodiment of the present invention. The terminal discovery system may include a first terminal 001 as shown in FIG. 23 or FIG. 24, at least one second terminal 002 as shown in FIG. 27 or FIG. 28, a server 003 as shown in FIG. 33 or FIG. 34, a base station 004 as shown in FIG. 39 or FIG. 40, and a management entity 005 as shown in FIG. 45 or FIG. 46.

As described above, in the terminal discovery system provided by the embodiment of the present invention, a first terminal acquires a discovery resource, monitors, according to the discovery resource, a second message that is sent by at least one second terminal and includes a service identity of the second terminal, and acquires the service identity of the second terminal; and acquires description information of the second terminal from a server according to the service identity of the second terminal. Thereby, a problem in the prior art that a first terminal must learn a unique identity of a second terminal in advance is solved, and an objective of discovering a terminal of an unknown identity in a vicinity and extending an application scope is achieved. In addition, in the terminal discovery system provided by the embodiment of the present invention, the first terminal monitors, according to the acquired discovery resource, the second message that is sent the second terminal according to a discovered resource. Thereby, an objective of reducing burden of the terminal and saving power of the terminal while effectively reducing interference is achieved. Finally, in the terminal discovery system provided by the embodiment of the present invention, the first terminal sends a service identity of the first terminal to a management entity, so that the server verifies, according to the service identity of the first terminal, whether the first terminal is authorized to discover the second terminal, and thereby an objective of protecting privacy of the second terminal is achieved.

It should be noted that in terminal discovery, the first terminal, second terminal, server, base station, and management entity provided by the foregoing embodiments are described by using only division of the foregoing functional modules as an example. In actual application, the foregoing functions can be allocated to different modules and implemented according to a requirement, that is, an inner structure of a device is divided into different function modules to implement all or some of the functions described above. In addition, the first terminal, second terminal, server, base station, and management entity provided by the foregoing embodiments belong to a same conception as the terminal discovery method embodiments. For specific implementation processes thereof, reference may be made to the method embodiments, and no further description is provided herein.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present invention, but are not intended to limit the present invention. Any modification, equivalent replacement, and improvement made without departing from the principle of the present invention shall fall within the protection scope of the present invention.

An embodiment of the present invention provides a terminal discovery method, comprising acquiring, by a first terminal, a discovery resource; monitoring, by the first terminal according to the discovery resource, a second message sent by at least one second terminal, wherein the second message comprises a service identity of the second terminal; acquiring, by the first terminal, the service identity of the second terminal according to the second message; and acquiring, by the first terminal, description information of the second terminal from a server according to the service identity of the second terminal.

In a first development of the terminal discovery method according to the embodiment, the acquiring, by the first terminal, description information of the second terminal from a server according to the service identity of the second terminal comprises sending, by the first terminal, the service identity of the second terminal to the server; or sending, by the first terminal, the service identity of the second terminal to a management entity, so that the management entity sends the service identity of the second terminal to the server; and receiving, by the first terminal, the description information of the second terminal sent by the server, wherein the description information of the second terminal is information that is acquired by the server according to the service identity of the second terminal; or receiving, by the first terminal, the description information of the second terminal sent by the management entity, wherein the description information of the second terminal is information that is acquired by the server according to the service identity of the second terminal and sent to the management entity.

In a second development of the terminal discovery method according to the embodiment, before the receiving, by the first terminal, the description information of the second terminal sent by the server or before the receiving, by the first terminal, the description information of the second terminal sent by the management entity, the method further comprises sending, by the first terminal, a service identity of the first terminal to the server, so that the server acquires the description information of the second terminal according to the service identity of the second terminal after the server verifies, according to the service identity of the first terminal, that the first terminal is authorized to discover the second terminal; or sending, by the first terminal, a service identity of the first terminal to the management entity, so that the management entity sends the service identity of the first terminal to the server, and the server acquires the description information of the second terminal according to the service identity of the second terminal after the server verifies, according to the service identity of the first terminal, that the first terminal is authorized to discover the second terminal.

In a third development of the terminal discovery method according to the embodiment, the acquiring, by a first terminal, a discovery resource comprises sending, by the first terminal, a first request to the management entity, so that the management entity sends a second request to a base station; and receiving, by the first terminal, the discovery resource that is sent by the base station according to the second request; or receiving, by the first terminal, the discovery resource that is sent by the management entity, wherein the discovery resource is a discovery resource that is sent by the base station to the management entity according to the second request; wherein the discovery resource comprises a discovery resource of a serving cell of the first terminal; or the discovery resource comprises a discovery resource of a serving cell of the first terminal and a discovery resource of a cell adjacent to the serving cell of the first terminal.

In a fourth development of the terminal discovery method according to the embodiment, the discovery resource that is sent by the base station according to the second request comprises receiving, by the first terminal, the discovery resource that the base station sends by using an RRC message after receiving the second request; wherein the second request is an S1-AP message comprising a first indication, wherein the first indication is used to instruct the base station to send the discovery resource to the first terminal or used to instruct the base station to acquire the discovery resource and send the discovery resource to the first terminal.

In a fifth development of the terminal discovery method according to the embodiment, the receiving, by the first terminal, the discovery resource that is sent by the management entity comprises receiving, by the first terminal, the discovery resource that is sent by the management entity by using an NAS message, wherein the discovery resource is the discovery resource that the base station sends to the management entity by using a container after receiving the second request; wherein the second request is an S1-AP message comprising a second indication, wherein the second indication is used to instruct the base station to send the discovery resource to the management entity or used to instruct the base station to acquire the discovery resource and send the discovery resource to the management entity.

In a sixth development of the terminal discovery method according to the embodiment, the sending, by the first terminal, a first request to the management entity comprises sending, by the first terminal, the first request comprising an identity of the first terminal to the management entity, so that the management entity sends the identity of the first terminal to the server and when the server verifies, according to the identity of the first terminal, that the first terminal is authorized to discover the second terminal, sends the second request to the base station.

In a seventh development of the terminal discovery method according to the embodiment, the sending, by the first terminal, a first request to the management entity comprises sending, by the first terminal, the first request comprising an identity of the first terminal and an identity of an application using a discovery service in the first terminal to the management entity, so that the management entity sends the identity of the first terminal and the identity of the application using the discovery service in the first terminal to the server and when the server verifies, according to the identity of the first terminal and the identity of the application using the discovery service in the first terminal, that the first terminal is authorized to discover the second terminal and that the application is authorized to use a discovery function, sends the second request to the base station.

In an eighth development of the terminal discovery method according to the embodiment, the acquiring, by a first terminal, a discovery resource comprises receiving, by the first terminal, system information sent by a base station; and resolving, by the first terminal, the discovery resource comprised in the system information; wherein the discovery resource comprises a discovery resource of a serving cell of the first terminal; or the discovery resource comprises a discovery resource of a serving cell of the first terminal and a discovery resource of a cell adjacent to the serving cell of the first terminal.

In a ninth development of the terminal discovery method according to the embodiment, the acquiring, by the first terminal, the service identity of the second terminal according to the second message comprises determining that the service identity in the second message and compliant with a predetermined condition is the service identity of the second terminal; wherein the predetermined condition comprises at least one of the following conditions: a signal strength of the second message is greater than or equal to a predetermined strength threshold; or a type of the second terminal comprised in the second message complies with a predetermined type; or an application description comprised in the second message complies with a predetermined application description.

In a tenth development of the terminal discovery method according to the embodiment, before the monitoring, by the first terminal according to the discovery resource, a second message sent by at least one second terminal, the method further comprises sending a first message, so that the second terminal sends the second message according to the first message after receiving the first message.

An embodiment of the present invention provides a terminal discovery method, comprising sending, by a second terminal, a second message comprising a service identity of the second terminal, so that a first terminal acquires the service identity of the second terminal according to the second message and acquires description information of the second terminal from a server according to the service identity of the second terminal.

In a first development of the terminal discovery method according to the embodiment, before the sending, by a second terminal, a second message comprising a service identity of the second terminal, the method further comprises sending, by the second terminal, a third request to a management entity, so that the management entity sends a fourth request to a base station; or sending, by the second terminal, a fifth request to the server, so that the server sends a sixth request to a management entity, and the management entity sends a fourth request to a base station; and receiving, by the second terminal, a discovered resource sent by the base station; or receiving, by the second terminal, a discovered resource that is sent by the base station to the management entity and sent by the management entity to the second terminal, wherein the discovered resource is a resource that is allocated by the base station according to the fourth request; and the sending, by a second terminal, a second message comprising a service identity of the second terminal comprises sending, by the second terminal according to the discovered resource, the second message comprising the service identity of the second terminal.

In a second development of the terminal discovery method according to the embodiment, the receiving, by the second terminal, a discovered resource sent by the base station comprises receiving, by the second terminal, the discovered resource that is sent by the base station by using an RRC message, wherein the discovered resource is the resource that the base station allocates after receiving the fourth request; wherein the fourth request is an S1-AP message comprising a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal.

In a third development of the terminal discovery method according to the embodiment, the receiving, by the second terminal, a discovered resource that is sent by the base station to the management entity and sent by the management entity to the second entity comprises receiving, by the second terminal, the discovered resource that is sent by the management entity by using an NAS message, wherein the discovered resource is the discovered resource that the base station sends to the management entity by using a container after receiving the fourth request; wherein the fourth request is an S1-AP message comprising a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity.

In a fourth development of the terminal discovery method according to the embodiment, the sending, by the second terminal, a third request to a management entity comprises sending, by the second terminal, the third request comprising an identity of the second terminal to the management entity, so that the management entity sends the identity of the second terminal to the server and when the server verifies, according to the identity of the second terminal, that the second terminal is authorized to be discovered, sends the fourth request to the base station.

In a fifth development of the terminal discovery method according to the embodiment, the sending, by the second terminal, a third request to a management entity comprises sending, by the second terminal, the third request comprising an identity of the second terminal and an identity of an application using a discovered service in the second terminal to the management entity, so that the management entity sends the identity of the second terminal and the identity of the application using the discovered service in the second terminal to the server and when the server verifies, according to the identity of the second terminal, that the second terminal is authorized to be discovered and that the application is authorized to use a discovered function, sends the fourth request to the base station.

In a sixth development of the terminal discovery method according to the embodiment, the sending, by the second terminal, a fifth request to the server, so that the server sends a sixth request to the management entity comprises sending, by the second terminal, the fifth request comprising an identity of the second terminal to the server, so that the server sends the sixth request to the management entity when the server verifies, according to the identity of the second terminal, that the second terminal is authorized to be discovered.

In a seventh development of the terminal discovery method according to the embodiment, the sending, by the second terminal, a fifth request to the server, so that the server sends a sixth request to the management entity comprises sending, by the second terminal, the fifth request comprising an identity of the second terminal and an identity of an application using a discovered service in the second terminal to the server, so that the server sends the sixth request to the management entity when the server verifies, according to the identity of the second terminal, that the second terminal is authorized to be discovered and that the application is authorized to use a discovered function.

In an eighth development of the terminal discovery method according to the embodiment, the sending, by the second terminal, a fifth request to the server, so that the server sends a sixth request to the management entity, and the fourth request is sent to the base station comprises sending, by the second terminal, the fifth request comprising a GUTI of the second terminal to the server, so that the server sends the sixth request to the management entity according to the GUTI.

In a ninth development of the terminal discovery method according to the embodiment, the sending, by a second terminal, a second message comprising a service identity of the second terminal comprises sending, by the second terminal, the second message immediately after receiving the discovered resource; or receiving, by the second terminal, a first message sent by the first terminal, and sending the second message according to the first message.

An embodiment of the present invention provides a terminal discovery method, comprising sending, by a second terminal, a third request to a management entity, so that the management entity sends a fourth request to a base station; or sending, by the second terminal, a fifth request to a server, so that the server sends a sixth request to a management entity, and the management entity sends a fourth request to a base station; and receiving, by the second terminal, a discovered resource sent by the base station; or receiving, by the second terminal, a discovered resource that is sent by the base station to the management entity and sent by the management entity to the second terminal, wherein the discovered resource is a resource that is allocated by the base station according to the fourth request.

In a first development of the terminal discovery method according to the embodiment, the receiving, by the second terminal, a discovered resource sent by the base station comprises receiving, by the second terminal, the discovered resource that is sent by the base station by using an RRC message, wherein the discovered resource is the resource that the base station allocates after receiving the fourth request; wherein the fourth request is an S1-AP message comprising a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal.

In a second development of the terminal discovery method according to the embodiment, the receiving, by the second terminal, a discovered resource that is sent by the base station to the management entity and sent by the management entity to the second terminal comprises receiving, by the second terminal, the discovered resource that is sent by the management entity by using an NAS message, wherein the discovered resource is the discovered resource that the base station sends to the management entity by using a container after receiving the fourth request; wherein the fourth request is an S1-AP message comprising a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity.

In a third development of the terminal discovery method according to the embodiment, the sending, by the second terminal, a fifth request to a server, so that the server sends a sixth request to the management entity, and the fourth request is sent to the base station comprises sending, by the second terminal, the fifth request comprising a GUTI of the second terminal to the server, so that the server sends the sixth request to the management entity according to the GUTI.

An embodiment of the present invention provides a terminal discovery method, wherein the method comprises receiving, by a server, a service identity of a second terminal sent by a first terminal, wherein the service identity of the second terminal is acquired by the first terminal according to a second message that is sent by the second terminal and that comprises the service identity of the second terminal; acquiring, by the server, description information of the second terminal according to the service identity of the second terminal; and providing, by the server, the acquired description information of the second terminal for the first terminal.

In a first development of the terminal discovery method according to the embodiment, the receiving, by a server, a service identity of a second terminal sent by a first terminal comprises receiving, by the server, the service identity of the second terminal sent by the first terminal; or receiving, by the server, the service identity of the second terminal sent by a management entity, wherein the service identity of the second terminal is a service identity sent by the first terminal to the management entity.

In a second development of the terminal discovery method according to the embodiment, the acquiring, by the server, description information of the second terminal according to the service identity of the second terminal comprises locally querying, by the server, the description information of the second terminal corresponding to the service identity of the second terminal; or acquiring, by the server according to the service identity of the second terminal, the description information of the second terminal from a home server of the second terminal or a server that currently services the second terminal.

In a third development of the terminal discovery method according to the embodiment, the providing, by the server, the acquired description information of the second terminal for the first terminal comprises sending, by the server, the acquired description information of the second terminal to the first terminal; or sending, by the server, the acquired description information of the second terminal to a management entity, so that the management entity sends the description information of the second terminal to the first terminal.

In a fourth development of the terminal discovery method according to the embodiment, before the acquiring, by the server, description information of the second terminal according to the service identity of the second terminal, the method further comprises receiving, by the server, a service identity of the first terminal sent by the first terminal; or receiving, by the server, a service identity of the first terminal sent by a management entity, wherein the service identity of the first terminal is sent by the first terminal to the management entity; verifying, by the server according to the service identity of the first terminal, whether the first terminal is authorized to discover the second terminal; and if a verification result is that the first terminal is authorized to discover the second terminal, executing, by the server, the step of acquiring the description information of the second terminal according to the service identity of the second terminal.

In a fifth development of the terminal discovery method according to the embodiment, before the receiving, by a server, a service identity of a second terminal sent by a first terminal, the method further comprises receiving, by the server, an identity of the first terminal sent by a management entity, wherein the identity of the first terminal is an identity comprised in a first request that is sent by the first terminal to the management entity; verifying, by the server according to the identity of the first terminal, whether the first terminal is authorized to discover the second terminal; and if a verification result is that the first terminal is authorized to discover the second terminal, feeding back, by the server, an indication indicating that the first terminal is authorized to discover the second terminal, to the management entity, so that the management entity sends a second request to a base station after receiving the indication; wherein the first request is used to request to acquire a discovery resource, the second request is used to request the base station to acquire the discovery resource and send the discovery resource to the first terminal, and the discovery resource is a resource used when the first terminal monitors the second message.

In a sixth development of the terminal discovery method according to the embodiment, before the receiving, by a server, a service identity of a second terminal sent by a first terminal, the method further comprises receiving, by the server, an identity of the first terminal and an identity of an application using a discovery service in the first terminal that are sent by a management entity, wherein the identity of the first terminal and the identity of the application using the discovery service in the first terminal are identities comprised in a first request that is sent by the first terminal to the management entity; verifying, by the server according to the identity of the first terminal, whether the first terminal is authorized to discover the second terminal, and verifying, according to the identity of the application using the discovery service in the first terminal, whether the application is authorized to use a discovery function; and if a verification result is that the first terminal is authorized to discover the second terminal and that the application is authorized to use the discovery function, feeding back, by the server, an indication indicating that the first terminal is authorized to discover the second terminal and that the application is authorized to use the discovery function, to the management entity, so that the management entity sends a second request to a base station after receiving the indication; wherein the first request is used to request to acquire a discovery resource, the second request is used to request the base station to acquire the discovery resource and send the discovery resource to the first terminal, and the discovery resource is a resource used when the first terminal monitors the second message.

In a seventh development of the terminal discovery method according to the embodiment, before the receiving, by a server, a service identity of a second terminal sent by a first terminal, the method further comprises receiving, by the server, an identity of the second terminal sent by a management entity, wherein the identity of the second terminal is an identity comprised in a third request that is sent by the second terminal to the management entity; verifying, by the server according to the identity of the second terminal, whether the second terminal is authorized to be discovered; and if a verification result is that the second terminal is authorized to be discovered, feeding back, by the server, an indication indicating that the second terminal is authorized to be discovered, to the management entity, so that the management entity sends a fourth request to a base station after receiving the indication; wherein the third request is used to request to acquire a discovered resource, the fourth request is used to request the base station to allocate and send the discovered resource to the second terminal, and the discovered resource is a resource used when the second terminal sends the second message.

In an eighth development of the terminal discovery method according to the embodiment, before the receiving, by a server, a service identity of a second terminal sent by a first terminal, the method further comprises receiving, by the server, an identity of the second terminal and an identity of an application using a discovered service in the second terminal that are sent by a management entity, wherein the identity of the second terminal and the identity of the application using the discovered service in the second terminal are identities comprised in a third request that is sent by the second terminal to the management entity; verifying, by the server according to the identity of the second terminal, whether the second terminal is authorized to be discovered by the first terminal, and verifying, according to the identity of the application using the discovered service in the second terminal, whether the application is authorized to use a discovered function; and if a verification result is that the second terminal is authorized to be discovered by the first terminal and that the application is authorized to use the discovered function, feeding back, by the server, an indication indicating that the second terminal is authorized to be discovered by the first terminal and that the application is authorized to use the discovered function, to the management entity, so that the management entity sends a fourth request to a base station after receiving the indication; wherein the third request is used to request to acquire a discovered resource, the fourth request is used to request the base station to allocate and send the discovered resource to the second terminal, and the discovered resource is a resource used when the second terminal sends the second message.

In a ninth development of the terminal discovery method according to the embodiment, before the receiving, by a server, a service identity of a second terminal sent by a first terminal, the method further comprises receiving, by the server, a fifth request sent by the second terminal; and sending, by the server, a sixth request to a management entity, so that the management entity sends a fourth request to a base station; wherein the fifth request is used to request to acquire a discovered resource, the fourth request is used to request the base station to allocate and send the discovered resource to the second terminal, and the discovered resource is a resource used when the second terminal sends the second message.

In a tenth development of the terminal discovery method according to the embodiment, the fifth request comprises a GUTI of the second terminal; and the sending, by the server, a sixth request to a management entity comprises sending, by the server, the sixth request to the management entity according to the GUTI.

In an eleventh development of the terminal discovery method according to the embodiment, the fifth request comprises an identity of the second terminal, and before the sending, by the server, a sixth request to a management entity, the method further comprises verifying, by the server according to the identity of the second terminal, whether the second terminal is authorized to be discovered by the first terminal; and if a verification result is that the second terminal is authorized to be discovered, executing, by the server, the step of sending the sixth request to the management entity.

In a twelfth development of the terminal discovery method according to the embodiment, the fifth request comprises an identity of the second terminal and an identity of an application using a discovered service in the second terminal, and before the sending, by the server, a sixth request to a management entity, the method further comprises verifying, by the server according to the identity of the second terminal, whether the second terminal is authorized to be discovered, and verifying, according to the identity of the application using the discovered service in the second terminal, whether the application is authorized to use a discovered function; and if a verification result is that the second terminal is authorized to be discovered and that the application is authorized to use the discovered function, executing, by the server, the step of sending the sixth request to the management entity.

An embodiment of the present invention provides a terminal discovery method, comprising receiving, by a server, a fifth request sent by a second terminal; and sending, by the server, a sixth request to a management entity, so that the management entity sends a fourth request to a base station; wherein the fifth request is used to request to acquire a discovered resource, the fourth request is used to request the base station to allocate and send the discovered resource to the second terminal, and the discovered resource is a resource used when the second terminal sends a second message.

In a first development of the terminal discovery method according to the embodiment, the fifth request comprises a GUTI of the second terminal; and the sending, by the server, a sixth request to a management entity comprises sending, by the server, the sixth request to the management entity according to the GUTI.

An embodiment of the present invention provides a terminal discovery method, comprising providing, by a base station, a discovery resource for a first terminal, so that the first terminal monitors, according to the discovery resource, a second message sent by at least one second terminal.

In a first development of the terminal discovery method according to the embodiment, the providing, by a base station, a discovery resource for a first terminal comprises receiving, by the base station, a second request sent by a management entity; acquiring, by the base station, the discovery resource; and sending, by the base station, the discovery resource to the first terminal; or sending, by the base station, the discovery resource to the management entity, so that the management entity sends the discovery resource to the first terminal.

In a second development of the terminal discovery method according to the embodiment, the receiving, by the base station, a second request sent by a management entity comprises receiving, by the base station, an S1-AP message sent by the management entity, wherein the S1-AP message comprises a first indication, wherein the first indication is used to instruct the base station to send the discovery resource to the first terminal or used to instruct the base station to acquire the discovery resource and send the discovery resource to the first terminal; and the sending, by the base station, the discovery resource to the first terminal comprises sending, by the base station, the discovery resource to the first terminal by using an RRC message.

In a third development of the terminal discovery method according to the embodiment, the receiving, by the base station, a second request sent by a management entity comprises receiving, by the base station, an S1-AP message sent by the management entity, wherein the S1-AP message comprises a second indication, wherein the second indication is used to instruct the base station to send the discovery resource to the management entity or used to instruct the base station to acquire the discovery resource and send the discovery resource to the management entity; and the sending, by the base station, the discovery resource to the management entity, so that the management entity sends the discovery resource to the first terminal comprises sending, by the base station, the discovery resource to the management entity by using a container, so that the management entity sends the discovery resource to the first terminal by using an NAS message.

In a fourth development of the terminal discovery method according to the embodiment, the providing, by a base station, a discovery resource for a first terminal comprises acquiring, by the base station, the discovery resource; and sending, by the base station, system information comprising the discovery resource in a cell in which the first terminal is located.

In a fifth development of the terminal discovery method according to the embodiment, the acquiring, by the base station, the discovery resource comprises locally querying, by the base station, a discovery resource of a current serving cell of the first terminal; or locally querying, by the base station, a discovery resource of a current serving cell of the first terminal and a discovery resource of a cell adjacent to the serving cell; or locally querying, by the base station, a discovery resource of a current serving cell of the first terminal, and querying, from a neighboring base station through an X2 interface, a discovery resource of a cell adjacent to the serving cell.

In a sixth development of the terminal discovery method according to the embodiment, the method further comprises receiving, by the base station, a fourth request sent by a management entity; allocating, by the base station, a discovered resource to the second terminal according to the fourth request, wherein the discovered resource is a resource used when the second terminal sends the second message; and sending, by the base station, the discovered resource to the second terminal; or sending, by the base station, the discovered resource to the management entity, so that the management entity sends the discovered resource to the second terminal.

In a seventh development of the terminal discovery method according to the embodiment, the receiving, by the base station, a fourth request sent by a management entity comprises receiving, by the base station, an S1-AP message sent by the management entity, wherein the S1-AP message comprises a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal; and the sending, by the base station, the discovered resource to the second terminal comprises sending, by the base station, the discovered resource to the second terminal by using an RRC message.

In an eighth development of the terminal discovery method according to the embodiment, the receiving, by the base station, a fourth request sent by a management entity comprises receiving, by the base station, an S1-AP message sent by the management entity, wherein the S1-AP message comprises a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; and the sending, by the base station, the discovered resource to the management entity, so that the management entity sends the discovered resource to the second terminal comprises sending, by the base station, the discovered resource to the management entity by using a container, so that the management entity sends the discovered resource to the second terminal by using an NAS message.

An embodiment of the present invention provides a terminal discovery method, comprising receiving, by a base station, a fourth request sent by a management entity; allocating, by the base station, a discovered resource to a second terminal according to the fourth request, wherein the discovered resource is a resource used when the second terminal sends a second message; and sending, by the base station, the discovered resource to the second terminal; or sending, by the base station, the discovered resource to the management entity, so that the management entity sends the discovered resource to the second terminal.

In a first development of the terminal discovery method according to the embodiment, the receiving, by a base station, a fourth request sent by a management entity comprises receiving, by the base station, an S1-AP message sent by the management entity, wherein the S1-AP message comprises a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal; and the sending, by the base station, the discovered resource to the second terminal comprises sending, by the base station, the discovered resource to the second terminal by using an RRC message.

In a second development of the terminal discovery method according to the embodiment, the receiving, by a base station, a fourth request sent by a management entity comprises receiving, by the base station, an S1-AP message sent by the management entity, wherein the S1-AP message comprises a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; and the sending, by the base station, the discovered resource to the management entity, so that the management entity sends the discovered resource to the second terminal comprises sending, by the base station, the discovered resource to the management entity by using a container, so that the management entity sends the discovered resource to the second terminal by using an NAS message.

An embodiment of the present invention provides a terminal discovery method, comprising receiving, by a management entity, a service identity of a second terminal sent by a first terminal, wherein the service identity of the second terminal is acquired by the first terminal according to a second message that is sent by the at least one second terminal and that comprises the service identity of the second terminal; and sending, by the management entity, the service identity of the second terminal to a server, so that the server acquires description information of the second terminal according to the service identity of the second terminal and sends the description information of the second terminal to the first terminal; or sending, by the management entity, the service identity of the second terminal to the server, receiving description information of the second terminal sent by the server, and sending the description information of the second terminal to the first terminal, wherein the description information of the second terminal is acquired by the server according to the service identity of the second terminal.

In a first development of the terminal discovery method according to the embodiment, before the receiving, by a management entity, a service identity of a second terminal sent by a first terminal, the method further comprises receiving, by the management entity, a first request sent by the first terminal; and sending, by the management entity, a second request to a base station, so that the base station sends a discovery resource to the first terminal according to the second request; or sending, by the management entity, a second request to a base station, and receiving a discovery resource that is sent by the base station according to the second request, and sending the discovery resource to the first terminal; wherein the discovery resource is a resource used when the first terminal monitors the second message.

In a second development of the terminal discovery method according to the embodiment, the sending, by the management entity, a second request to a base station, so that the base station sends a discovery resource to the first terminal according to the second request comprises sending, by the management entity, an S1-AP message to the base station, wherein the S1-AP message comprises a first indication, wherein the first indication is used to instruct the base station to send the discovery resource to the first terminal or used to instruct the base station to acquire the discovery resource and send the discovery resource to the first terminal, so that the base station sends the discovery resource to the first terminal by using an RRC message.

In a third development of the terminal discovery method according to the embodiment, the sending, by the management entity, a second request to a base station, and receiving a discovery resource that is sent by the base station according to the second request, and sending the discovery resource to the first terminal, comprise sending, by the management entity, an S1-AP message to the base station, wherein the S1-AP message comprises a second indication, wherein the second indication is used to instruct the base station to send the discovery resource to the management entity or used to instruct the base station to acquire the discovery resource and send the discovery resource to the management entity; receiving, by the management entity, the discovery resource that is sent by the base station by using a container; and sending, by the management entity, the discovery resource to the first terminal by using an NAS message.

In a fourth development of the terminal discovery method according to the embodiment, the first request comprises an identity of the first terminal, and before the sending, by the management entity, a second request to a base station, the method further comprises sending, by the management entity, the identity of the first terminal to the server, so that the server verifies, according to the identity of the first terminal, whether the first terminal is authorized to discover the second terminal; and receiving, by the management entity, an indication fed back by the server and indicating that the first terminal is authorized to discover the second terminal; the sending, by the management entity, a second request to a base station comprises sending, by the management entity, the second request to the base station after receiving the indication fed back by the server and indicating that the first terminal is authorized to discover the second terminal.

In a fifth development of the terminal discovery method according to the embodiment, the first request comprises an identity of the first terminal and an identity of an application using a discovery service in the first terminal, and before the sending, by the management entity, a second request to a base station, the method further comprises sending, by the management entity, the identity of the first terminal and the identity of the application using the discovery service in the first terminal to the server, so that the server verifies, according to the identity of the first terminal and the identity of the application using the discovery service in the first terminal, whether the first terminal is authorized to discover the second terminal and whether the application is authorized to use a discovery function; and receiving, by the management entity, an indication fed back by the server and indicating that the first terminal is authorized to discover the second terminal and that the application is authorized to use the discovery function; the sending, by the management entity, a second request to a base station comprises sending, by the management entity, the second request to the base station after receiving the indication fed back by the server and indicating that the first terminal is authorized to discover the second terminal and that the application is authorized to use the discovery function.

In a sixth development of the terminal discovery method according to the embodiment, before the receiving, by a management entity, a service identity of a second terminal sent by a first terminal, the method further comprises receiving, by the management entity, a third request sent by the second terminal; or receiving, by the management entity, a sixth request sent by the server; and sending, by the management entity, a fourth request to a base station, so that the base station allocates and sends a discovered resource to the second terminal according to the fourth request; or sending, by the management entity, a fourth request to a base station, and receiving a discovered resource that is allocated and sent by the base station according to the fourth request, and sending the discovered resource to the second terminal; wherein the discovered resource is a resource used when the second terminal sends the second message.

In a seventh development of the terminal discovery method according to the embodiment, the sending, by the management entity, a fourth request to a base station, so that the base station allocates and sends a discovered resource to the second terminal according to the fourth request comprises sending, by the management entity, an S1-AP message to the base station, wherein the S1-AP message comprises a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal, so that the base station sends the discovered resource to the second terminal by using an RRC message.

In an eighth development of the terminal discovery method according to the embodiment, the sending, by the management entity, a fourth request to the base station, and receiving a discovered resource that is allocated and sent by the base station according to the fourth request, and sending the discovered resource to the second terminal, comprise sending, by the management entity, an S1-AP message to the base station, wherein the S1-AP message comprises a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; receiving, by the management entity, the discovered resource that is sent by the base station by using a container; and sending, by the management entity, the discovered resource to the second terminal by using an NAS message.

In a ninth development of the terminal discovery method according to the embodiment, the third request comprises an identity of the second terminal, and before the sending, by the management entity, a fourth request to a base station, the method further comprises sending, by the management entity, the identity of the second terminal to the server, so that the server verifies, according to the identity of the second terminal, whether the second terminal is authorized to be discovered; and receiving, by the management entity, an indication fed back by the server and indicating that the second terminal is authorized to be discovered; wherein the sending, by the management entity, a fourth request to a base station comprises sending, by the management entity, the fourth request to the base station after receiving the indication fed back by the server and indicating that the second terminal is authorized to be discovered.

In a tenth development of the terminal discovery method according to the embodiment, the third request comprises an identity of the second terminal and an identity of an application using a discovered service in the second terminal, and before the sending, by the management entity, a fourth request to a base station, the method further comprises sending, by the management entity, the identity of the second terminal and the identity of the application using the discovered service in the second terminal to the server, so that the server verifies, according to the identity of the second terminal and the identity of the application using the discovered service in the second terminal, whether the second terminal is authorized to be discovered and whether the application is authorized to use a discovered function; and receiving, by the management entity, an indication fed back by the server and indicating that the second terminal is authorized to be discovered and that the application is authorized to use the discovered function; wherein the sending, by the management entity, a fourth request to a base station comprises sending, by the management entity, the fourth request to the base station after receiving the indication fed back by the server and indicating that the second terminal is authorized to be discovered and that the application is authorized to use the discovered function.

In an eleventh development of the terminal discovery method according to the embodiment, the method further comprises receiving, by the management entity, a service identity of the first terminal sent by the first terminal; and sending, by the management entity, the service identity of the first terminal to the server, so that the server acquires the description information of the second terminal according to the service identity of the second terminal after the server verifies, according to the service identity of the first terminal, that the first terminal is authorized to discover the second terminal.

An embodiment of the present invention provides a terminal discovery method, comprising receiving, by a management entity, a third request sent by a second terminal; or receiving, by a management entity, a sixth request sent by a server; and sending, by the management entity, a fourth request to a base station, so that the base station allocates and sends a discovered resource to the second terminal according to the fourth request; or sending, by the management entity, a fourth request to a base station, and receiving a discovered resource that is allocated and sent by the base station according to the fourth request, and sending the discovered resource to the second terminal; wherein the discovered resource is a resource used when the second terminal sends a second message.

In a first development of the terminal discovery method according to the embodiment, the sending, by the management entity, a fourth request to a base station, so that the base station allocates and sends a discovered resource to the second terminal according to the fourth request comprises sending, by the management entity, an S1-AP message to the base station, wherein the S1-AP message comprises a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal, so that the base station sends the discovered resource to the second terminal by using an RRC message.

In a second development of the terminal discovery method according to the embodiment, the sending, by the management entity, a fourth request to the base station, and receiving a discovered resource that is allocated and sent by the base station according to the fourth request, and sending the discovered resource to the second terminal, comprise sending, by the management entity, an S1-AP message to the base station, wherein the S1-AP message comprises a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; receiving, by the management entity, the discovered resource that is sent by the base station by using a container; and sending, by the management entity, the discovered resource to the second terminal by using an NAS message.

An embodiment of the present invention provides a first terminal, comprising a discovery resource acquiring module configured to acquire a discovery resource; a message monitoring module configured to monitor, according to the discovery resource acquired by the discovery resource acquiring module, a second message sent by at least one second terminal, wherein the second message comprises a service identity of the second terminal; a service identity acquiring module configured to acquire the service identity of the second terminal according to the second message monitored by the message monitoring module; and a description information acquiring module configured to acquire description information of the second terminal from a server according to the service identity of the second terminal acquired by the service identity acquiring module.

In a first development of the first terminal according to the embodiment, the description information acquiring module comprises a first identity sending unit configured to send the service identity of the second terminal to the server; a second identity sending unit configured to send the service identity of the second terminal to a management entity, so that the management entity sends the service identity of the second terminal to the server; a first information receiving unit configured to receive the description information of the second terminal sent by the server, wherein the description information of the second terminal is information that is acquired and sent by the server according to the service identity of the second terminal; and a second information receiving unit configured to receive the description information of the second terminal sent by the management entity, wherein the description information of the second terminal is information that is acquired by the server according to the service identity of the second terminal and sent to the management entity.

In a second development of the first terminal according to the embodiment, the first terminal further comprises a first identity sending module configured to send a service identity of the first terminal to the server before the first information receiving unit receives the description information of the second terminal sent by the server or before the second information receiving unit receives the description information of the second terminal sent by the management entity, so that the server acquires the description information of the second terminal according to the service identity of the second terminal after the server verifies, according to the service identity of the first terminal, that the first terminal is authorized to discover the second terminal; and a second identity sending module configured to send the service identity of the first terminal to the management entity before the first information receiving unit receives the description information of the second terminal sent by the server or before the second information receiving unit receives the description information of the second terminal sent by the management entity, so that the management entity sends the service identity of the first terminal to the server, and the server acquires the description information of the second terminal according to the service identity of the second terminal after the server verifies, according to the service identity of the first terminal, that the first terminal is authorized to discover the second terminal.

In a third development of the first terminal according to the embodiment, the discovery resource acquiring module comprises a first request sending unit configured to send a first request to a management entity, so that the management entity sends a second request to a base station; a first discovery resource receiving unit configured to receive the discovery resource that is sent by the base station according to the second request; and a second discovery resource receiving unit configured to receive the discovery resource that is sent by the management entity, wherein the discovery resource is a discovery resource that is sent by the base station to the management entity according to the second request; wherein the discovery resource comprises a discovery resource of a serving cell of the first terminal; or the discovery resource comprises a discovery resource of a serving cell of the first terminal and a discovery resource of a cell adjacent to the serving cell.

In a fourth development of the first terminal according to the embodiment, the first discovery resource receiving unit is configured to receive the discovery resource that is sent by the base station by using an RRC message, wherein the discovery resource is the discovery resource that the base station sends after receiving the second request; wherein the second request is an S1-AP message comprising a first indication, wherein the first indication is used to instruct the base station to send the discovery resource to the first terminal or used to instruct the base station to acquire the discovery resource and send the discovery resource to the first terminal.

In a fifth development of the first terminal according to the embodiment, the second discovery resource receiving unit is configured to receive the discovery resource that is sent by the management entity by using an NAS message, wherein the discovery resource is the discovery resource that the base station sends to the management entity by using a container after receiving the second request; wherein the second request is an S1-AP message comprising a second indication, wherein the second indication is used to instruct the base station to send the discovery resource to the management entity or used to instruct the base station to acquire the discovery resource and send the discovery resource to the management entity.

In a sixth development of the first terminal according to the embodiment, the first request sending unit is configured to send the first request comprising an identity of the first terminal to the management entity, so that the management entity sends the identity of the first terminal to the server and when the server verifies, according to the identity of the first terminal, that the first terminal is authorized to discover the second terminal, sends the second request to the base station.

In a seventh development of the first terminal according to the embodiment, the first request sending unit is configured to send the first request comprising an identity of the first terminal and an identity of an application using a discovery service in the first terminal to the management entity, so that the management entity sends the identity of the first terminal and the identity of the application using the discovery service in the first terminal to the server and when the server verifies, according to the identity of the first terminal and the identity of the application using the discovery service in the first terminal, that the first terminal is authorized to discover the second terminal and that the application is authorized to use a discovery function, sends the second request to the base station.

In an eighth development of the first terminal according to the embodiment, the discovery resource acquiring module comprises a system information receiving unit configured to receive system information sent by a base station; and a discovery resource resolving unit configured to resolve the discovery resource comprised in the system information that is received by the system information receiving unit; wherein the discovery resource comprises a discovery resource of a serving cell of the first terminal; or the discovery resource comprises a discovery resource of a serving cell of the first terminal and a discovery resource of a cell adjacent to the serving cell.

In a ninth development of the first terminal according to the embodiment, the service identity acquiring module is configured to determine that the service identity in the second message and compliant with a predetermined condition is the service identity of the second terminal; wherein the predetermined condition comprises at least one of the following conditions: a signal strength of the second message is greater than or equal to a predetermined strength threshold; or a type of the second terminal comprised in the second message complies with a predetermined type; or an application description comprised in the second message complies with a predetermined application description.

In a tenth development of the first terminal according to the embodiment, the first terminal further comprises a first message sending module configured to send a first message before the message monitoring module monitors, according to the discovery resource, the second message sent by the at least one second terminal, so that the second terminal sends the second message according to the first message after receiving the first message.

An embodiment of the present invention provides a second terminal, comprising a second message sending module configured to send a second message comprising a service identity of the second terminal, so that a first terminal acquires the service identity of the second terminal according to the second message and acquires description information of the second terminal from a server according to the service identity of the second terminal.

In a first development of the second terminal according to the embodiment, the second terminal further comprises a first request sending module configured to send a third request to a management entity before the second message sending module sends the second message comprising the service identity of the second terminal, so that the management entity sends a fourth request to a base station; a second request sending module configured to send a fifth request to the server before the second message sending module sends the second message comprising the service identity of the second terminal, so that the server sends a sixth request to a management entity, and the management entity sends a fourth request to a base station; a first discovered resource receiving module configured to receive a discovered resource sent by the base station, wherein the discovered resource is a resource that is allocated by the base station according to the fourth request; and a second discovered resource receiving module configured to receive a discovered resource that is sent by the base station to the management entity and sent by the management entity to the second terminal, wherein the discovered resource is the resource that is allocated by the base station according to the fourth request; wherein the second message sending module is configured to send, according to the discovered resource received by the first discovered resource receiving module or the second discovered resource receiving module, the second message comprising the service identity.

In a second development of the second terminal according to the embodiment, the first discovered resource receiving module is configured to receive the discovered resource that is sent by the base station by using an RRC message, wherein the discovered resource is the resource that the base station allocates after receiving the fourth request; wherein the fourth request is an S1-AP message comprising a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal.

In a third development of the second terminal according to the embodiment, the second discovered resource receiving module is configured to receive the discovered resource that is sent by the management entity by using an NAS message, wherein the discovered resource is the discovered resource that the base station sends to the management entity by using a container after receiving the fourth request; wherein the fourth request is an S1-AP message comprising a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity.

In a fourth development of the second terminal according to the embodiment, the first request sending module is configured to send the third request comprising an identity of the second terminal to the management entity, so that the management entity sends the identity of the second terminal to the server and when the server verifies, according to the identity of the second terminal, that the second terminal is authorized to be discovered, sends the fourth request to the base station.

In a fifth development of the second terminal according to the embodiment, the first request sending module is configured to send the third request comprising an identity of the second terminal and an identity of an application using a discovered service in the second terminal to the management entity, so that the management entity sends the identity of the second terminal and the identity of the application using the discovered service in the second terminal to the server and when the server verifies, according to the identity of the second terminal and the identity of the application using the discovered service in the second terminal, that the second terminal is authorized to be discovered and that the application is authorized to use a discovered function, sends the fourth request to the base station.

In a sixth development of the second terminal according to the embodiment, the second request sending module is configured to send the fifth request comprising an identity of the second terminal to the server, so that the server sends the sixth request to the management entity when the server verifies, according to the identity of the second terminal, that the second terminal is authorized to be discovered.

In a seventh development of the second terminal according to the embodiment, the second request sending module is configured to send the fifth request comprising an identity of the second terminal and an identity of an application using a discovered service in the second terminal to the server, so that the server sends the sixth request to the management entity when the server verifies, according to the identity of the second terminal, that the second terminal is authorized to be discovered and that the application is authorized to use a discovered function.

In an eighth development of the second terminal according to the embodiment, the second request sending module is configured to send the fifth request comprising a GUTI of the second terminal to the server, so that the server sends the sixth request to the management entity according to the GUTI.

In a ninth development of the second terminal according to the embodiment, the second message sending module comprises a first message sending unit configured to send the second message immediately after the first discovered resource receiving module or the second discovered resource receiving module receives the discovered resource; a first message receiving unit configured to receive a first message sent by the first terminal; and a second message sending unit configured to send the second message according to the first message received by the first message receiving unit.

An embodiment of the present invention provides a second terminal, comprising a first request sending module configured to send a third request to a management entity, so that the management entity sends a fourth request to a base station; a second request sending module configured to send a fifth request to a server, so that the server sends a sixth request to a management entity, and the management entity sends a fourth request to a base station; a first discovered resource receiving module configured to receive a discovered resource sent by the base station, wherein the discovered resource is a resource that is allocated by the base station according to the fourth request; and a second discovered resource receiving module configured to receive a discovered resource that is sent by the base station to the management entity and sent by the management entity to the second terminal, wherein the discovered resource is the resource that is allocated by the base station according to the fourth request.

In a first development of the second terminal according to the embodiment, the first discovered resource receiving module is configured to receive the discovered resource that is sent by the base station by using an RRC message, wherein the discovered resource is the resource that the base station allocates after receiving the fourth request; wherein the fourth request is an S1-AP message comprising a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal.

In a second development of the second terminal according to the embodiment, the second discovered resource receiving module is configured to receive the discovered resource that is sent by the management entity by using an NAS message, wherein the discovered resource is the discovered resource that the base station sends to the management entity by using a container after receiving the fourth request; wherein the fourth request is an S1-AP message comprising a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity.

In a third development of the second terminal according to the embodiment, the second request sending module is configured to send the fifth request comprising a GUTI of the second terminal to the server, so that the server sends the sixth request to the management entity according to the GUTI.

An embodiment of the present invention provides a server, comprising a first identity receiving module configured to receive a service identity of a second terminal sent by a first terminal, wherein the service identity of the second terminal is acquired by the first terminal according to a second message that is sent by the at least one second terminal and that comprises the service identity of the second terminal; an information acquiring module configured to acquire description information of the second terminal according to the service identity of the second terminal received by the first identity receiving module; and an information providing module configured to provide the description information of the second terminal acquired by the information acquiring module for the first terminal.

In a first development of the server according to the embodiment, the first identity receiving module comprises a first identity receiving unit configured to receive the service identity of the second terminal sent by the first terminal; and a second identity receiving unit configured to receive the service identity of the second terminal sent by a management entity, wherein the service identity of the second terminal is a service identity sent by the first terminal to the management entity.

In a second development of the server according to the embodiment, the information acquiring module comprises a first querying unit configured to locally query the description information of the second terminal corresponding to the service identity of the second terminal; and a second querying unit configured to acquire, according to the service identity of the second terminal, the description information of the second terminal from a home server of the second terminal or a server that currently services the second terminal.

In a third development of the server according to the embodiment, the information providing module comprises a first information sending unit configured to send the description information of the second terminal acquired by the information acquiring module to the first terminal; and a second information sending unit configured to send the description information of the second terminal acquired by the information acquiring module to a management entity, so that the management entity sends the description information of the second terminal to the first terminal.

In a fourth development of the server according to the embodiment, the server further comprises a second identity receiving module configured to receive, before the information acquiring module acquires the description information of the second terminal corresponding to the service identity of the second terminal, a service identity of the first terminal sent by the first terminal; a third identity receiving module configured to receive, before the information acquiring module acquires the description information of the second terminal corresponding to the service identity of the second terminal, the service identity of the first terminal sent by a management entity, wherein the service identity of the first terminal is sent by the first terminal to the management entity; and a first verifying module configured to verify, according to the service identity of the first terminal received by the second identity receiving module or the third identity receiving module, whether the first terminal is authorized to discover the second terminal; wherein the information acquiring module is configured to execute, if a verification result of the first verifying module is that the first terminal is authorized to discover the second terminal, the step of acquiring the description information of the second terminal according to the service identity of the second terminal.

In a fifth development of the server according to the embodiment, the server further comprises a fourth identity receiving module configured to receive, before the first identity receiving module receives the service identity of the second terminal sent by the first terminal, an identity of the first terminal sent by a management entity, wherein the identity of the first terminal is an identity comprised in a first request that is sent by the first terminal to the management entity; a second verifying module configured to verify, according to the identity of the first terminal, whether the first terminal is authorized to discover the second terminal; and a first indication feedback module configured to feed back, if a verification result of the second verifying module is that the first terminal is authorized to discover the second terminal, an indication indicating that the first terminal is authorized to discover the second terminal, to the management entity, so that the management entity sends a second request to a base station after receiving the indication; wherein the first request is used to request to acquire a discovery resource, the second request is used to request the base station to acquire the discovery resource and send the discovery resource to the first terminal, and the discovery resource is a resource used when the first terminal monitors the second message.

In a sixth development of the server according to the embodiment, the server further comprises a fifth identity receiving module configured to receive, before the first identity receiving module receives the service identity of the second terminal sent by the first terminal, an identity of the first terminal and an identity of an application using a discovery service in the first terminal that are sent by a management entity, wherein the identity of the first terminal and the identity of the application using the discovery service in the first terminal are identities comprised in a first request that is sent by the first terminal to the management entity; a third verifying module configured to verify, according to the identity of the first terminal, whether the first terminal is authorized to discover the second terminal; a fourth verifying module configured to verify, according to the identity of the application using the discovery service in the first terminal, whether the application is authorized to use a discovery function; and a second indication feedback module configured to feed back, if a verification result of the third verifying module is that the first terminal is authorized to discover the second terminal and a verification result of the fourth verifying module is that the application is authorized to use the discovery function, an indication indicating that the first terminal is authorized to discover the second terminal and that the application is authorized to use the discovery function, to the management entity, so that the management entity sends a second request to a base station after receiving the indication; wherein the first request is used to request to acquire a discovery resource, the second request is used to request the base station to acquire the discovery resource and send the discovery resource to the first terminal, and the discovery resource is a resource used when the first terminal monitors the second message.

In a seventh development of the server according to the embodiment, the server further comprises a sixth identity receiving module configured to receive, before the first identity receiving module receives the service identity of the second terminal sent by the first terminal, an identity of the second terminal sent by a management entity, wherein the identity of the second terminal is an identity comprised in a third request that is sent by the second terminal to the management entity; a fifth verifying module configured to verify, according to the identity of the second terminal, whether the second terminal is authorized to be discovered; and a third indication feedback module configured to feed back, if a verification result of the fifth verifying module is that the second terminal is authorized to be discovered, an indication indicating that the second terminal is authorized to be discovered, to the management entity, so that the management entity sends a fourth request to a base station after receiving the indication; wherein the third request is used to request to acquire a discovered resource, the fourth request is used to request the base station to allocate and send the discovered resource to the second terminal, and the discovered resource is a resource used when the second terminal sends the second message.

In an eighth development of the server according to the embodiment, the server further comprises a seventh identity receiving module configured to receive, before the first identity receiving module receives the service identity of the second terminal sent by the first terminal, an identity of the second terminal and an identity of an application using a discovered service in the second terminal that are sent by a management entity, wherein the identity of the second terminal and the identity of the application using the discovered service in the second terminal are identities comprised in a third request that is sent by the second terminal to the management entity; a sixth verifying module configured to verify, according to the identity of the second terminal, whether the second terminal is authorized to be discovered; a seventh verifying module configured to verify, according to the identity of the application using the discovered service in the second terminal, whether the application is authorized to use a discovered function; and a fourth indication feedback module configured to feed back, if a verification result of the sixth verifying module is that the second terminal is authorized to be discovered and a verification result of the seventh verifying module is that the application is authorized to use the discovered function, an indication indicating that the second terminal is authorized to be discovered and that the application is authorized to use the discovered function, to the management entity, so that the management entity sends a fourth request to a base station after receiving the indication; wherein the third request is used to request to acquire a discovered resource, the fourth request is used to request the base station to allocate and send the discovered resource to the second terminal, and the discovered resource is a resource used when the second terminal sends the second message.

In a ninth development of the server according to the embodiment, the server further comprises a first request receiving module configured to receive, before the first identity receiving module receives the service identity of the second terminal sent by the first terminal, a fifth request sent by the second terminal; and a third request sending module configured to send a sixth request to a management entity, so that the management entity sends a fourth request to a base station; wherein the fifth request is used to request to acquire a discovered resource, the fourth request is used to request the base station to allocate and send the discovered resource to the second terminal, and the discovered resource is a resource used when the second terminal sends the second message.

In a tenth development of the server according to the embodiment, the fifth request comprises a GUTI of the second terminal; and the third request sending module is configured to send the sixth request to the management entity according to the GUTI.

In an eleventh development of the server according to the embodiment, the fifth request comprises an identity of the second terminal, and the server further comprises an eighth verifying module configured to verify, according to the identity of the second terminal before the third request sending module sends the sixth request to the management entity, whether the second terminal is authorized to be discovered; wherein the third request sending module is configured to execute, if a verification result of the eighth verifying module is that the second terminal is authorized to be discovered, the step of sending the sixth request to the management entity.

In a twelfth development of the server according to the embodiment, the fifth request comprises an identity of the second terminal and an identity of an application using a discovered service in the second terminal, and the server further comprises a ninth verifying module configured to verify, according to the identity of the second terminal before the third request sending module sends the sixth request to the management entity, whether the second terminal is authorized to be discovered; and a tenth verifying module configured to verify, according to the identity of the application using the discovered service in the second terminal, before the third request sending module sends the sixth request to the management entity, whether the application is authorized to use a discovered function; wherein the third request sending module is configured to execute, if a verification result of the ninth verifying module is that the second terminal is authorized to be discovered and a verification result of the tenth verifying module is that the application is authorized to use the discovered function, the step of sending the sixth request to the management entity.

An embodiment of the present invention provides a server, comprising a first request receiving module configured to receive a fifth request sent by a second terminal; and a third request sending module configured to send a sixth request to a management entity, so that the management entity sends a fourth request to a base station; wherein the fifth request is used to request to acquire a discovered resource, the fourth request is used to request the base station to allocate and send the discovered resource to the second terminal, and the discovered resource is a resource used when the second terminal sends a second message.

In a first development of the server according to the embodiment, the fifth request comprises a GUTI of the second terminal; and the third request sending module is configured to send the sixth request to the management entity according to the GUTI.

An embodiment of the present invention provides a base station, comprising a discovery resource providing module configured to provide a discovery resource for a first terminal, so that the first terminal monitors, according to the discovery resource, a second message sent by at least one second terminal.

In a first development of the base station according to the embodiment, the discovery resource providing module comprises a first request receiving unit configured to receive a second request sent by a management entity; a first acquiring unit configured to acquire the discovery resource; a first discovery resource sending unit configured to send the discovery resource acquired by the first acquiring unit to the first terminal; and a second discovery resource sending unit configured to send the discovery resource acquired by the first acquiring unit to the management entity, so that the management entity sends the discovery resource to the first terminal.

In a second development of the base station according to the embodiment, the first request receiving unit is configured to receive an S1-AP message sent by the management entity, wherein the S1-AP message comprises a first indication, wherein the first indication is used to instruct the base station to send the discovery resource to the first terminal or used to instruct the base station to acquire the discovery resource and send the discovery resource to the first terminal; and the first discovery resource sending unit is configured to send the discovery resource to the first terminal by using an RRC message.

In a third development of the base station according to the embodiment, the first request receiving unit is configured to receive an S1-AP message sent by the management entity, wherein the S1-AP message comprises a second indication, wherein the second indication is used to instruct the base station to send the discovery resource to the management entity or used to instruct the base station to acquire the discovery resource and send the discovery resource to the management entity; and the second discovery resource sending unit is configured to send the discovery resource to the management entity by using a container, so that the management entity sends the discovery resource to the first terminal by using an NAS message.

In a fourth development of the base station according to the embodiment, the discovery resource providing module comprises a second acquiring unit configured to acquire the discovery resource; and a system information sending unit configured to send, in a cell in which the first terminal is located, system information comprising the discovery resource acquired by the second acquiring unit.

In a fifth development of the base station according to the embodiment, the first acquiring unit comprises a first querying subunit configured to locally query a discovery resource of a current serving cell of the first terminal; a second querying subunit configured to locally query the discovery resource of the current serving cell of the first terminal and a discovery resource of a cell adjacent to the serving cell; and a third querying subunit configured to locally query the discovery resource of the current serving cell of the first terminal, and query, from a neighboring base station through an X2 interface, the discovery resource of the cell adjacent to the serving cell; the second acquiring unit comprises a fourth querying subunit configured to locally query the discovery resource of the current serving cell of the first terminal; a fifth querying subunit configured to locally query the discovery resource of the current serving cell of the first terminal and the discovery resource of the cell adjacent to the serving cell; and a sixth querying subunit configured to locally query the discovery resource of the current serving cell of the first terminal, and query, from the neighboring base station through the X2 interface, the discovery resource of the cell adjacent to the serving cell.

In a sixth development of the base station according to the embodiment, the base station further comprises a second request receiving module configured to receive a fourth request sent by a management entity, wherein the fourth request is sent after the management entity receives a third request sent by the second terminal; a discovered resource allocating module configured to allocate a discovered resource to the second terminal according to the fourth request received by the second request receiving module, wherein the discovered resource is a resource used when the second terminal sends the second message; a first discovered resource sending module configured to send the discovered resource allocated by the discovered resource allocating module, to the second terminal; and a second discovered resource sending module configured to send the discovered resource allocated by the discovered resource allocating module, to the management entity, so that the management entity sends the discovered resource to the second terminal.

In a seventh development of the base station according to the embodiment, the second request receiving module is configured to receive an S1-AP message sent by the management entity, wherein the S1-AP message comprises a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal; and the first discovered resource sending module is configured to send the discovered resource to the second terminal by using an RRC message.

In an eighth development of the base station according to the embodiment, the second request receiving module is configured to receive an S1-AP message sent by the management entity, wherein the S1-AP message comprises a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; and the second discovered resource sending module is configured to send the discovered resource to the management entity by using a container, so that the management entity sends the discovered resource to the second terminal by using an NAS message.

An embodiment of the present invention provides a base station, comprising a second request receiving module configured to receive a fourth request sent by a management entity; a discovered resource allocating module configured to allocate a discovered resource to a second terminal according to the fourth request received by the second request receiving module, wherein the discovered resource is a resource used when the second terminal sends a second message; a first discovered resource sending module configured to send the discovered resource allocated by the discovered resource allocating module, to the second terminal; and a second discovered resource sending module configured to send the discovered resource allocated by the discovered resource allocating module, to the management entity, so that the management entity sends the discovered resource to the second terminal.

In a first development of the base station according to the embodiment, the second request receiving module is configured to receive an S1-AP message sent by the management entity, wherein the S1-AP message comprises a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal; and the first discovered resource sending module is configured to send the discovered resource to the second terminal by using an RRC message.

In a second development of the base station according to the embodiment, the second request receiving module is configured to receive an S1-AP message sent by the management entity, wherein the S1-AP message comprises a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; and the second discovered resource sending module is configured to send the discovered resource to the management entity by using a container, so that the management entity sends the discovered resource to the second terminal by using an NAS message.

An embodiment of the present invention provides a management entity, comprising an eighth identity receiving module configured to receive a service identity of a second terminal sent by a first terminal, wherein the service identity of the second terminal is acquired by the first terminal according to a second message that is sent by the at least one second terminal and that comprises the service identity of the second terminal; a third identity sending module configured to send the service identity of the second terminal received by the eighth identity receiving module to a server, so that the server acquires description information of the second terminal according to the service identity of the second terminal and sends the description information of the second terminal to the first terminal; a fourth identity sending module configured to send the service identity of the second terminal received by the eighth identity receiving module to the server; a third information receiving module configured to receive the description information of the second terminal sent by the server; and a third information sending module configured to send the description information of the second terminal to the first terminal, wherein the description information of the second terminal is acquired by the server according to the service identity of the second terminal sent by the fourth identity sending module.

In a first development of the management entity according to the embodiment, the management entity further comprises a third request receiving module configured to receive, before the eighth identity receiving module receives the service identity of the second terminal sent by the first terminal, a first request sent by the first terminal; a fourth request sending module configured to send a second request to a base station, so that the base station sends a discovery resource to the first terminal according to the second request; a fifth request sending module configured to send the second request to the base station; a discovery resource receiving module configured to receive a discovery resource that is sent by the base station according to the second request sent by the fifth request sending module; and a discovery resource sending module configured to send the discovery resource received by the discovery resource receiving module to the first terminal; wherein the discovery resource is a resource used when the first terminal monitors the second message.

In a second development of the management entity according to the embodiment, the fourth request sending module is configured to send an S1-AP message to the base station, wherein the S1-AP message comprises a first indication, wherein the first indication is used to instruct the base station to send the discovery resource to the first terminal or used to instruct the base station to acquire the discovery resource and send the discovery resource to the first terminal, so that the base station sends the discovery resource to the first terminal by using an RRC message.

In a third development of the management entity according to the embodiment, the fifth request sending module is configured to send an S1-AP message to the base station, wherein the S1-AP message comprises a second indication, wherein the second indication is used to instruct the base station to send the discovery resource to the management entity or used to instruct the base station to acquire the discovery resource and send the discovery resource to the management entity; the discovery resource receiving module is configured to receive the discovery resource that is sent by the base station by using a container; and the discovery resource sending module is configured to send the discovery resource to the first terminal by using an NAS message.

In a fourth development of the management entity according to the embodiment, the management entity further comprises a fifth identity sending module configured to send, before the fourth request sending module or the fifth request sending module sends the second request to the base station, an identity of the first terminal to the server, so that the server verifies, according to the identity of the first terminal, whether the first terminal is authorized to discover the second terminal; and a first indication receiving module configured to receive an indication fed back by the server and indicating that the first terminal is authorized to discover the second terminal; wherein the fourth request sending module is configured to send the second request to the base station after the first indication receiving module receives the indication fed back by the server and indicating that the first terminal is authorized to discover the second terminal; and the fifth request sending module is configured to send the second request to the base station after the first indication receiving module receives the indication fed back by the server and indicating that the first terminal is authorized to discover the second terminal; wherein the first request comprises the identity of the first terminal.

In a fifth development of the management entity according to the embodiment, the management entity further comprises a sixth identity sending module configured to send, before the fourth request sending module or the fifth request sending module sends the second request to the base station, an identity of the first terminal and an identity of an application using a discovery service in the first terminal to the server, so that the server verifies, according to the identity of the first terminal and the identity of the application using the discovery service in the first terminal, whether the first terminal is authorized to discover the second terminal and whether the application is authorized to use a discovery function; and a second indication receiving module configured to receive an indication fed back by the server and indicating that the first terminal is authorized to discover the second terminal and that the application is authorized to use the discovery function; wherein the fourth request sending module is configured to send the second request to the base station after the second indication receiving module receives the indication fed back by the server and indicating that the first terminal is authorized to discover the second terminal and that the application is authorized to use the discovery function; and the fifth request sending module is configured to send the second request to the base station after the second indication receiving module receives the indication fed back by the server and indicating that the first terminal is authorized to discover the second terminal and that the application is authorized to use the discovery function; wherein the first request comprises the identity of the first terminal and the identity of the application using the discovery service in the first terminal.

In a sixth development of the management entity according to the embodiment, the management entity further comprises a fourth request receiving module configured to receive, before the eighth identity receiving module receives the service identity of the second terminal sent by the first terminal, a third request sent by the second terminal; a fifth request receiving module configured to receive, before the eighth identity receiving module receives the identity of the second terminal sent by the first terminal, a sixth request sent by the server; a sixth request sending module configured to send a fourth request to a base station after the fourth request receiving module receives the third request or the fifth request receiving module receives the sixth request, so that the base station allocates and sends a discovered resource to the second terminal according to the fourth request; a seventh request sending module configured to send the fourth request to the base station after the fourth request receiving module receives the third request or the fifth request receiving module receives the sixth request; a third discovered resource receiving module configured to receive a discovered resource that is allocated and sent by the base station according to the fourth request sent by the seventh request sending module; and a third discovered resource sending module configured to send the discovered resource received by the third discovered resource receiving module to the second terminal; wherein the discovered resource is a resource used when the second terminal sends the second message.

In a seventh development of the management entity according to the embodiment, the sixth request sending module is configured to send an S1-AP message to the base station, wherein the S1-AP message comprises a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal, so that the base station sends the discovered resource to the second terminal by using an RRC message.

In an eighth development of the management entity according to the embodiment, the seventh request sending module is configured to send an S1-AP message to the base station, wherein the S1-AP message comprises a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; the third discovered resource receiving module is configured to receive the discovered resource that is sent by the base station by using a container; and the third discovered resource sending module is configured to send the discovered resource to the second terminal by using an NAS message.

In a ninth development of the management entity according to the embodiment, the management entity further comprises a seventh identity sending module configured to send, before the sixth request sending module or the seventh request sending module sends the fourth request to the base station, an identity of the second terminal to the server, so that the server verifies, according to the identity of the second terminal, whether the second terminal is authorized to be discovered; and a third indication receiving module configured to receive an indication fed back by the server and indicating that the second terminal is authorized to be discovered; wherein the sixth request sending module is configured to send the fourth request to the base station after the third indication receiving module receives the indication fed back by the server and indicating that the second terminal is authorized to be discovered; and the seventh request sending module is configured to send the fourth request to the base station after the third indication receiving module receives the indication fed back by the server and indicating that the second terminal is authorized to be discovered; wherein the third request comprises the identity of the second terminal.

In a tenth development of the management entity according to the embodiment, the management entity further comprises an eighth identity sending module configured to send, before the sixth request sending module or the seventh request sending module sends the fourth request to the base station, an identity of the second terminal and an identity of an application using a discovered service in the second terminal to the server, so that the server verifies, according to the identity of the second terminal and the identity of the application using the discovered service in the second terminal, whether the second terminal is authorized to be discovered and whether the application is authorized to use a discovered function; and a fourth indication receiving module configured to receive an indication fed back by the server and indicating that the second terminal is authorized to be discovered and that the application is authorized to use the discovered function; wherein the sixth request sending module is configured to send the fourth request to the base station after the fourth indication receiving module receives the indication fed back by the server and indicating that the second terminal is authorized to be discovered and that the application is authorized to use the discovered function; and the seventh request sending module is configured to send the fourth request to the base station after the fourth indication receiving module receives the indication fed back by the server and indicating that the second terminal is authorized to be discovered and that the application is authorized to use the discovered function; wherein the third request comprises the identity of the second terminal and the identity of the application using the discovered service in the second terminal.

In an eleventh development of the management entity according to the embodiment, the management entity further comprises a ninth identity receiving module configured to receive a service identity of the first terminal sent by the first terminal; and a ninth identity sending module configured to send the service identity of the first terminal received by the ninth identity receiving module to the server, so that the server acquires the description information of the second terminal according to the service identity of the second terminal after the server verifies, according to the service identity of the first terminal, that the first terminal is authorized to discover the second terminal.

An embodiment of the present invention provides a management entity, comprising a fourth request receiving module configured to receive a third request sent by a second terminal; a fifth request receiving module configured to receive a sixth request sent by a server; a sixth request sending module configured to send a fourth request to a base station according to the third request or the sixth request, so that the base station allocates and sends a discovered resource to the second terminal according to the fourth request; a seventh request sending module configured to send the fourth request to the base station according to the third request or the sixth request; a third discovered resource receiving module configured to receive a discovered resource that is allocated and sent by the base station according to the fourth request sent by the seventh request sending module; and a third discovered resource sending module configured to send the discovered resource received by the third discovered resource receiving module to the second terminal; wherein the discovered resource is a resource used when the second terminal sends a second message.

In a first development of the management entity according to the embodiment, the sixth request sending module is configured to send an S1-AP message to the base station, wherein the S1-AP message comprises a third indication, wherein the third indication is used to instruct the base station to allocate the discovered resource, or the third indication is used to instruct the base station to allocate the discovered resource to the second terminal, or the third indication is used to instruct the base station to allocate the discovered resource and send the discovered resource to the second terminal, or the third indication is used to instruct the base station to allocate the discovered resource to the second terminal and send the discovered resource to the second terminal, so that the base station sends the discovered resource to the second terminal by using an RRC message.

In a second development of the management entity according to the embodiment, the seventh request sending module is configured to send an S1-AP message to the base station, wherein the S1-AP message comprises a fourth indication, wherein the fourth indication is used to instruct the base station to allocate the discovered resource, or the fourth indication is used to instruct the base station to allocate the discovered resource to the second terminal, or the fourth indication is used to instruct the base station to allocate the discovered resource and send the discovered resource to the management entity, or the fourth indication is used to instruct the base station to allocate the discovered resource to the second terminal and send the discovered resource to the management entity; the third discovered resource receiving module is configured to receive the discovered resource that is sent by the base station by using a container; and the third discovered resource sending module is configured to send the discovered resource to the second terminal by using an NAS message.

An embodiment of the present invention provides a terminal discovery system, comprising the first terminal according to any one of the above embodiments, at least one second terminal according to any one of the above embodiments, the server according to any one of the above embodiments, the base station according to any one of the above embodiments, and the management entity according to any one of the above embodiments.

What is claimed is:

1. A terminal discovery method, wherein the method comprises:
    sending, by a terminal, a first request to a management entity such that the management entity sends a second request to a base station, wherein the second request comprises an identity of the terminal that is used to determine whether the terminal is authorized to discover other terminals; and
    receiving, by the terminal, a discovered resource from the base station or the management entity when the terminal is authorized to discover the other terminals, wherein the discovered resource is a resource that is allocated by the base station according to the second request.

2. The method according to claim 1, wherein the discovered resource is received using a Radio Resource Control (RRC) message, wherein the discovered resource is the resource that the base station allocates after receiving the second request, wherein the second request is an S1-Application Protocol (S1-AP) message comprising an indication that is used to instruct the base station to allocate the discovered resource, to instruct the base station to allocate the discovered resource to the terminal, instruct the base station to allocate the discovered resource and send the discovered resource to the terminal, or instruct the base station to allocate the discovered resource to the terminal and send the discovered resource to the terminal.

3. The method according to claim 1, wherein the discovered resource is received using a non-access stratum message, wherein the discovered resource is the discovered resource that the base station sends to the management entity using a container after receiving the second request, wherein the second request is an S1-Application Protocol (S1-AP) message comprising an indication used to instruct the base station to allocate the discovered resource, instruct the base station to allocate the discovered resource to the terminal, instruct the base station to allocate the discovered resource and send the discovered resource to the management entity, or instruct the base station to allocate the discovered resource to the terminal and send the discovered resource to the management entity.

4. The method according to claim 1, wherein sending, by the terminal, the first request to the management entity comprises sending, by the terminal, a third request to a server such that the server sends a fourth request to the management entity, wherein the third request comprises a globally unique temporary identity (GUTI) of the terminal, and wherein the server sends the fourth request to the management entity according to the GUTI.

5. A terminal discovery method, wherein the method comprises:
    receiving, by a base station, a request sent by a management entity, wherein the request comprises an identity of a terminal that is used to determine whether the terminal is authorized to discover other terminals;
    allocating, by the base station, a discovered resource to the terminal according to the request when the terminal is authorized to discover the other terminals, wherein the discovered resource is a resource used when the terminal sends a message; and
    sending, by the base station, the discovered resource to the terminal or the management entity such that the management entity sends the discovered resource to the terminal.

6. The method according to claim 5, wherein the request is an S1-Application Protocol (S1-AP) message comprising an indication, that is used to instruct the base station to allocate the discovered resource, instruct the base station to allocate the discovered resource to the terminal, or instruct the base station to allocate the discovered resource and send the discovered resource to the terminal, or instruct the base station to allocate the discovered resource to the terminal and send the discovered resource to the terminal, and wherein, the discovered resource is sent to the terminal using a Radio Resource Control (RRC) message.

7. The method according to claim 5, wherein the request is an S1-Application Protocol (S1-AP) message comprising an indication that is used to instruct the base station to allocate the discovered resource, instruct the base station to allocate the discovered resource to the terminal, instruct the base station to allocate the discovered resource and send the discovered resource to the management entity, or instruct the base station to allocate the discovered resource to the terminal and send the discovered resource to the management entity, and wherein the discovered resource is sent to the management entity using a container such that the management entity sends the discovered resource to the terminal using a non-access stratum message.

8. A terminal discovery method, wherein the method comprises:
    receiving, by a management entity, a first request sent by a terminal or a server, wherein the first request comprises an identity of the terminal that is used to determine whether the terminal is authorized to discover other terminals; and
    sending, by the management entity, a second request to a base station when the terminal is authorized to discover the other terminals, wherein the base station allocates and sends a discovered resource to the terminal according to the second request, wherein the discovered resource is a resource used when the terminal sends a message.

9. The method according to claim 8, wherein the second request is an S1-Application Protocol (S1-AP) message comprising an indication that is used to instruct the base station to allocate the discovered resource, instruct the base station to allocate the discovered resource to the terminal, instruct the base station to allocate the discovered resource and send the discovered resource to the terminal, or instruct the base station to allocate the discovered resource to the terminal and send the discovered resource to the terminal such that the base station sends the discovered resource to the terminal using a Radio Resource Control (RRC) message.

10. The method according to claim 8, wherein the second request is an S1-Application Protocol (S1-AP) message comprising an indication that is used to instruct the base station to allocate the discovered resource, instruct the base station to allocate the discovered resource to the terminal, instruct the base station to allocate the discovered resource and send the discovered resource to the management entity, or instruct the base station to allocate the discovered resource to the terminal and send the discovered resource to the management entity; receiving, by the management entity, the discovered resource that is sent by the base station using a container; and sending, by the management entity, the discovered resource to the terminal by using a non-access stratum message.

11. A terminal, wherein the terminal comprises:
    a processor;
    a transmitter coupled to the processor and configured to send a first request to a server such that the server sends a second request to a management entity, and the management entity sends a third request to a base station, wherein the third request comprises an identity of the terminal that is used to determine whether the terminal is authorized to discover other terminals; and a receiver coupled to the processor and configured to receive, from the base station or the server, a discovered resource when the terminal is authorized to discover the other terminals, wherein the discovered resource is a resource that is allocated by the base station according to the third request.

12. The terminal according to claim 11, wherein the discovered resource that is sent by the base station is received using a Radio Resource Control (RRC) message, wherein the discovered resource is the resource that the base station allocates after receiving the third request, wherein the third request is an S1-Application Protocol (S1-AP) message comprising an indication that is used to instruct the base station to allocate the discovered resource, instruct the base station to allocate the discovered resource to the terminal, instruct the base station to allocate the discovered resource and send the discovered resource to the terminal, or instruct the base station to allocate the discovered resource to the terminal and send the discovered resource to the terminal.

13. The terminal according to claim 11, wherein the discovered resource that is sent by the management entity is received using a non-access stratum message, wherein the discovered resource is the discovered resource that the base station sends to the management entity using a container after receiving the third request, wherein the third request is an S1-Application Protocol (S1-AP) message comprising an indication that is used to instruct the base station to allocate the discovered resource, instruct the base station to allocate the discovered resource to the terminal, instruct the base station to allocate the discovered resource and send the discovered resource to the management entity, or instruct the base station to allocate the discovered resource to the terminal and send the discovered resource to the management entity.

14. The terminal according to claim 11, wherein the first request comprises a globally unique temporary identity (GUTI) of the terminal such that the server sends the second request to the management entity according to the GUTI.

15. A base station, wherein the base station comprises:
a receiver configured to receive a request sent by a management entity, wherein the request comprises an identity of a terminal that is used to determine whether the terminal is authorized to discover other terminals;
a processor coupled to the receiver and configured to allocate a discovered resource to the terminal according to the request when the terminal is authorized to discover the other terminals based on the identity of the terminal, wherein the discovered resource is a resource used when the terminal sends a message; and
a transmitter coupled to the processor and configured to send the discovered resource, to the terminal or the management entity such that the management entity sends the discovered resource to the terminal.

16. The base station according to claim 15, wherein the request is an S1-Application Profile (S1-AP) message comprising an indication that is used to instruct the base station to allocate the discovered resource, instruct the base station to allocate the discovered resource to the terminal, instruct the base station to allocate the discovered resource and send the discovered resource to the terminal, or instruct the base station to allocate the discovered resource to the terminal and send the discovered resource to the terminal, and wherein the discovered resource is sent to the terminal using a Radio Resource Control (RRC) message.

17. The base station according to claim 15, wherein the request is an S1-Application Protocol (S1-AP) message comprising an indication that is used to instruct the base station to allocate the discovered resource, instruct the base station to allocate the discovered resource to the terminal, instruct the base station to allocate the discovered resource and send the discovered resource to the management entity, or instruct the base station to allocate the discovered resource to the terminal and send the discovered resource to the management entity, and wherein the discovered resource is sent to the management entity using a container such that the management entity sends the discovered resource to the terminal using a non-access stratum message.

18. A management entity, wherein the management entity comprises:
a processor;
a receiver coupled to the processor and configured to receive a first request sent by a terminal or a server, wherein the first request comprises an identity of the terminal that is used to determine whether the terminal is authorized to discover other terminals; and
a transmitter coupled to the processor and configured to send a second request to a base station according to the first request such that the base station allocates and sends a discovered resource to the terminal according to the second request;
wherein the receiver is configured to receive a discovered resource that is allocated and sent by the base station according to the second request when the terminal is authorized to discover the other terminals,
wherein the transmitter is configured to send the discovered resource to the terminal, and
wherein the discovered resource is a resource used when the terminal sends a second message.

19. The management entity according to claim 18, wherein the second request is an S1-Application Protocol (S1-AP) comprising an indication that is used to instruct the base station to allocate the discovered resource, instruct the base station to allocate the discovered resource to the terminal, instruct the base station to allocate the discovered resource and send the discovered resource to the terminal, or instruct the base station to allocate the discovered resource to the terminal and send the discovered resource to the terminal, so that the base station sends the discovered resource to the terminal using a Radio Resource Control (RRC) message.

20. The management entity according to claim 18, wherein the second request is an S1-Application Protocol (S1-AP) message comprising an indication that is used to instruct the base station to allocate the discovered resource, instruct the base station to allocate the discovered resource to the terminal, instruct the base station to allocate the discovered resource and send the discovered resource to the management entity, instruct the base station to allocate the discovered resource to the terminal and send the discovered resource to the management entity, wherein the discovered resource that is sent by the base station is received using a container, and wherein the discovered resource is sent to the terminal using a non-access stratum message.

* * * * *